US011442607B2

(12) United States Patent
Nonaka et al.

(10) Patent No.: US 11,442,607 B2
(45) Date of Patent: Sep. 13, 2022

(54) TASK SHORTCUT USER INTERFACE

(71) Applicant: Apple Inc., Cupertino, CA (US)

(72) Inventors: Ayaka Nonaka, Berkeley, CA (US); Daniel Sean Hsu, Philadelphia, PA (US); Ian J. McDowell, San Francisco, CA (US); Nicholas Christian Frey, Tacoma, WA (US); Charles B. Etzel, Cupertino, CA (US); Conrad B. Kramer, San Francisco, CA (US); Jay Moon, Palo Alto, CA (US); Elizabeth Elsa Perakis, San Francisco, CA (US); Ari Weinstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/990,867

(22) Filed: Aug. 11, 2020

(65) Prior Publication Data
US 2021/0349605 A1    Nov. 11, 2021

Related U.S. Application Data

(60) Provisional application No. 63/022,771, filed on May 11, 2020.

(51) Int. Cl.
*G06F 3/0484* (2022.01)
*G06F 3/04842* (2022.01)
*G06F 3/04817* (2022.01)

(52) U.S. Cl.
CPC ...... *G06F 3/04842* (2013.01); *G06F 3/04817* (2013.01)

(58) Field of Classification Search
CPC .................................................. G06F 3/04842
See application file for complete search history.

(56) References Cited

U.S. PATENT DOCUMENTS

| 7,620,894 B1 | 11/2009 | Kahn |
| 7,623,119 B2 | 11/2009 | Autio et al. |

(Continued)

FOREIGN PATENT DOCUMENTS

| EP | 2555536 A1 | 2/2013 |
| JP | 2013-37688 A | 2/2013 |
| WO | 2019/236217 A1 | 12/2019 |

OTHER PUBLICATIONS

Hutsko et al., "iPhone All-in-One For Dummies", 3rd Edition, 2013, 98 pages.

(Continued)

*Primary Examiner* — Roland J Casillas
(74) *Attorney, Agent, or Firm* — Dentons US LLP

(57) ABSTRACT

Systems and processes for operating an intelligent automated assistant are provided. An example process for performing a task includes, at an electronic device having one or more processors and memory, determining whether a shortcut criteria is met and in accordance with a determination that the shortcut criteria is met: displaying a first affordance corresponding to a first task of a shortcut over a user interface, determining whether the first task can be completed without displaying an application interface corresponding to the first task, in accordance with a determination that the first task can be completed without displaying the application interface, performing the first task while displaying the first affordance, and in accordance with a determination that the first task cannot be completed without displaying the application interface, displaying the application interface, and completing the first task using the application interface.

59 Claims, 45 Drawing Sheets

(56) References Cited

U.S. PATENT DOCUMENTS

| | | |
|---|---|---|
| 8,117,542 B2 | 2/2012 | Radtke et al. |
| 8,332,748 B1 | 12/2012 | Karam |
| 9,383,827 B1 | 7/2016 | Faaborg et al. |
| 10,504,518 B1 | 12/2019 | Irani et al. |
| 2009/0158193 A1* | 6/2009 | Chaudhri .............. G06F 3/0484 715/779 |
| 2013/0033643 A1* | 2/2013 | Kim ................ H04N 21/44218 348/563 |
| 2013/0219333 A1 | 8/2013 | Palwe et al. |
| 2015/0254058 A1 | 9/2015 | Klein et al. |
| 2016/0240189 A1 | 8/2016 | Lee et al. |
| 2017/0371509 A1 | 12/2017 | Jung et al. |
| 2018/0278740 A1 | 9/2018 | Choi et al. |
| 2019/0371316 A1 | 12/2019 | Weinstein et al. |
| 2019/0371317 A1 | 12/2019 | Irani et al. |
| 2019/0373102 A1 | 12/2019 | Weinstein et al. |

OTHER PUBLICATIONS

Jefford et al., "Professional BizTalk Server 2006", Wrox, 2007, 398 pages.

Rowland et al., "Designing Connected Products: UX for the Consumer Internet of Things", O'Reilly, May 2015, 452 pages.

* cited by examiner

TASK SHORTCUT USER INTERFACE

CROSS-REFERENCE TO RELATED APPLICATIONS

This application claims priority to U.S. Provisional Application No. 63/022,771, filed May 11, 2020, entitled "TASK SHORTCUT USER INTERFACE", the entire contents of which are hereby incorporated by reference.

FIELD

This relates generally to digital assistants and, more specifically, to executing shortcuts using a digital assistant.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In some cases, a user may wish to execute one or more tasks associated with a specific user activity, time of day, or other criteria and to be advised about the progress of the one or more tasks without restricting the use of the electronic device. Further, in many instances digital assistants and electronic devices fail to provide an intuitive system for performing tasks and providing data without disrupting a user's ability to view and perform other actions with the electronic device.

SUMMARY

Example methods are disclosed herein. An example method includes, at an electronic device having one or more processors and memory, determining whether a shortcut criteria is met and in accordance with a determination that the shortcut criteria is met: displaying a first affordance corresponding to a first task of a shortcut over a user interface, determining whether the first task of the shortcut can be completed without displaying an application interface corresponding to the first task, in accordance with a determination that the first task of the shortcut can be completed without displaying the application interface corresponding to the first task, performing the first task while displaying the first affordance corresponding to the first task of the shortcut, and in accordance with a determination that the first task of the shortcut cannot be completed without displaying the application interface corresponding to the first task, displaying the application interface corresponding to the first task, and completing the first task using the displayed application interface.

Example non-transitory computer-readable media are disclosed herein. An example non-transitory computer-readable storage medium stores one or more programs. The one or more programs comprise instructions, which when executed by one or more processors of an electronic device, cause the electronic device to determine whether a shortcut criteria is met and in accordance with a determination that the shortcut criteria is met: display a first affordance corresponding to a first task of a shortcut over a user interface, determine whether the first task of the shortcut can be completed without displaying an application interface corresponding to the first task, in accordance with a determination that the first task of the shortcut can be completed without displaying the application interface corresponding to the first task, perform the first task while displaying the first affordance corresponding to the first task of the shortcut, and in accordance with a determination that the first task of the shortcut cannot be completed without displaying the application interface corresponding to the first task, display the application interface corresponding to the first task, and complete the first task using the application interface.

Example electronic devices are disclosed herein. An example electronic device comprises one or more processors; a memory; and one or more programs, where the one or more programs are stored in the memory and configured to be executed by the one or more processors, the one or more programs including instructions for determining whether a shortcut criteria is met and in accordance with a determination that the shortcut criteria is met: displaying a first affordance corresponding to a first task of a shortcut over a user interface, determining whether the first task of the shortcut can be completed without displaying an application interface corresponding to the first task, in accordance with a determination that the first task of the shortcut can be completed without displaying the application interface corresponding to the first task, performing the first task while displaying the first affordance corresponding to the first task of the shortcut, and in accordance with a determination that the first task of the shortcut cannot be completed without displaying the application interface corresponding to the first task, displaying the application interface corresponding to the first task, and completing the first task using the application interface.

An example electronic device comprises means for determining whether a shortcut criteria is met and in accordance with a determination that the shortcut criteria is met: means for displaying a first affordance corresponding to a first task of a shortcut over a user interface, means for determining whether the first task of the shortcut can be completed without displaying an application interface corresponding to the first task, in accordance with a determination that the first task of the shortcut can be completed without displaying the application interface corresponding to the first task, means for performing the first task while displaying the first affordance corresponding to the first task of the shortcut, and in accordance with a determination that the first task of the shortcut cannot be completed without displaying the application interface corresponding to the first task, means for displaying the application interface corresponding to the first task, and means for completing the first task using the application interface.

Displaying a first affordance corresponding to a first task of a shortcut over a user interface and determining whether the first task of the shortcut can be completed without displaying an application interface corresponding to the first task allows a user to accurately and efficiently respond to prompts related to the first task without interrupting other uses of the electronic device. For example, displaying a first affordance in this manner allows a user to open applications or change the user interface to find information that may be needed to perform the task associated with the affordance, without having to close the affordance and then re-open the affordance or application completing the task. Thus, displaying the first affordance in the manner described provides for more efficient use of the electronic device (e.g., by allowing the user to execute a task or several tasks in the same interface), which, additionally, reduces power usage and improves battery life of the device by enabling the user to use the device more quickly and efficiently.

DETAILED DESCRIPTION

Figure 1:
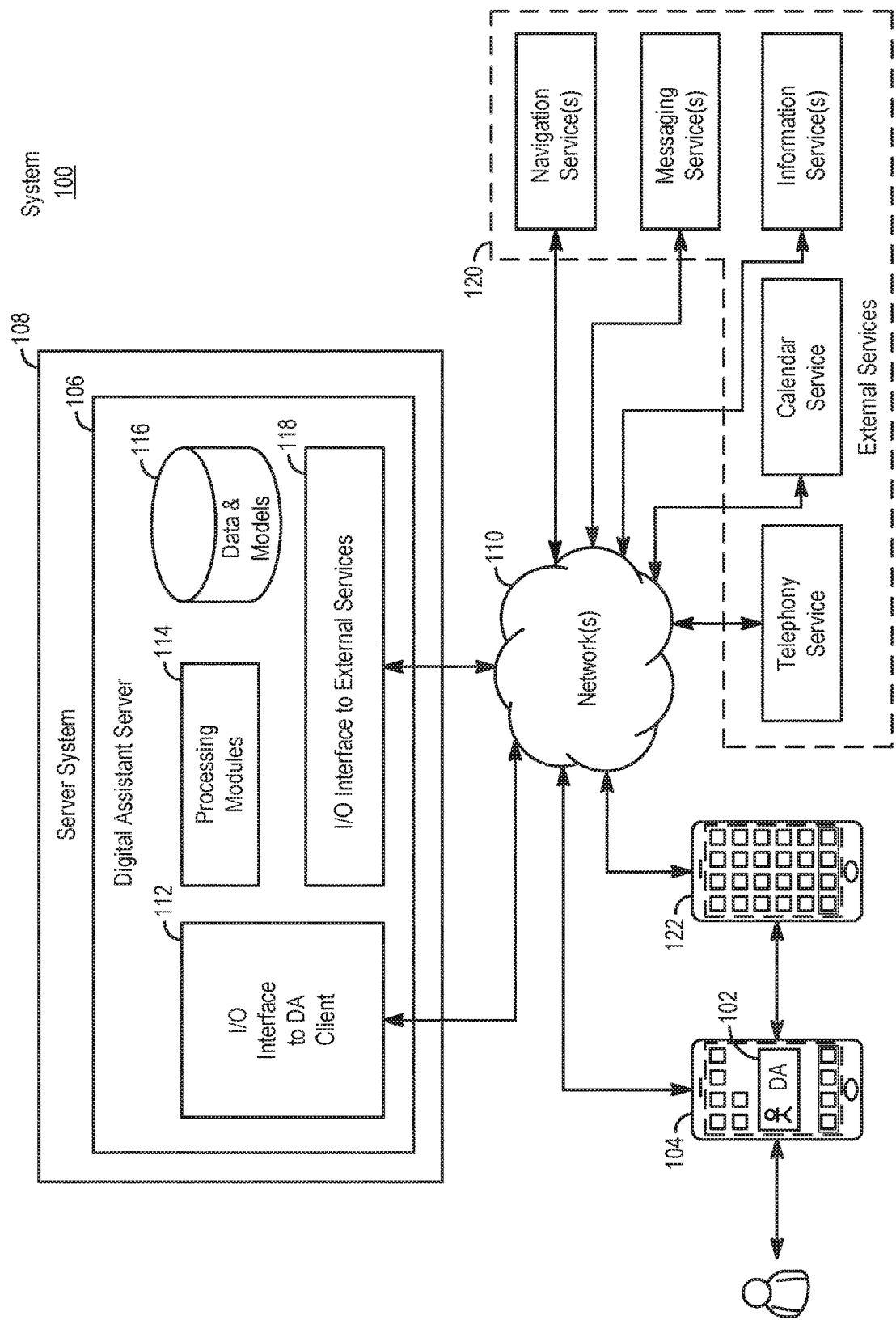
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

The present disclosure generally relates to performing one or more tasks of a shortcut while displaying an affordance associated with the task of the shortcut. For example, the present disclosure contemplates determining whether a shortcut criteria is met and in accordance with a determination that the shortcut criteria is met: displaying a first affordance corresponding to a first task of a shortcut over a user interface, determining whether the first task of the shortcut can be completed without displaying an application interface corresponding to the first task, in accordance with a determination that the first task of the shortcut can be completed without displaying the application interface corresponding to the first task, performing the first task while displaying the first affordance corresponding to the first task of the shortcut, and in accordance with a determination that the first task of the shortcut cannot be completed without displaying the application interface corresponding to the first task, displaying the application interface corresponding to the first task, and completing the first task using the displayed application interface. In this manner, an electronic device may display information related to a task while allowing continued use of the electronic device Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
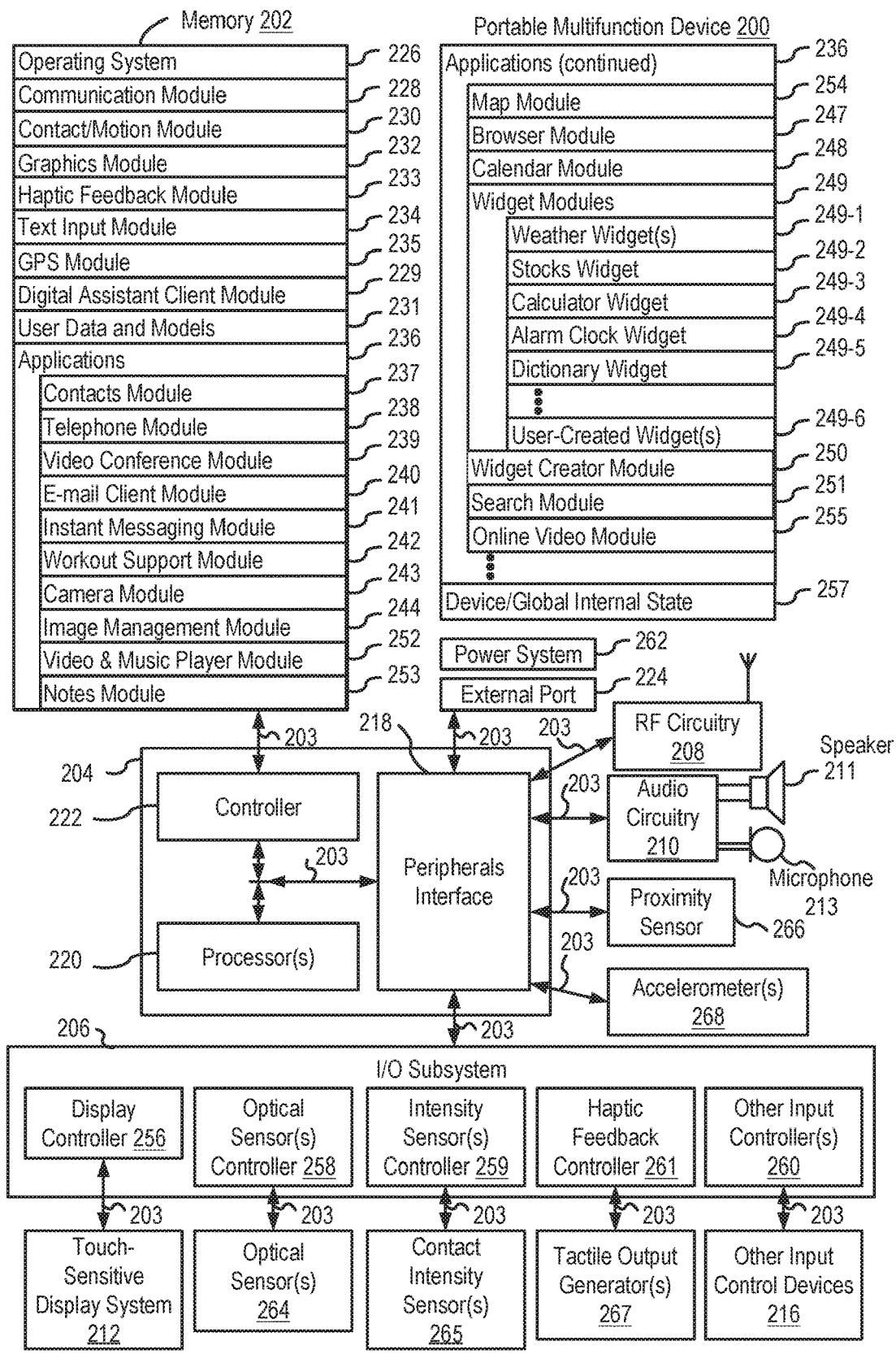
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. Patent Application 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
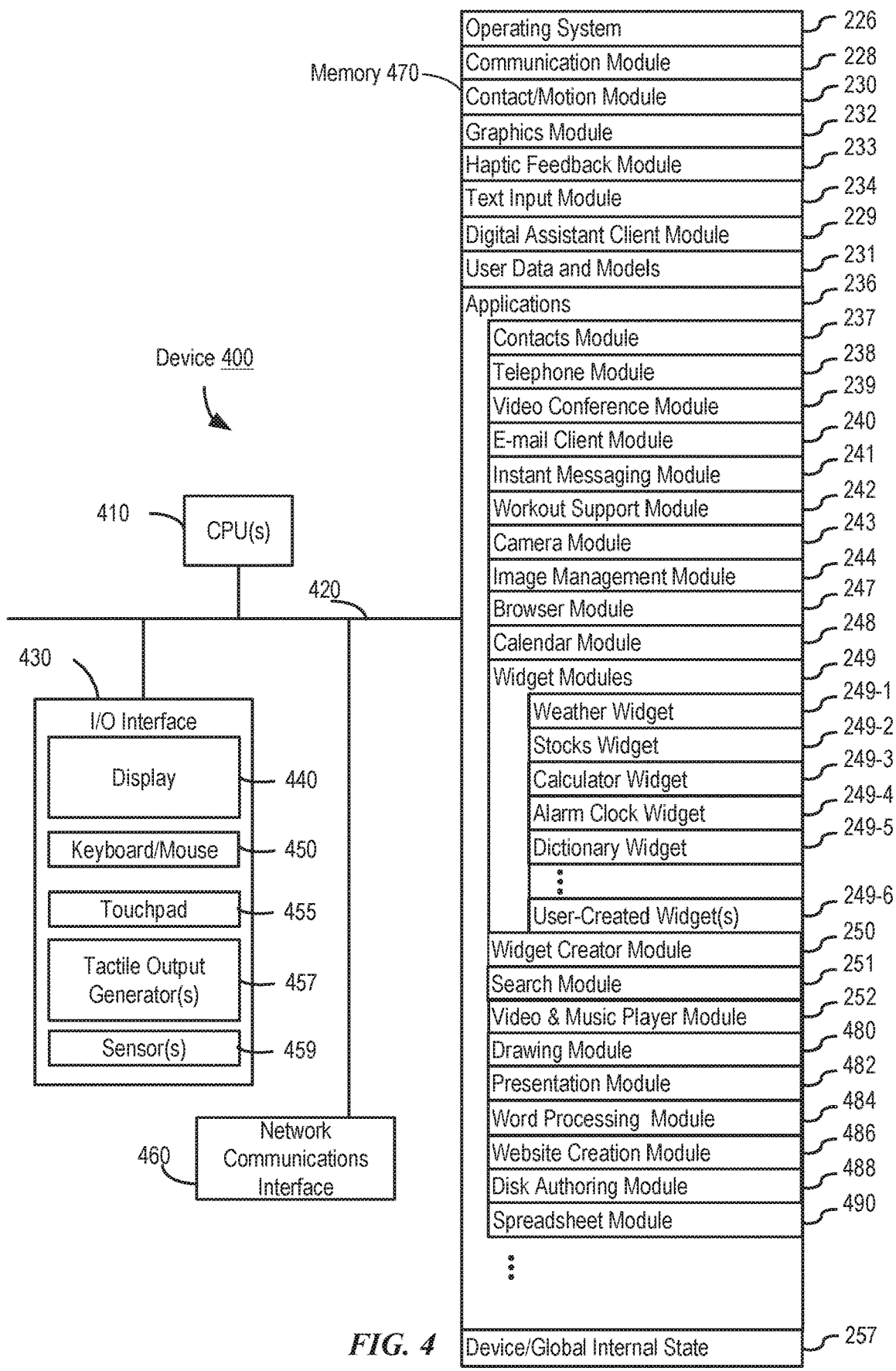
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including ,without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:
- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;

Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
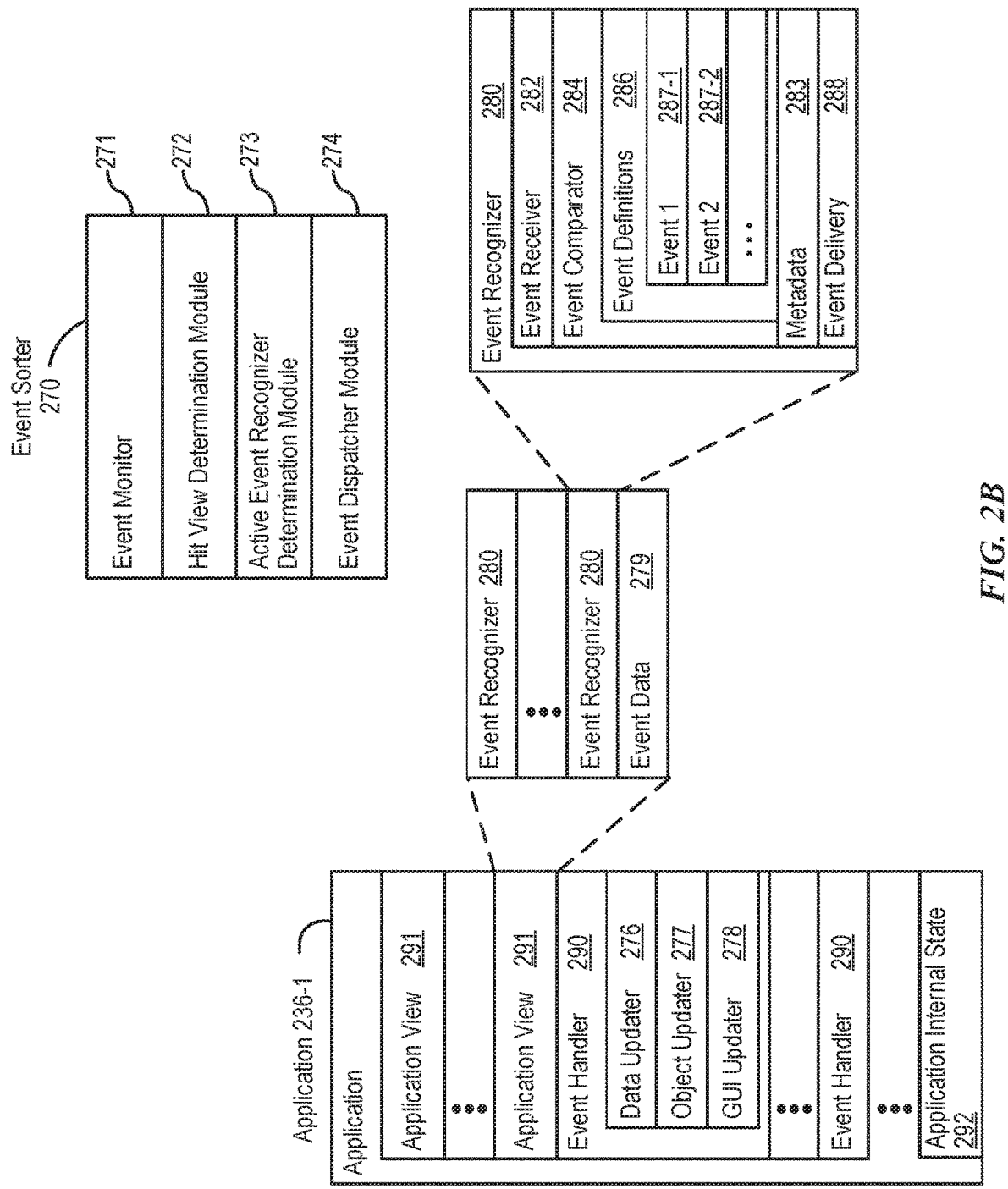
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
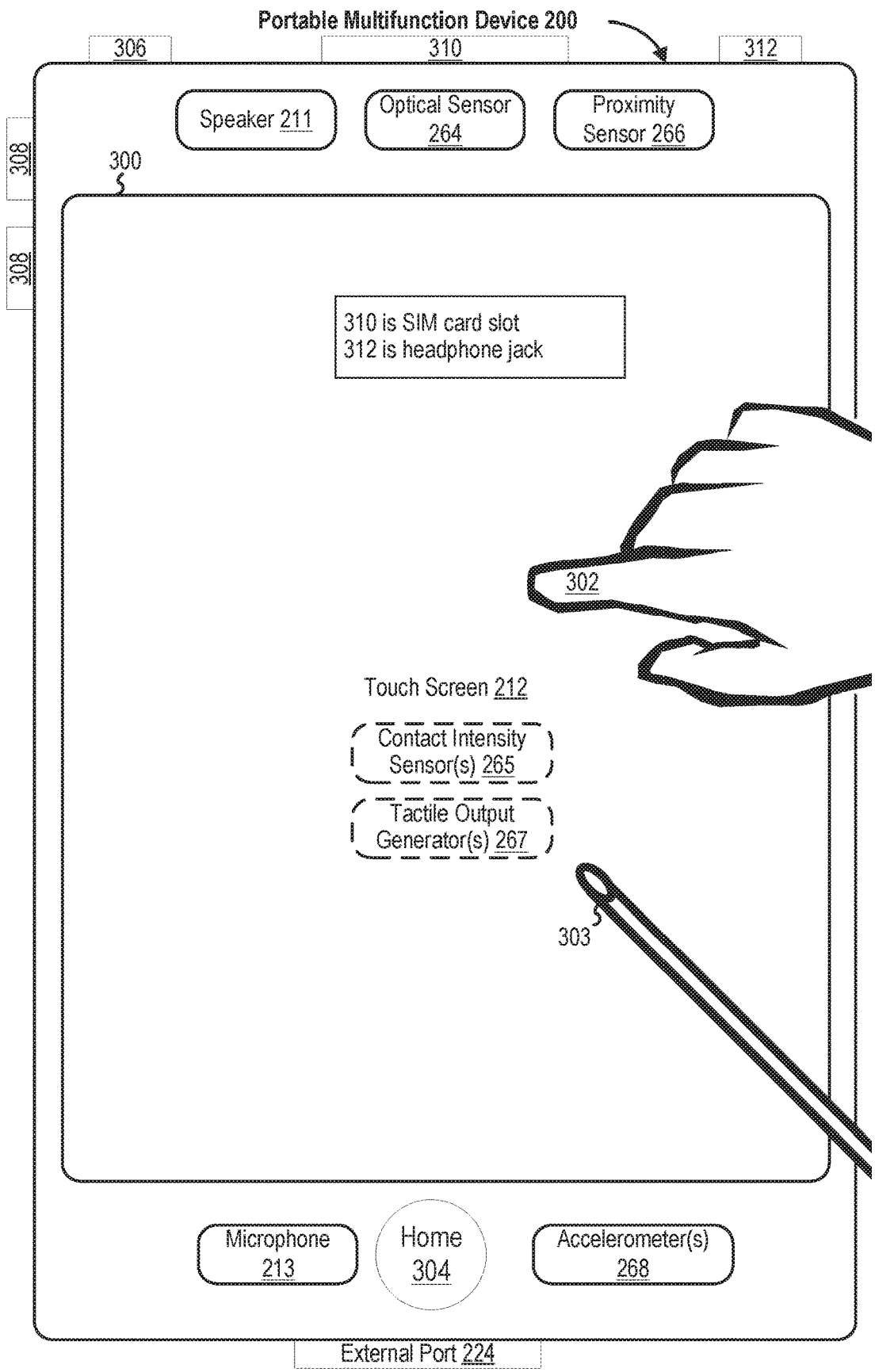
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
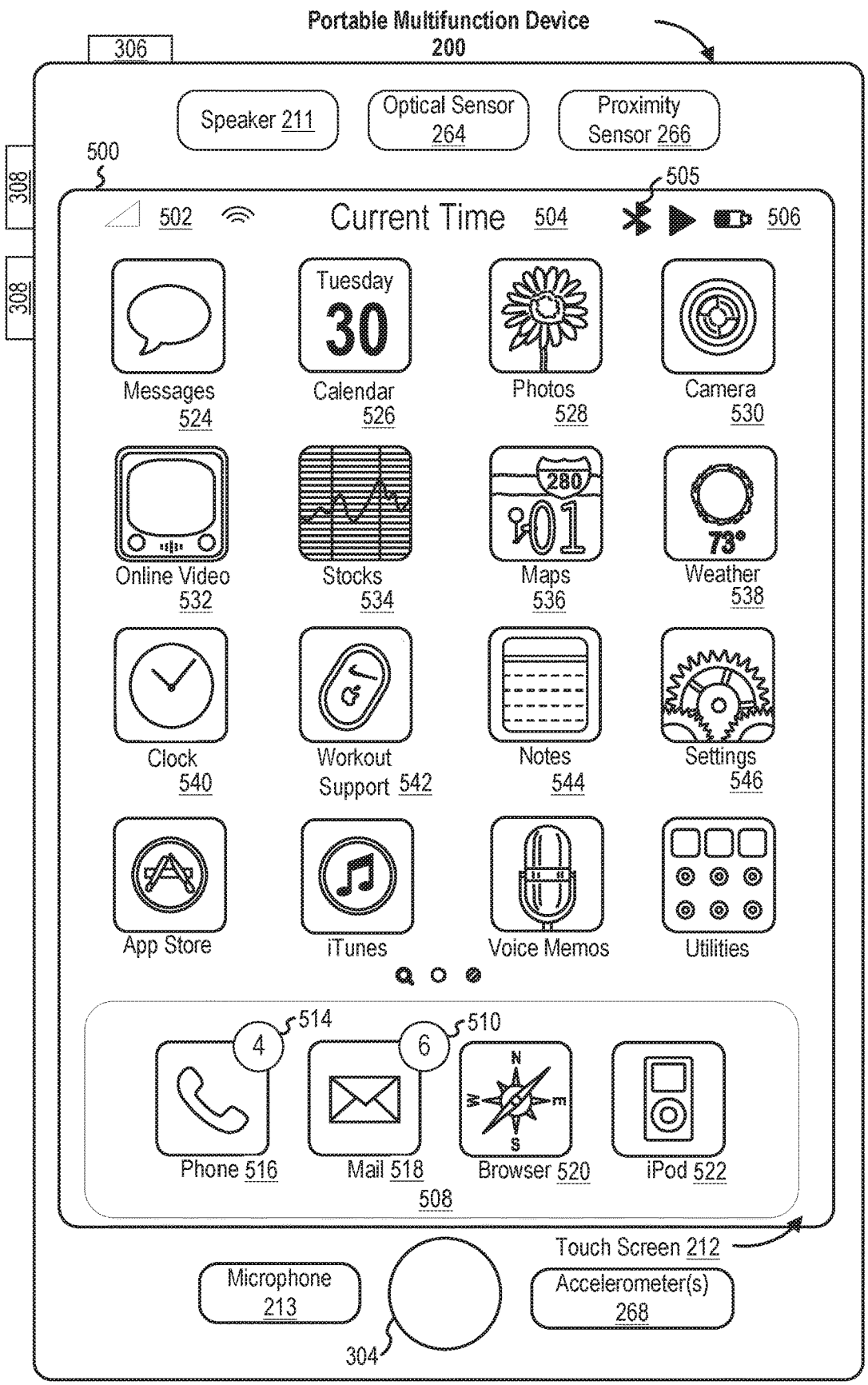
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
Icon 516 for telephone module 238, labeled "Phone," which optionally includes an indicator 514 of the number of missed calls or voicemail messages;
Icon 518 for e-mail client module 240, labeled "Mail," which optionally includes an indicator 510 of the number of unread e-mails;
Icon 520 for browser module 247, labeled "Browser;" and
Icon 522 for video and music player module 252, also referred to as iPod (trademark of Apple Inc.) module 252, labeled "iPod;" and
Icons for other applications, such as:
Icon 524 for IM module 241, labeled "Messages;"
Icon 526 for calendar module 248, labeled "Calendar;"
Icon 528 for image management module 244, labeled "Photos;"
Icon 530 for camera module 243, labeled "Camera;"
Icon 532 for online video module 255, labeled "Online Video;"
Icon 534 for stocks widget 249-2, labeled "Stocks;"
Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
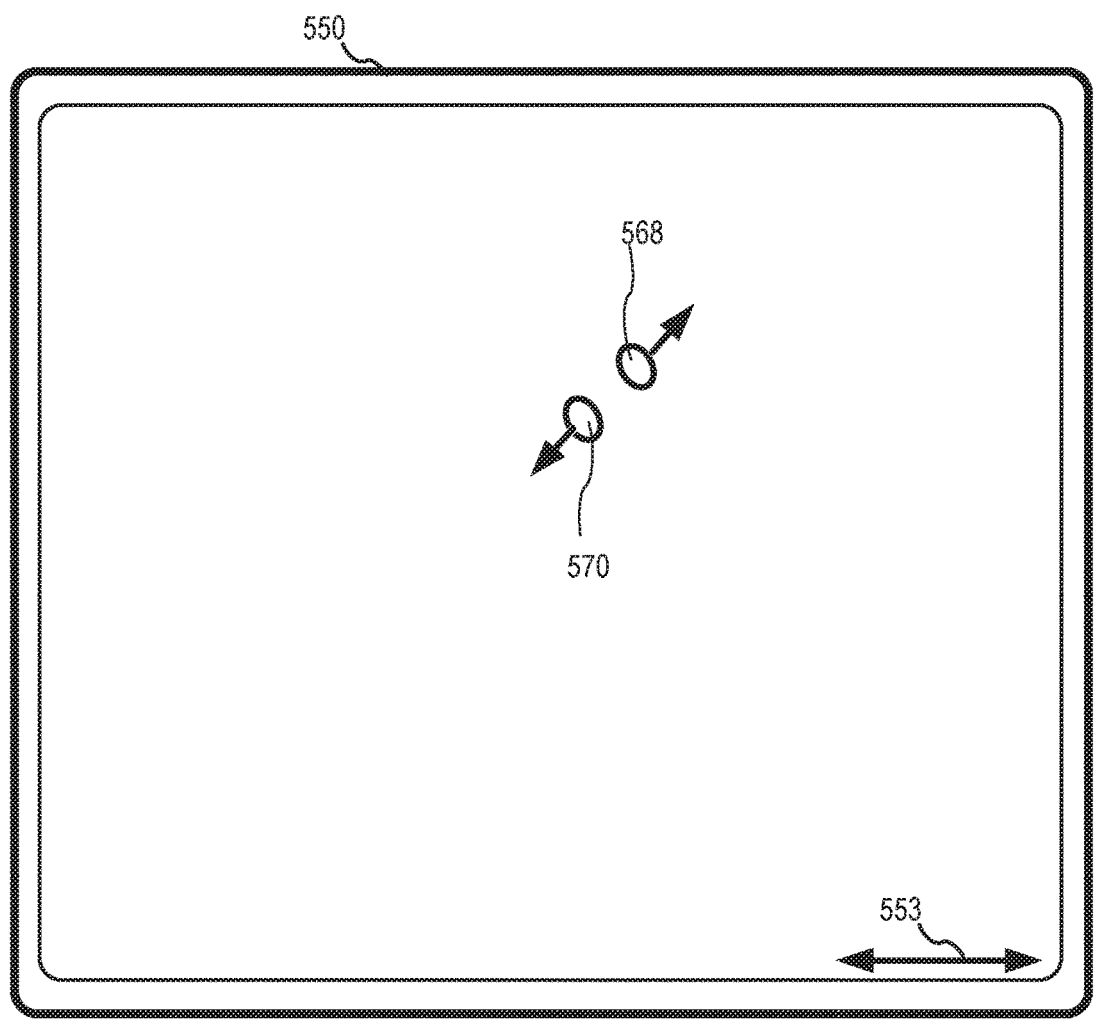
FIG. 5B illustrates an exemplary user interface for a multifunction device with a touch-sensitive surface that is separate from the display, according to various examples.
Figure 5B:
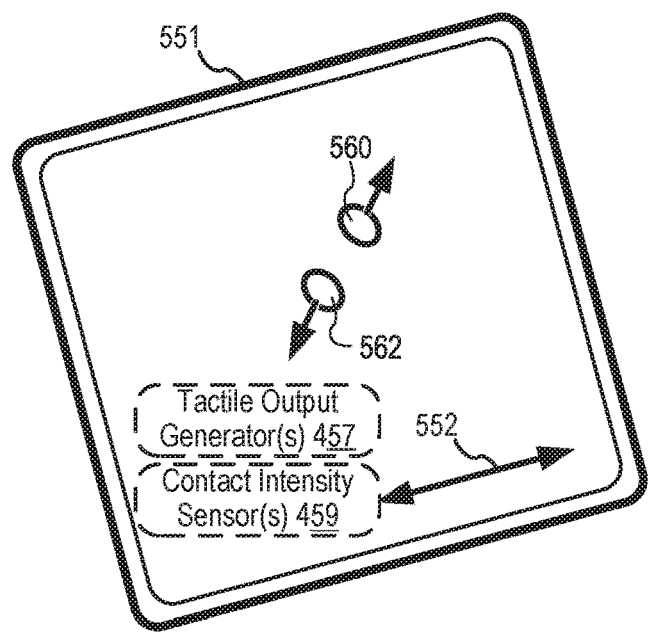

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
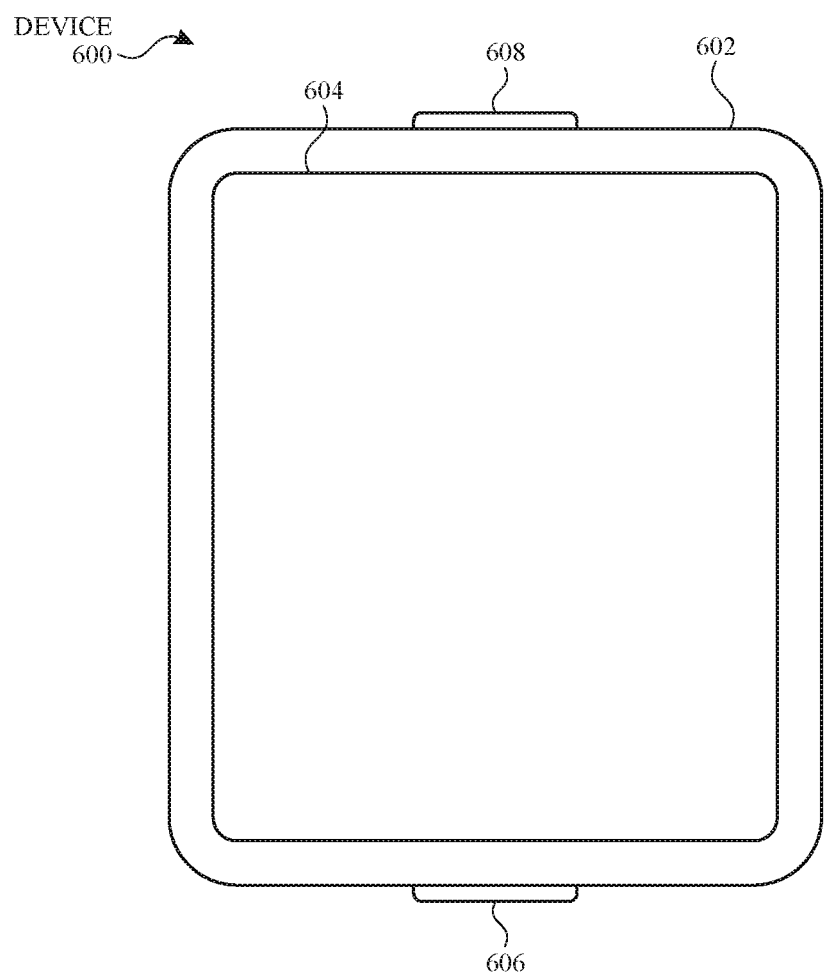
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
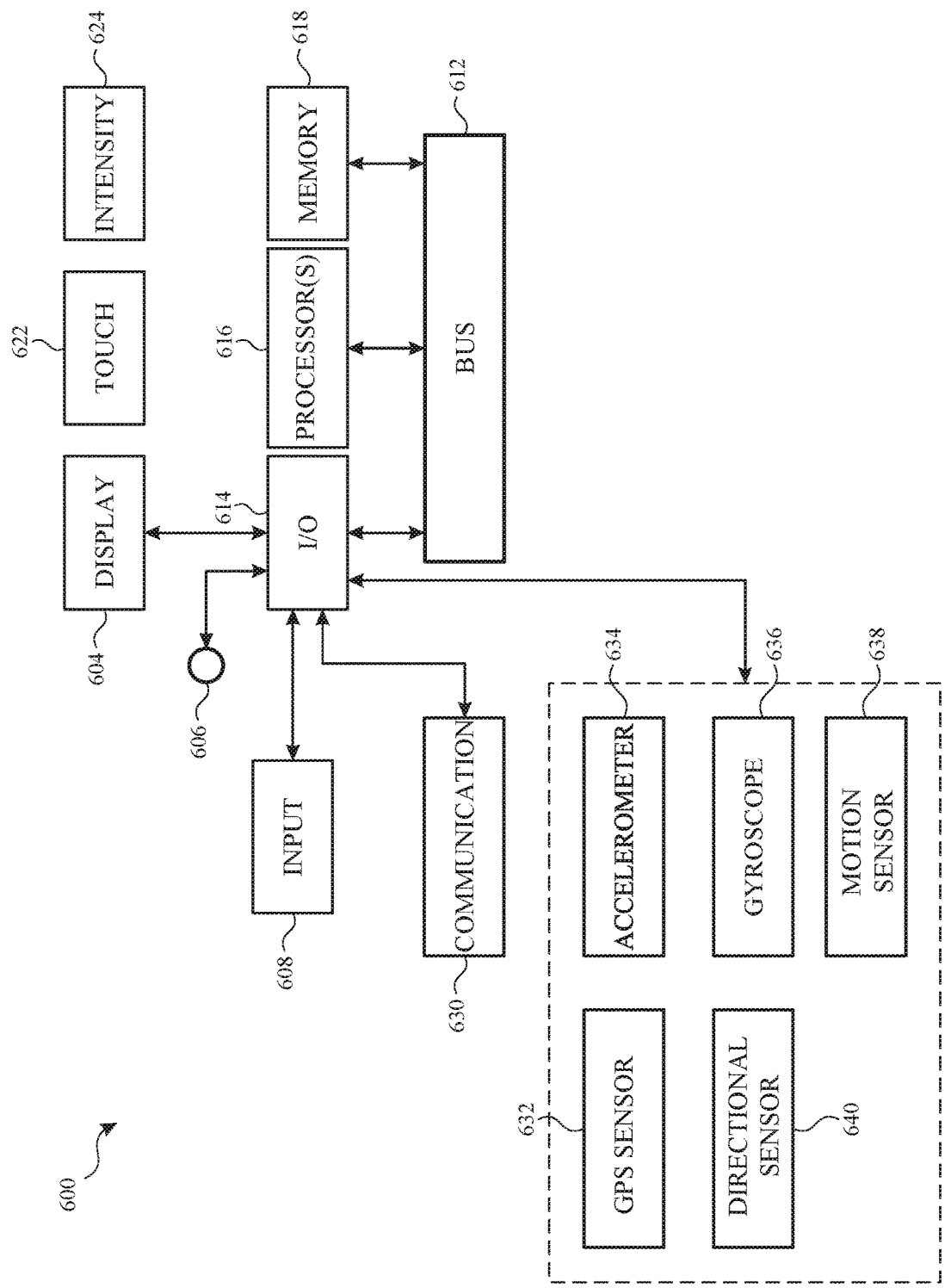
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, and/or 800 (FIGS. 2A, 4, 6A-B, and 8A-8V). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 6C:
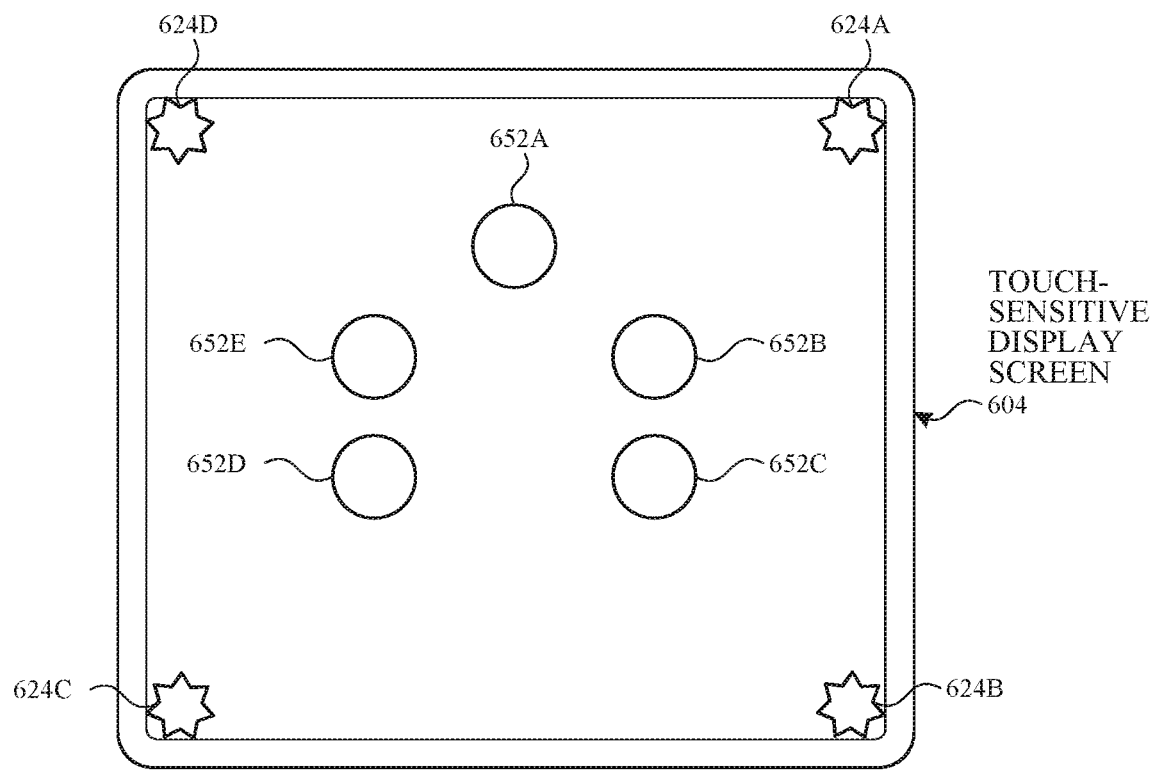
FIGS. 6C-6D illustrate exemplary components of a personal electronic device having a touch-sensitive display and intensity sensors in accordance with some embodiments.
Figure 6C:
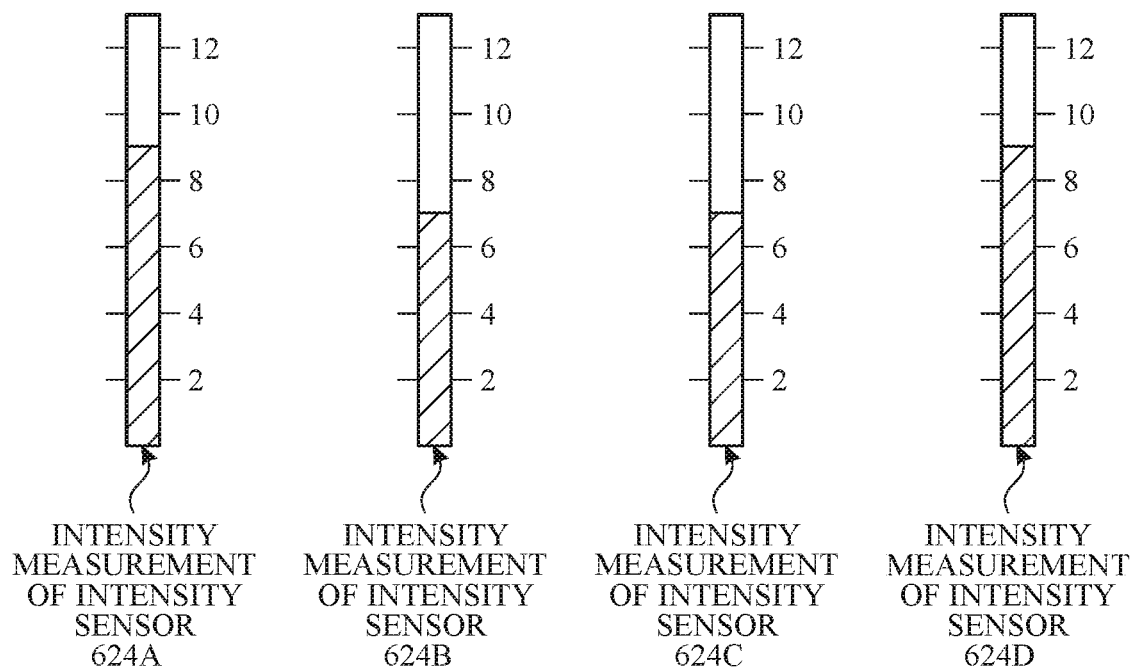
Figure 6D:
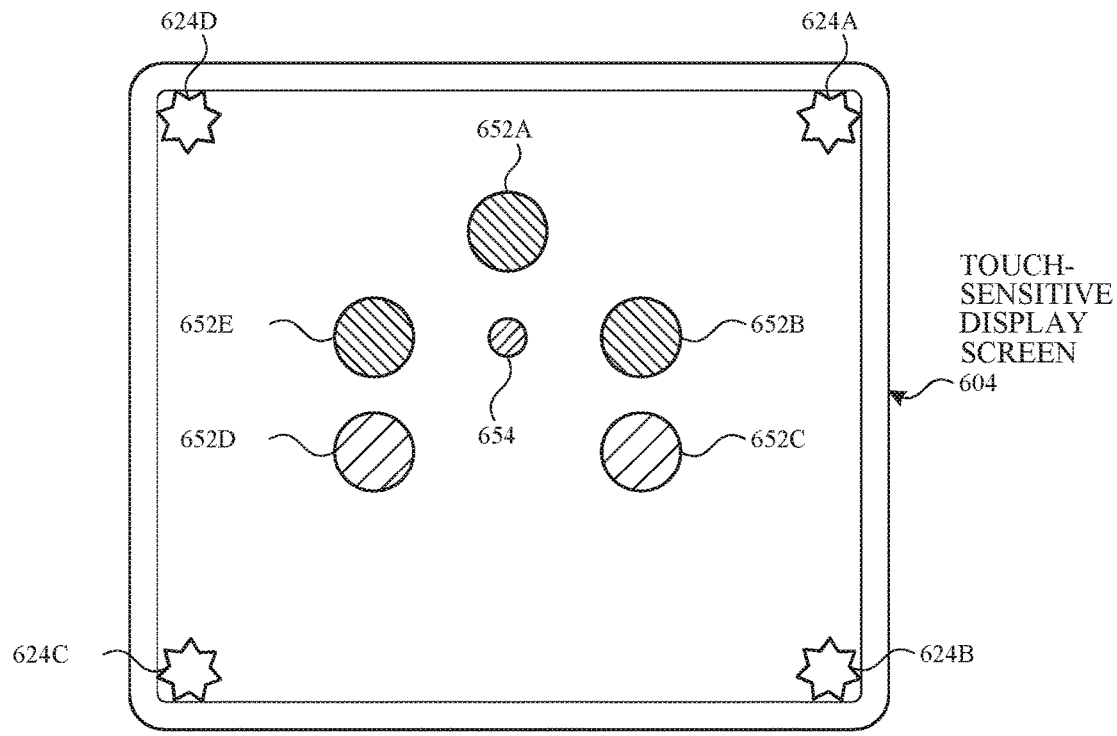
Figure 6D:
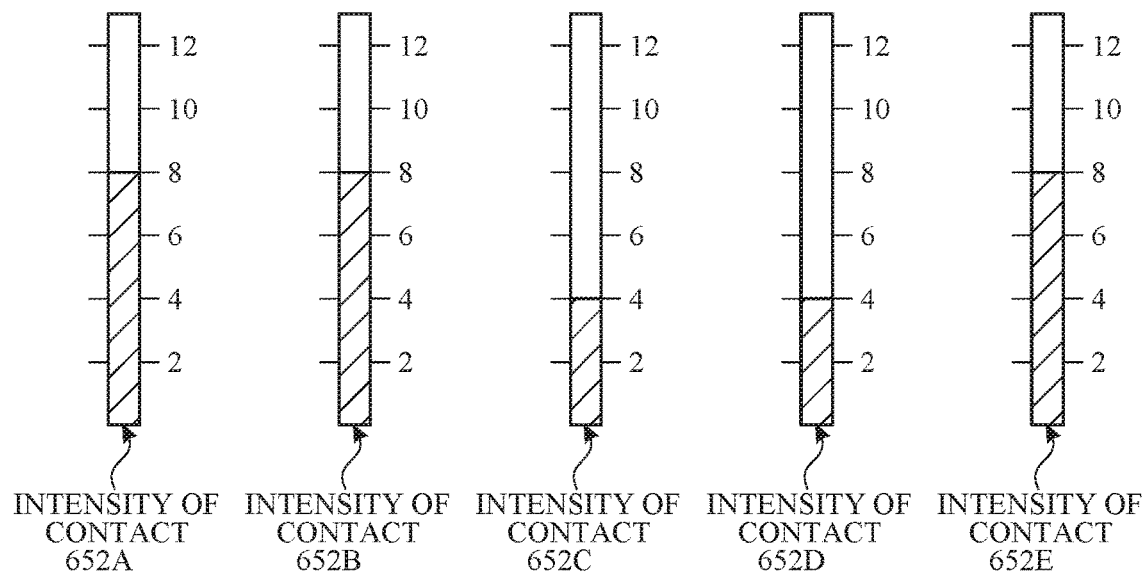

FIG. 6C illustrates detecting a plurality of contacts 652A-652E on touch-sensitive display screen 604 with a plurality of intensity sensors 624A-624D. FIG. 6C additionally includes intensity diagrams that show the current intensity measurements of the intensity sensors 624A-624D relative to units of intensity. In this example, the intensity measurements of intensity sensors 624A and 624D are each 9 units of intensity, and the intensity measurements of intensity sensors 624B and 624C are each 7 units of intensity. In some implementations, an aggregate intensity is the sum of the intensity measurements of the plurality of intensity sensors 624A-624D, which in this example is 32 intensity units. In some embodiments, each contact is assigned a respective intensity that is a portion of the aggregate intensity. FIG. 6D illustrates assigning the aggregate intensity to contacts 652A-652E based on their distance from the center of force 654. In this example, each of contacts 652A, 652B, and 652E are assigned an intensity of contact of 8 intensity units of the aggregate intensity, and each of contacts 652C and 652D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 6C-6D can be performed using an electronic device similar or identical to device 104, 200, 400, or 600. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 6C-6D to aid the reader.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 6E:
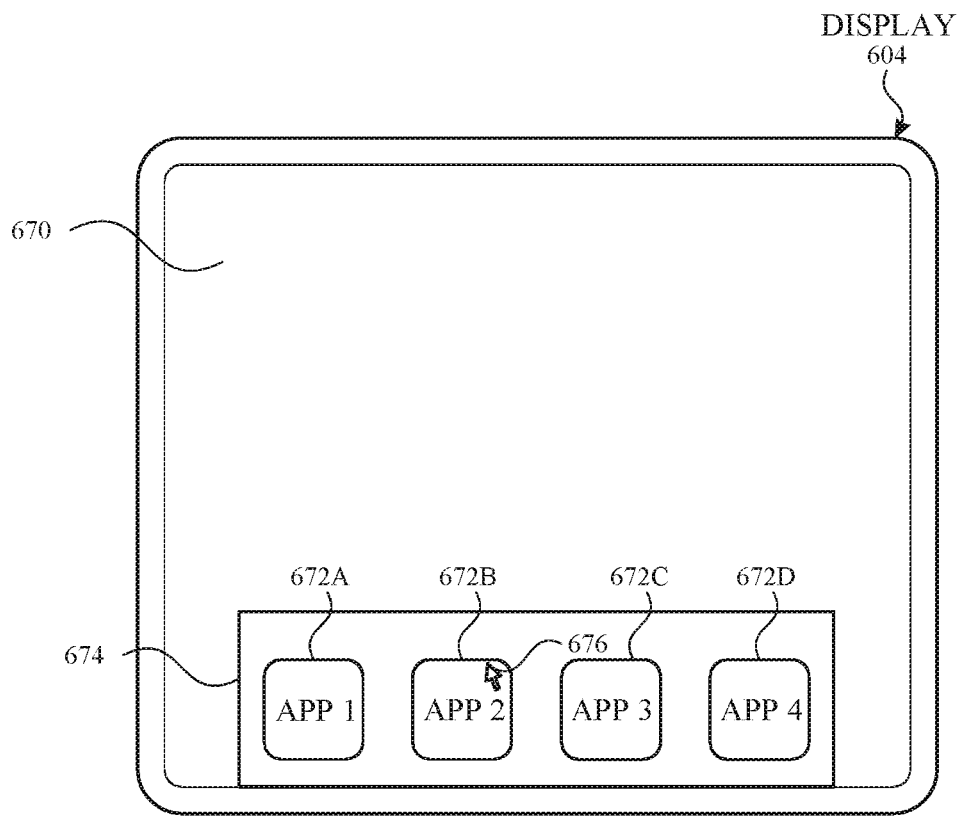
FIGS. 6E-6H illustrate exemplary components and user interfaces of a personal electronic device in accordance with some embodiments.
Figure 6E:
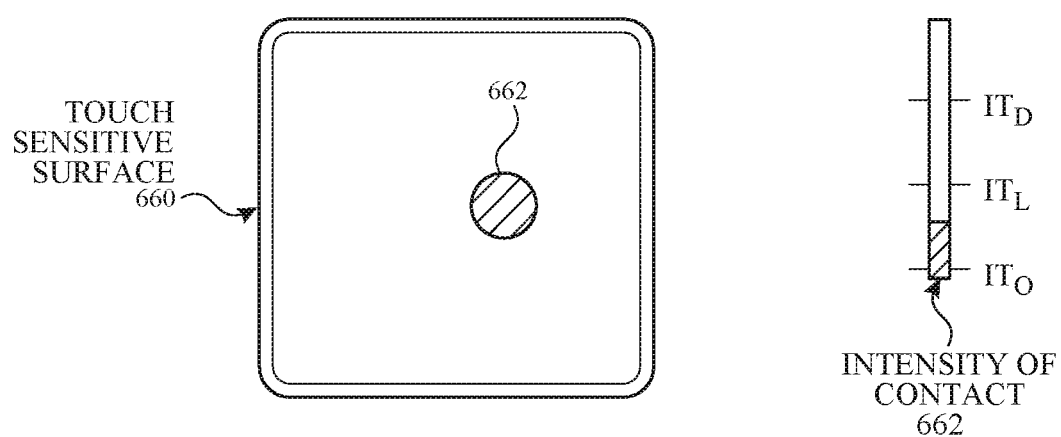
Figure 6F:
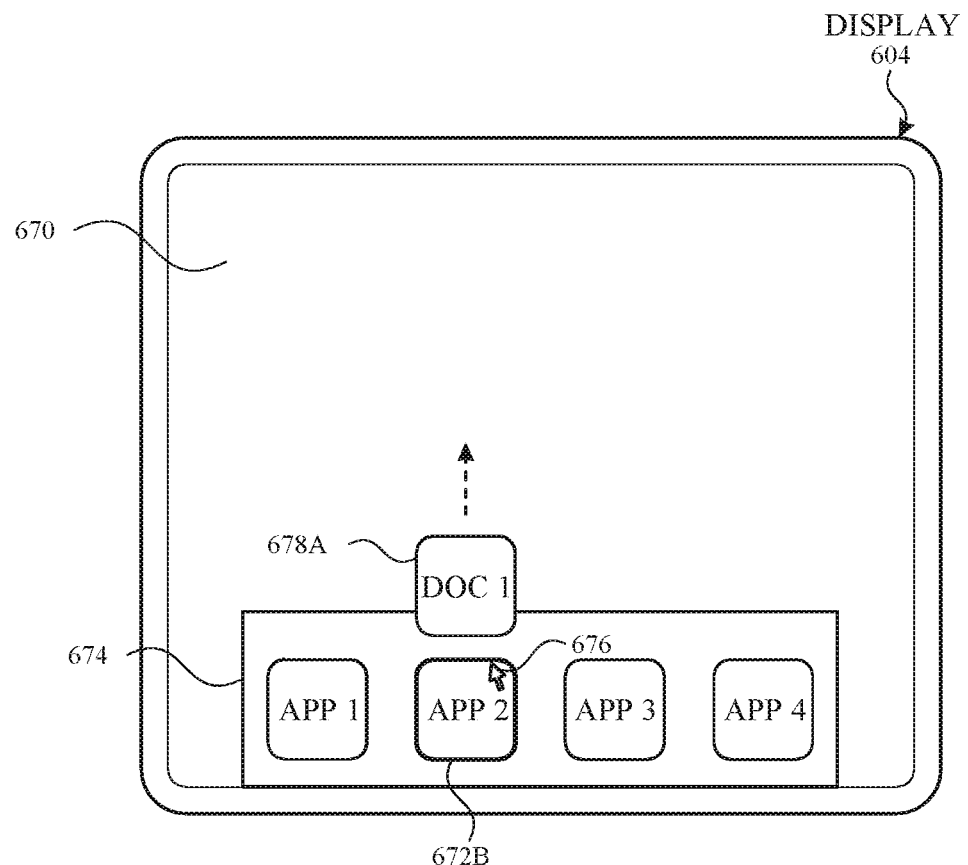
Figure 6F:
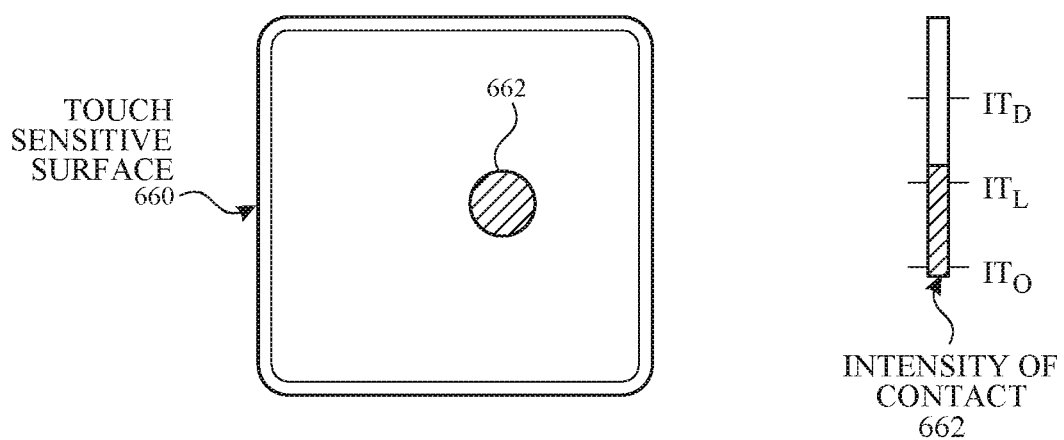
Figure 6G:
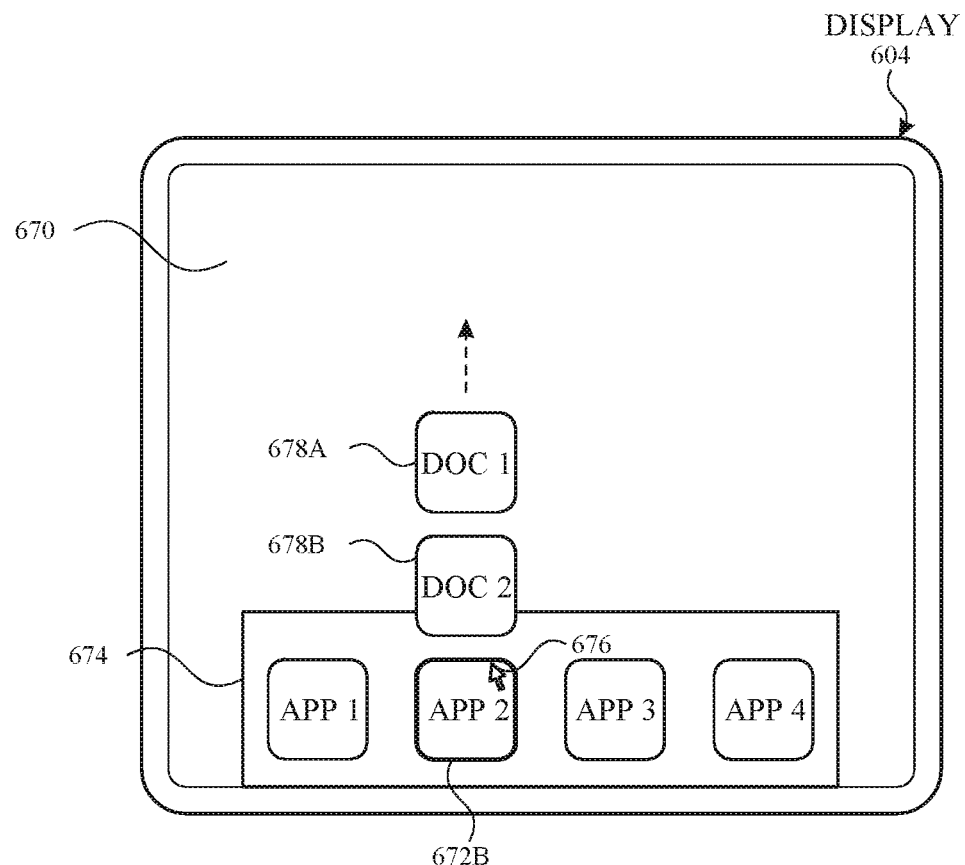
Figure 6G:
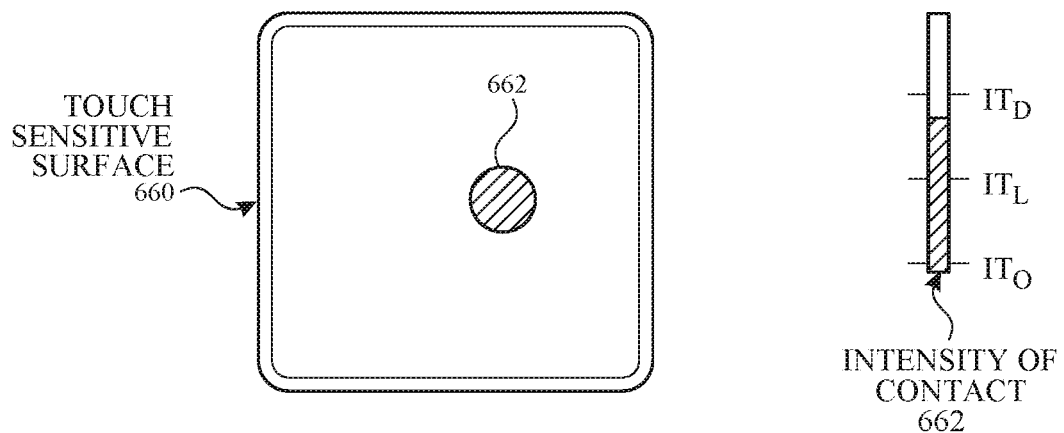
Figure 6H:
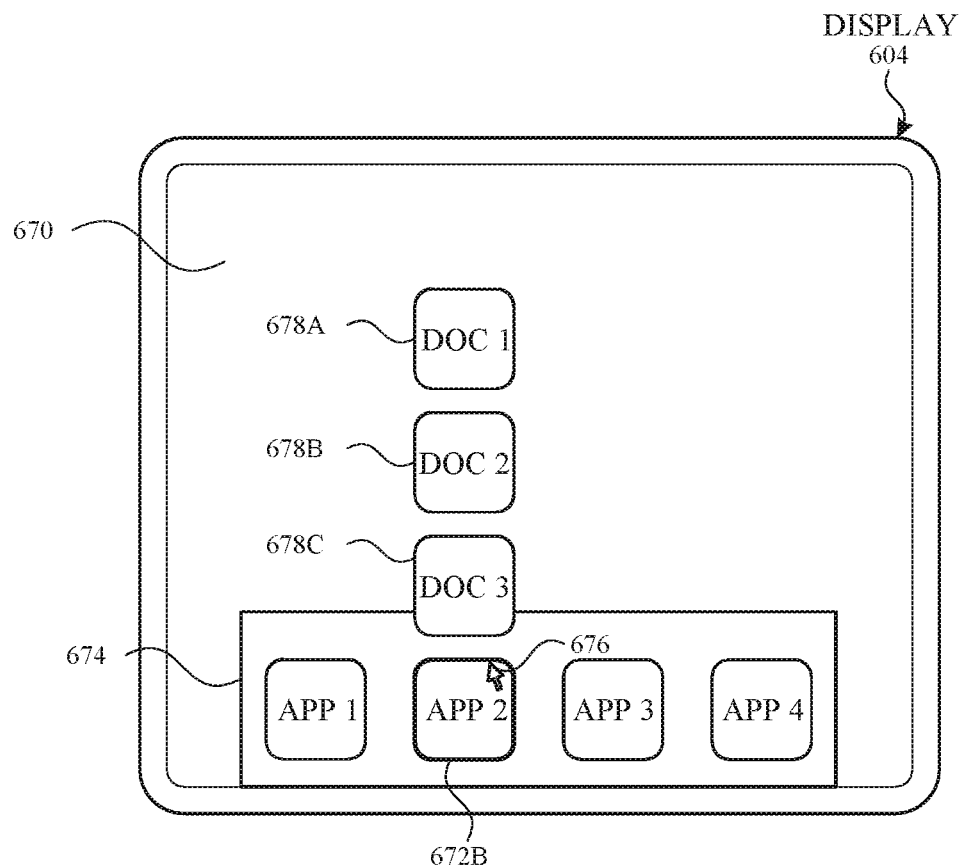
Figure 6H:
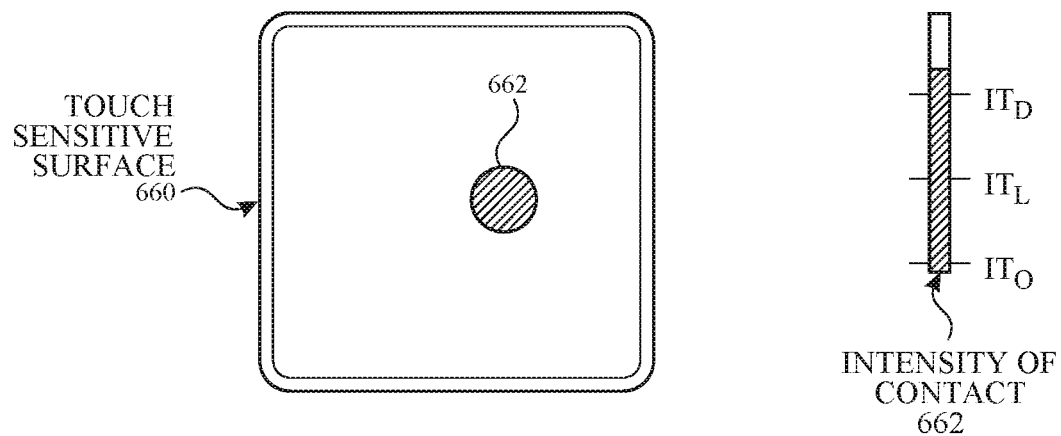

FIGS. 6E-6H illustrate detection of a gesture that includes a press input that corresponds to an increase in intensity of a contact 662 from an intensity below a light press intensity threshold (e.g., "$IT_L$") in FIG. 6E, to an intensity above a deep press intensity threshold (e.g., "$IT_D$") in FIG. 6H. The gesture performed with contact 662 is detected on touch-sensitive surface 660 while cursor 676 is displayed over application icon 672B corresponding to App 2, on a displayed user interface 670 that includes application icons 672A-672D displayed in predefined region 674. In some embodiments, the gesture is detected on touch-sensitive display 604. The intensity sensors detect the intensity of contacts on touch-sensitive surface 660. The device determines that the intensity of contact 662 peaked above the deep press intensity threshold (e.g., "$IT_D$"). Contact 662 is maintained on touch-sensitive surface 660. In response to the detection of the gesture, and in accordance with contact 662 having an intensity that goes above the deep press intensity threshold (e.g., "$IT_D$") during the gesture, reduced-scale representations 678A-678C (e.g., thumbnails) of recently opened documents for App 2 are displayed, as shown in FIGS. 6F-6H. In some embodiments, the intensity, which is compared to the one or more intensity thresholds, is the characteristic intensity of a contact. It should be noted that the intensity diagram for contact 662 is not part of a displayed user interface, but is included in FIGS. 6E-6H to aid the reader.

In some embodiments, the display of representations 678A-678C includes an animation. For example, representation 678A is initially displayed in proximity of application icon 672B, as shown in FIG. 6F. As the animation proceeds, representation 678A moves upward and representation 678B is displayed in proximity of application icon 672B, as shown in FIG. 6G. Then, representations 678A moves upward, 678B moves upward toward representation 678A, and representation 678C is displayed in proximity of application icon 672B, as shown in FIG. 6H. Representations 678A-678C form an array above icon 672B. In some embodiments, the animation progresses in accordance with an intensity of contact 662, as shown in FIGS. 6F-6G, where the representations 678A-678C appear and move upwards as the intensity of contact 662 increases toward the deep press intensity threshold (e.g., "$IT_D$"). In some embodiments, the intensity, on which the progress of the animation is based, is the characteristic intensity of the contact. The operations described with reference to FIGS. 6E-6H can be performed using an electronic device similar or identical to device 104, 200, 400, 600, or 800.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 200, 400, 600 and/or 800) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

3. Digital Assistant System

Figure 7A:
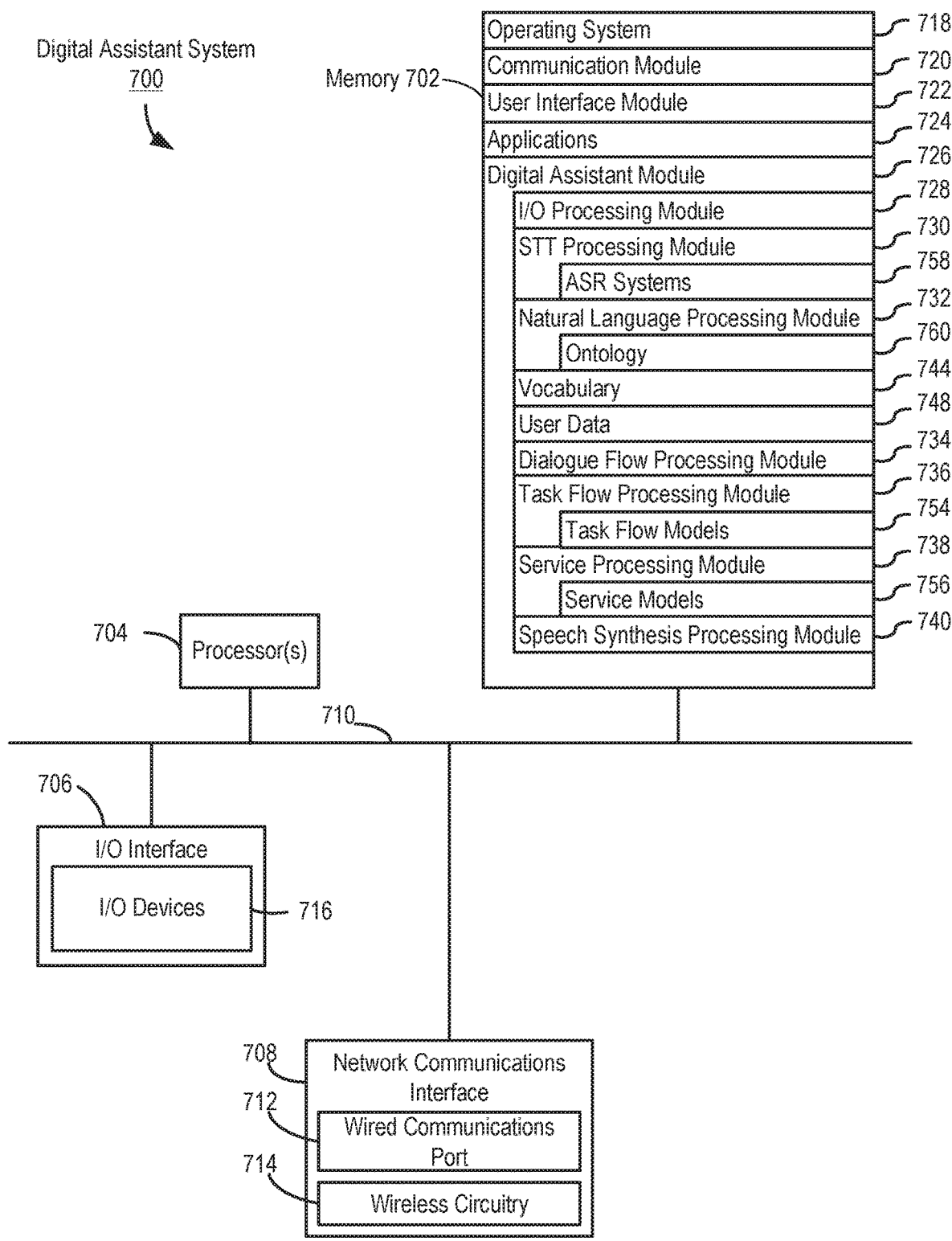
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, or 800) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, and/or 800 (FIGS. 2A, 4, 6A-B, and 8A-8V), respectively. In some examples, digital assistant system 700 represents the server portion of a digital assistant implementation, and can interact with the user through a client-side portion residing on a user device (e.g., devices 104, 200, 400, 600, or 800).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, 600, and 800 shown in FIGS. 2A, 4, 6A-B, and 8A-8V respectively.

Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
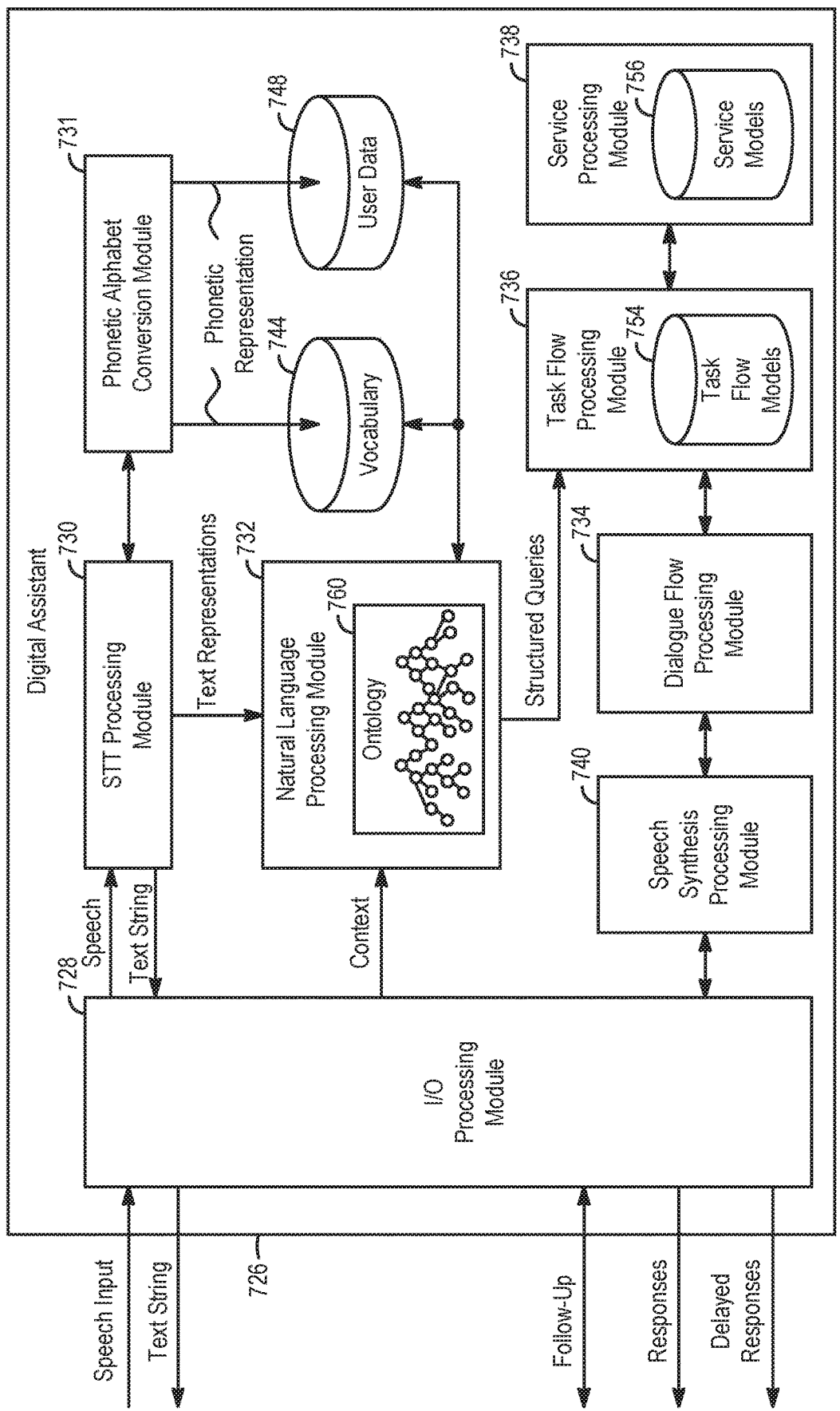
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, 600, or 800) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, 600, or 800) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /t təˈmɑtoʊ and /t təˈmɑtoʊ. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /t təˈmeɪroʊ is ranked higher than /t təˈmɑtoʊ, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /t təˈmeɪroʊ is associated with the United States, whereas the candidate pronunciation /t təˈmeɪroʊ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /t təˈmeɪroʊ (associated with the United States) is ranked higher than the candidate pronunciation /t təˈmeɪroʊ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /t təˈmeɪroʊ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /t təˈmeɪroʊ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
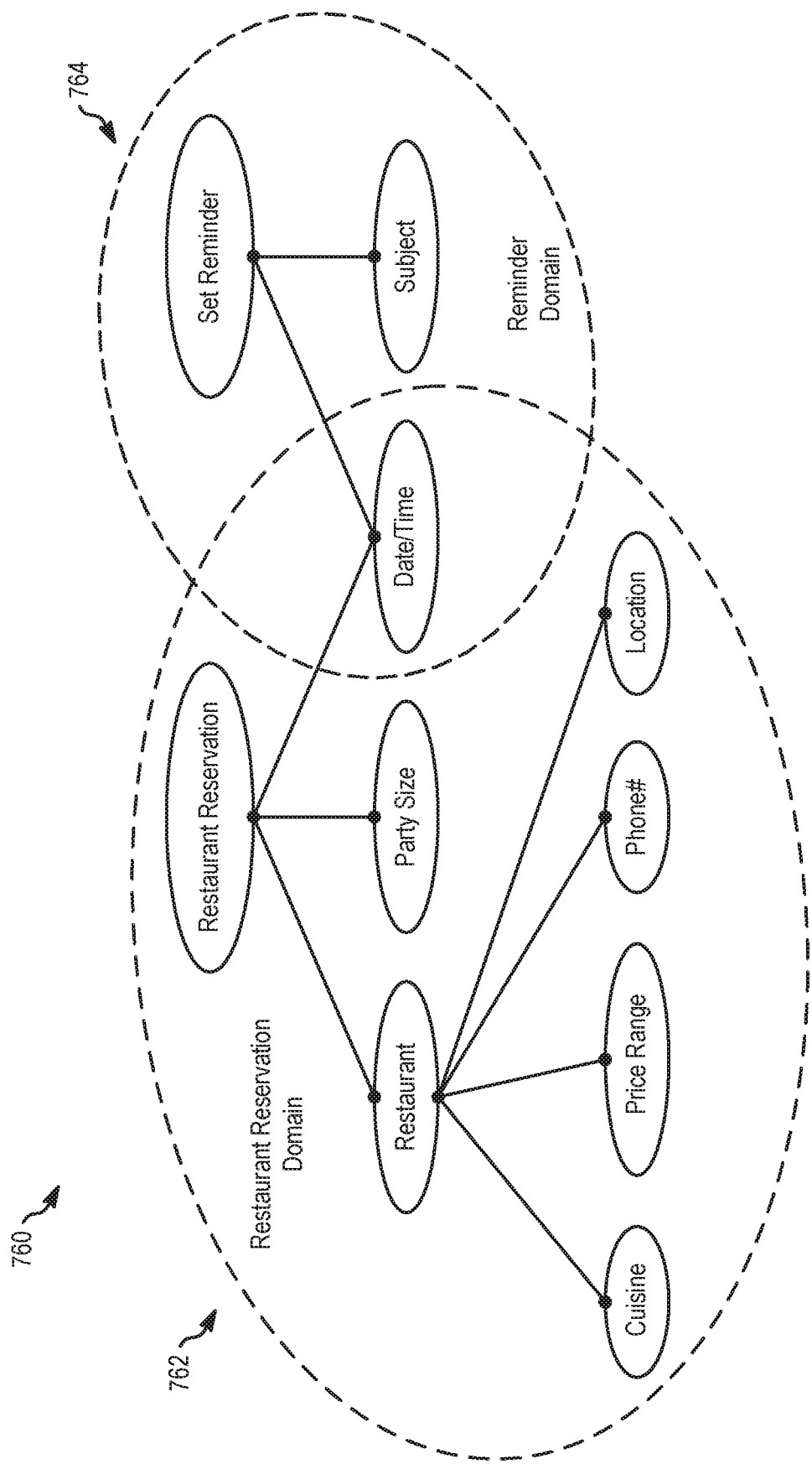
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Shortcut Running User Interface

Figure 8A:
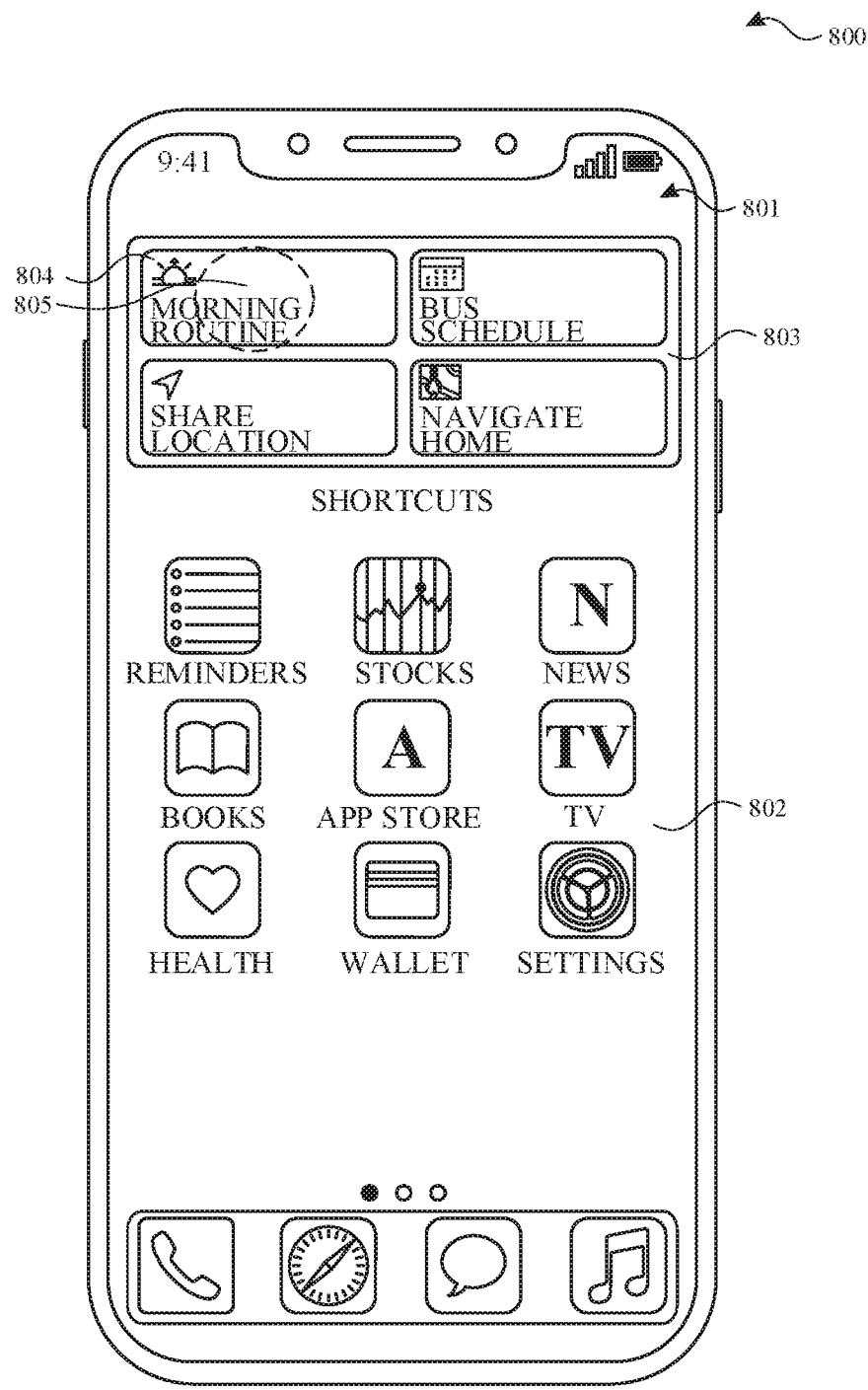
FIGS. 8A-8V illustrate exemplary user interfaces for performing a shortcut including at least one task, according to various examples.
Figure 8B:
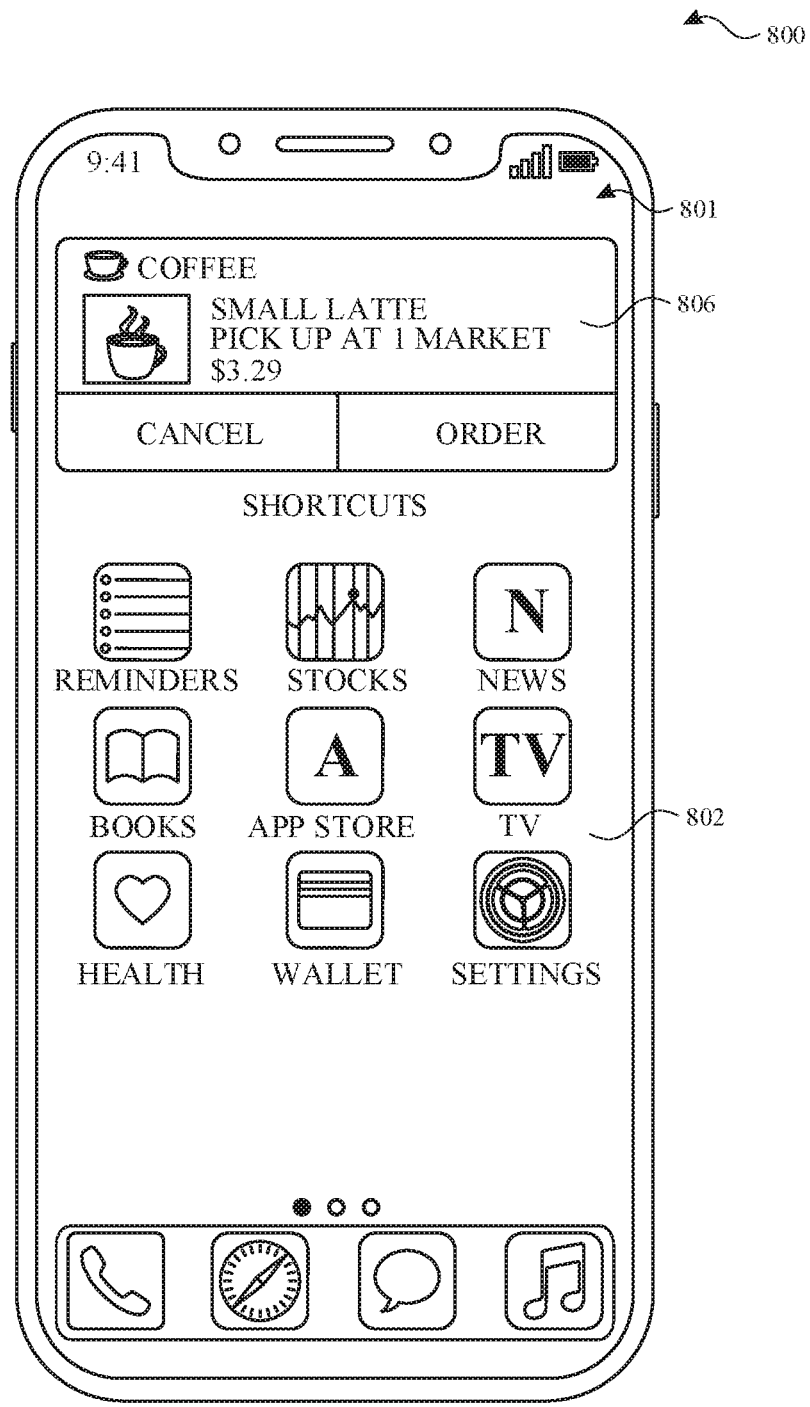
Figure 8C:
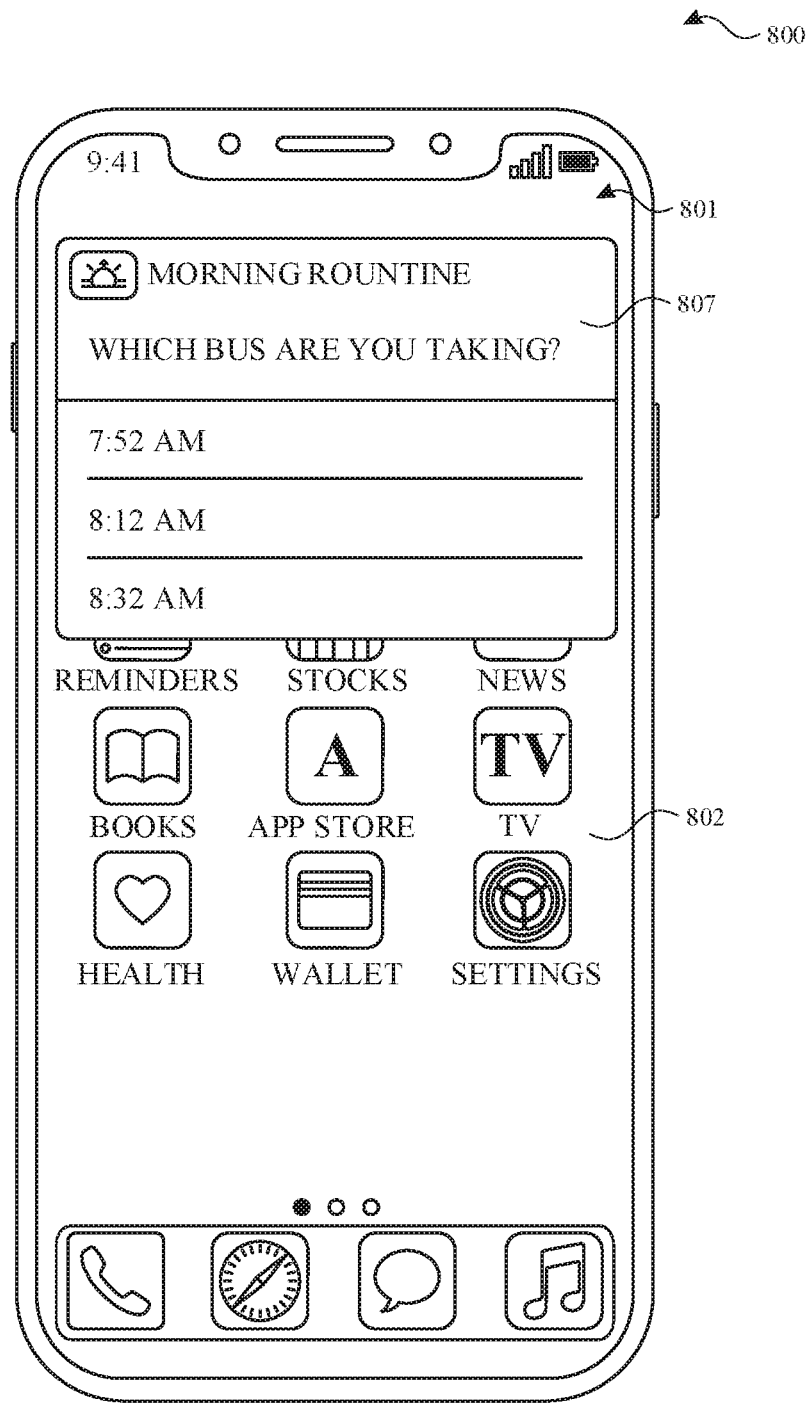
Figure 8D:
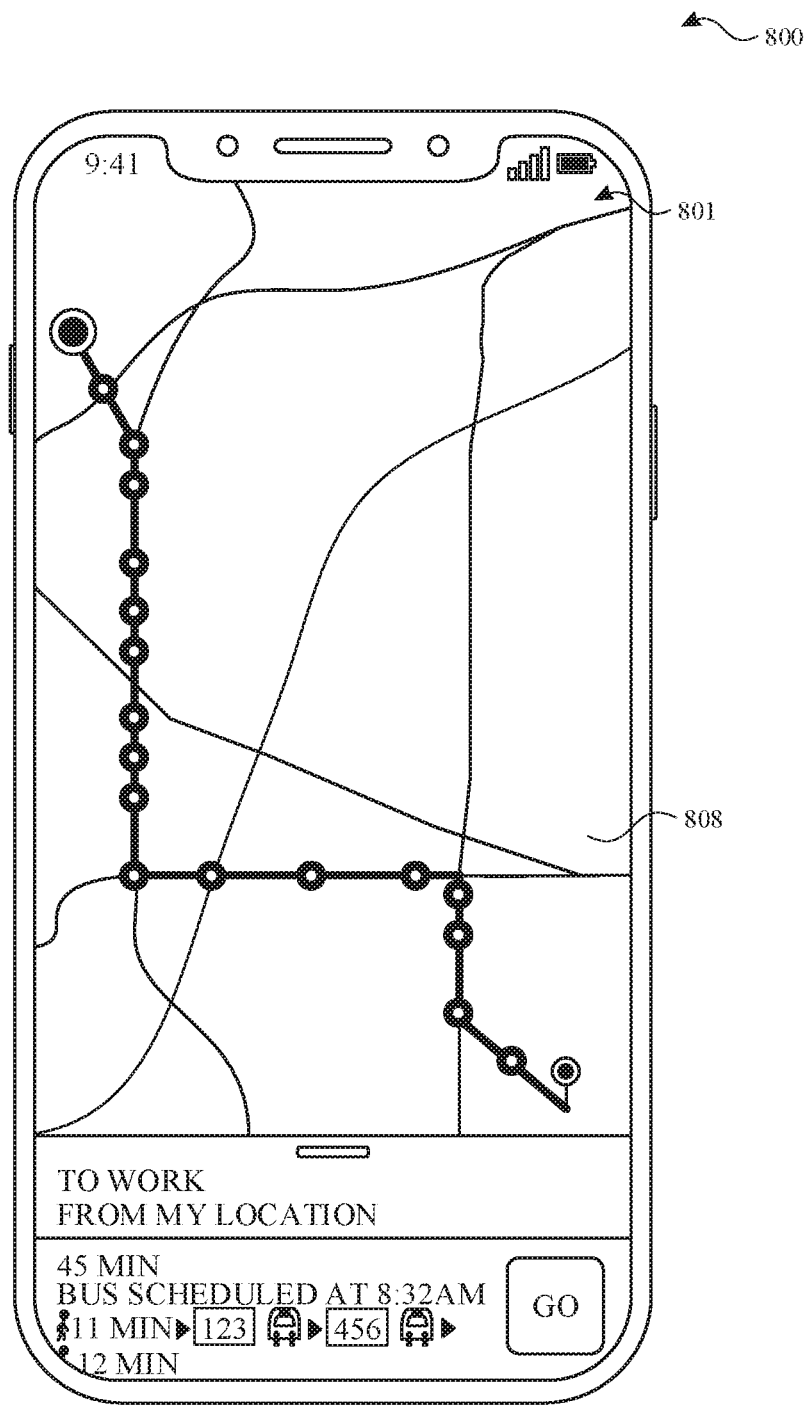
Figure 8E:
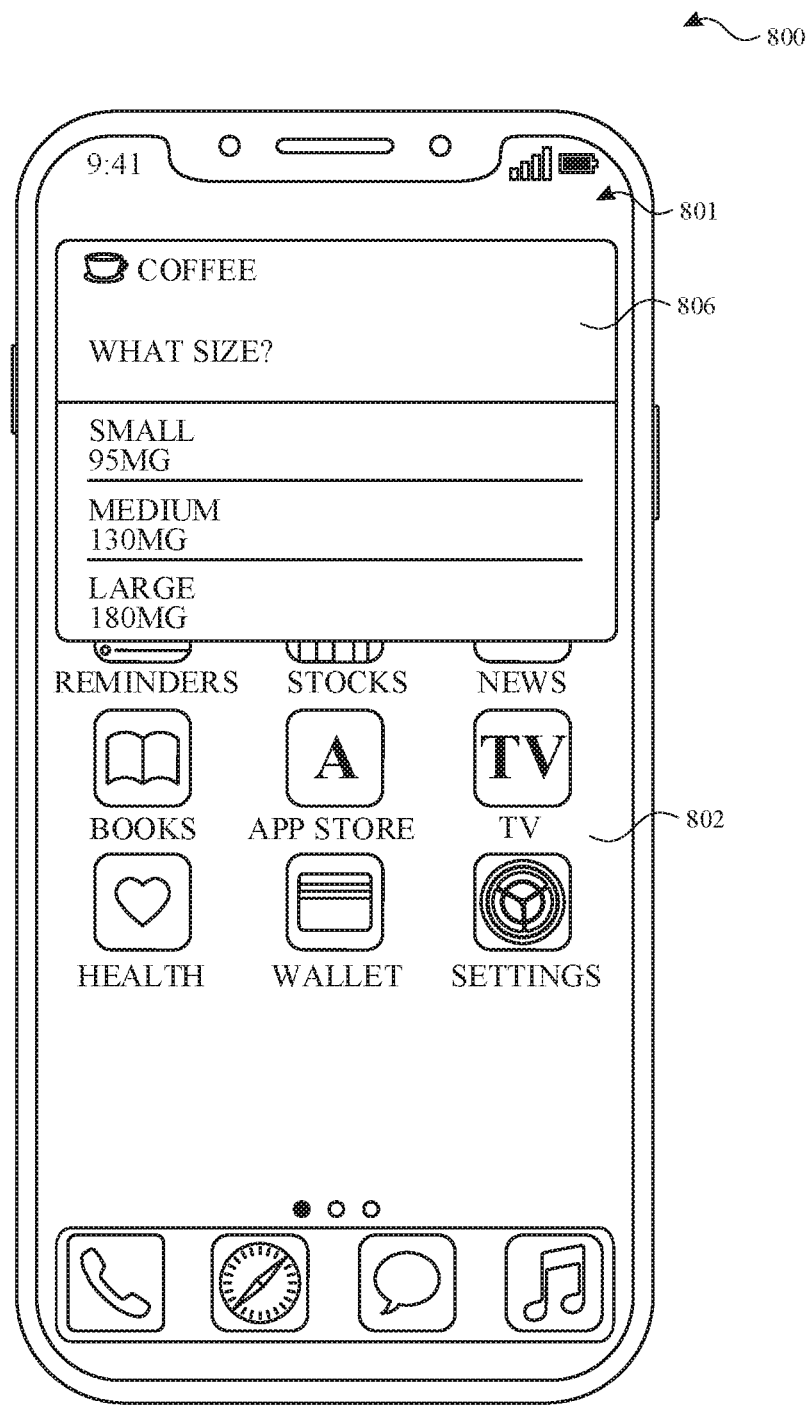
Figure 8F:
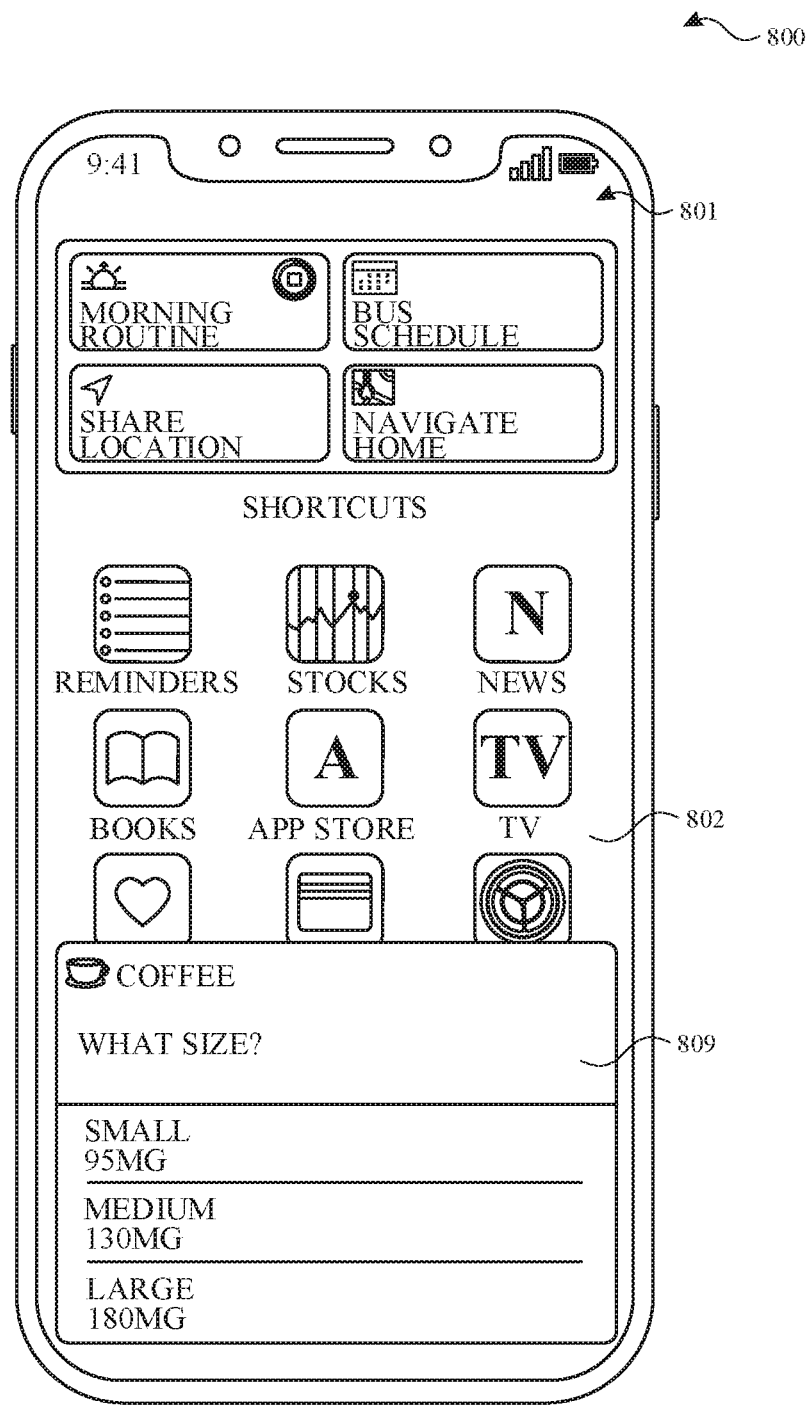
Figure 8G:
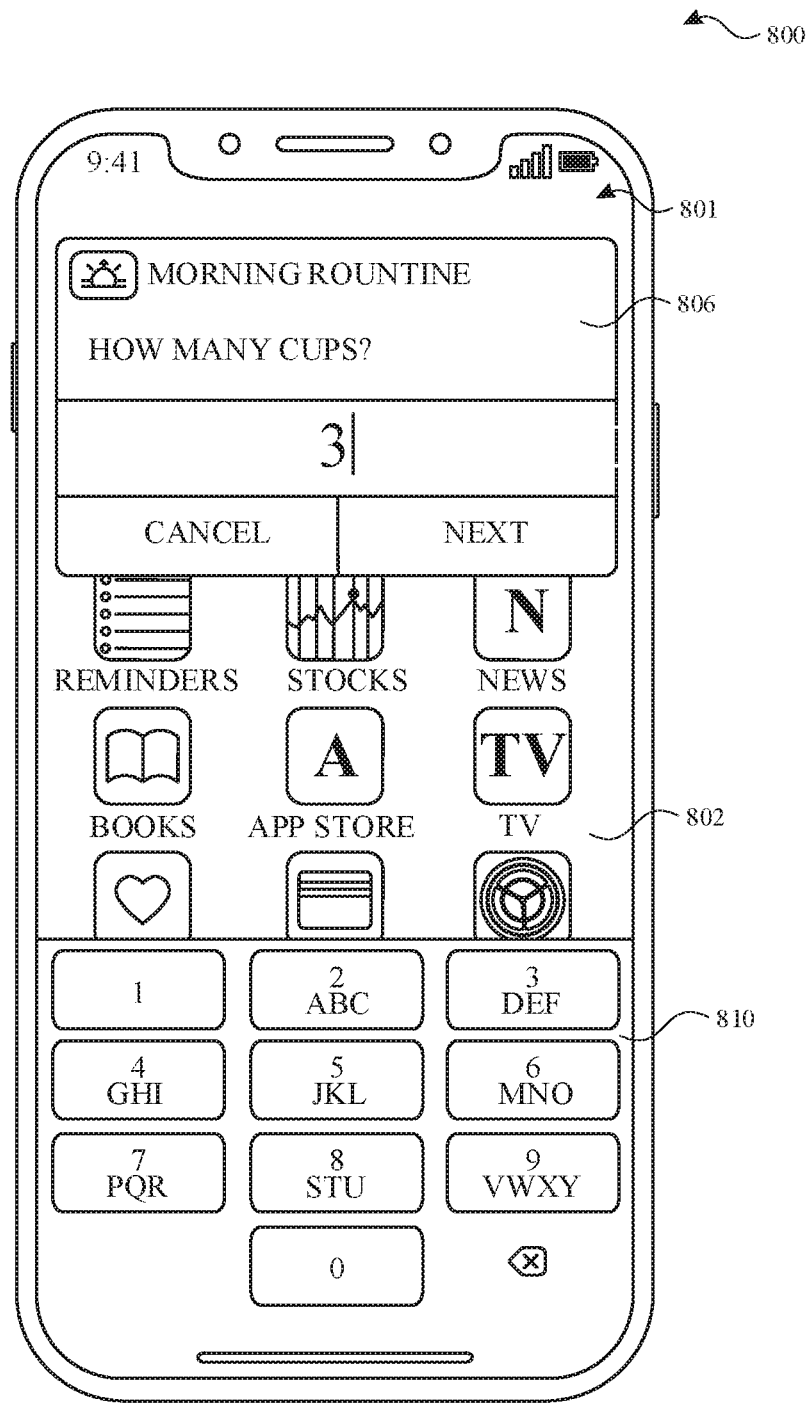
Figure 8H:
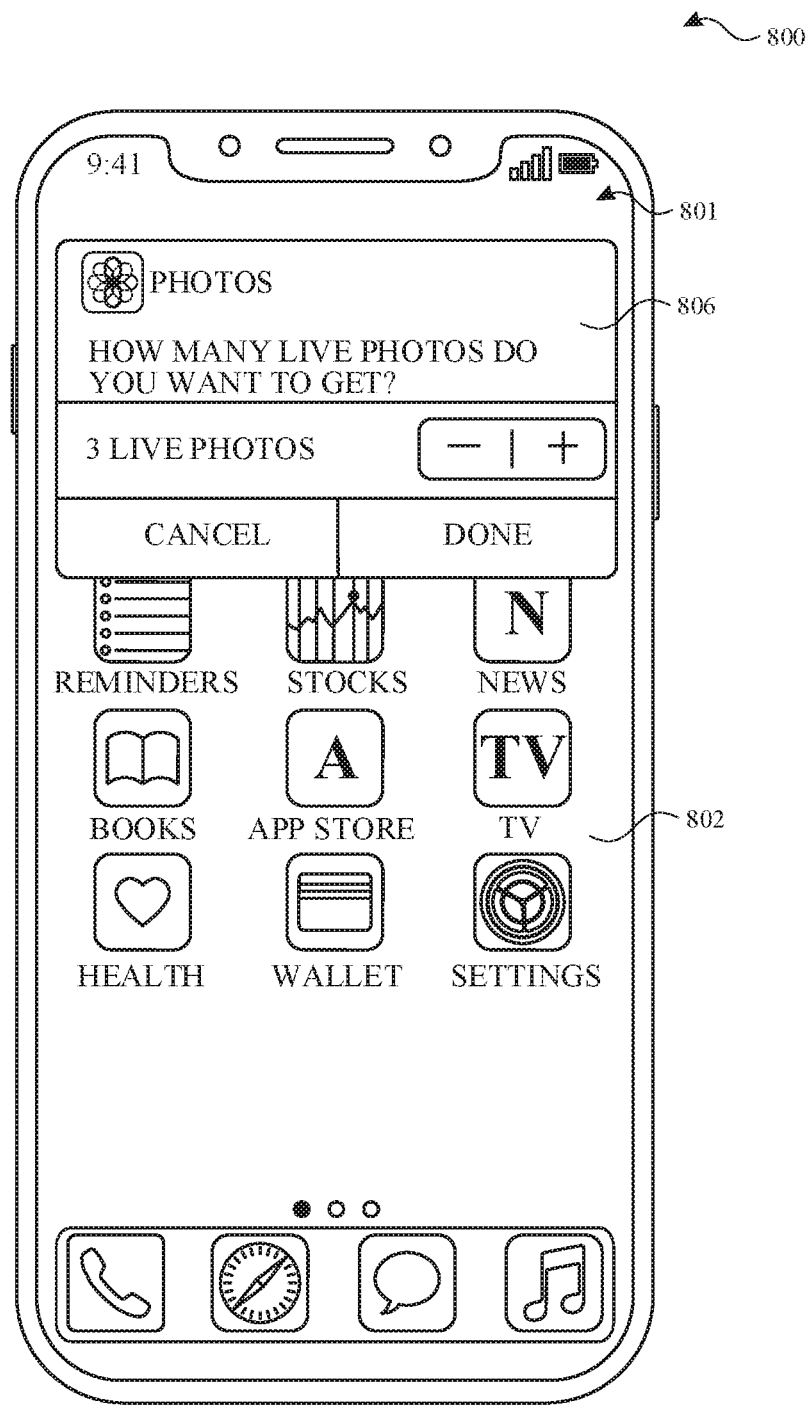
Figure 8I:
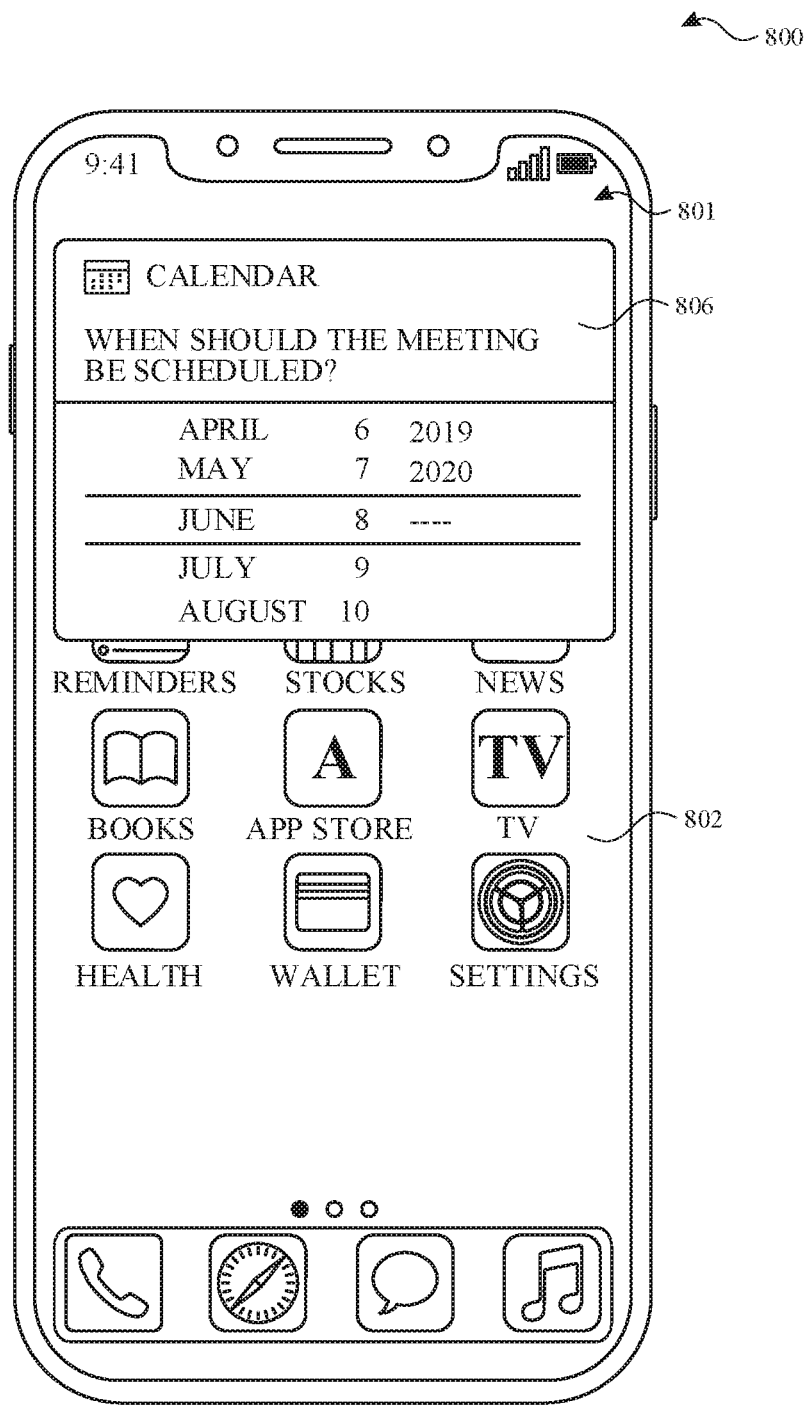
Figure 8J:
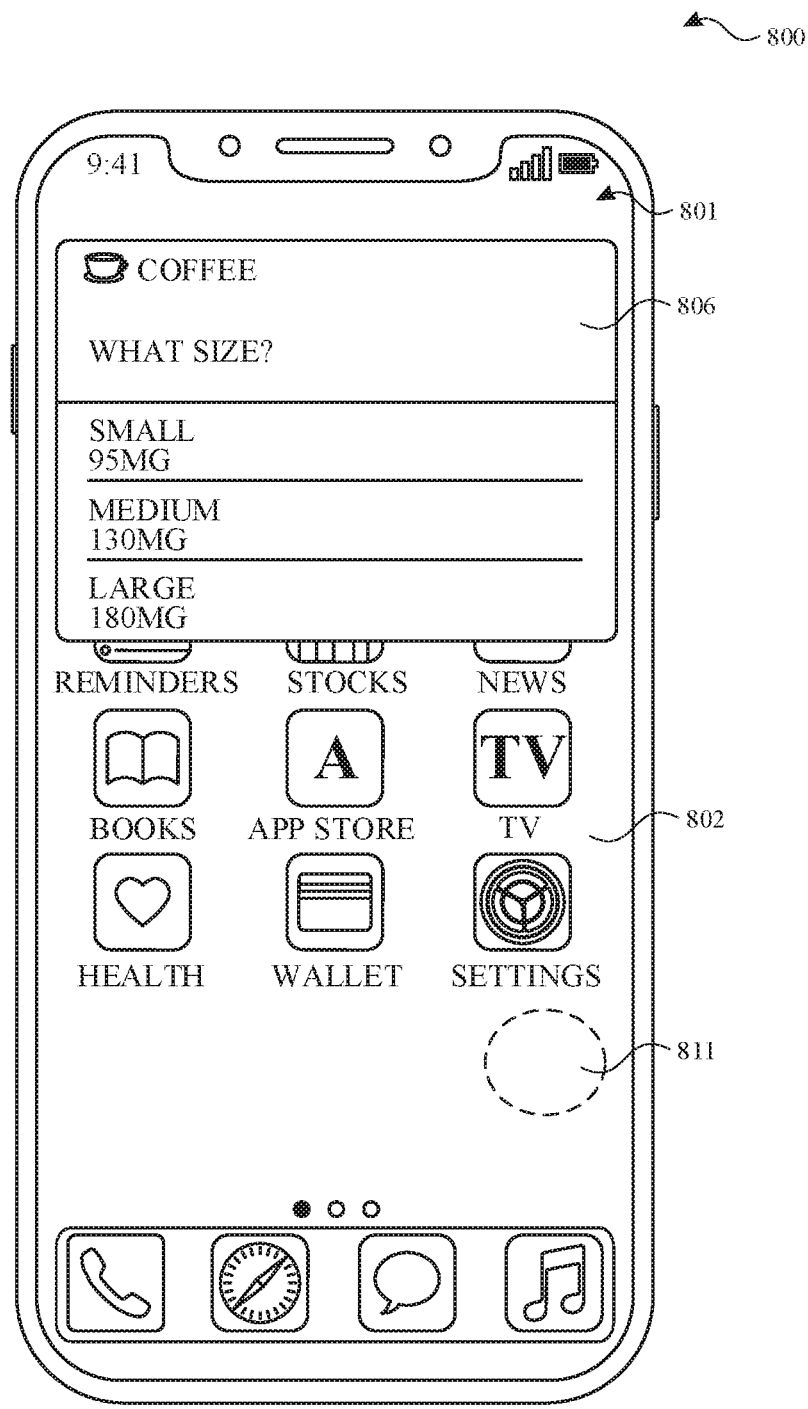
Figure 8K:
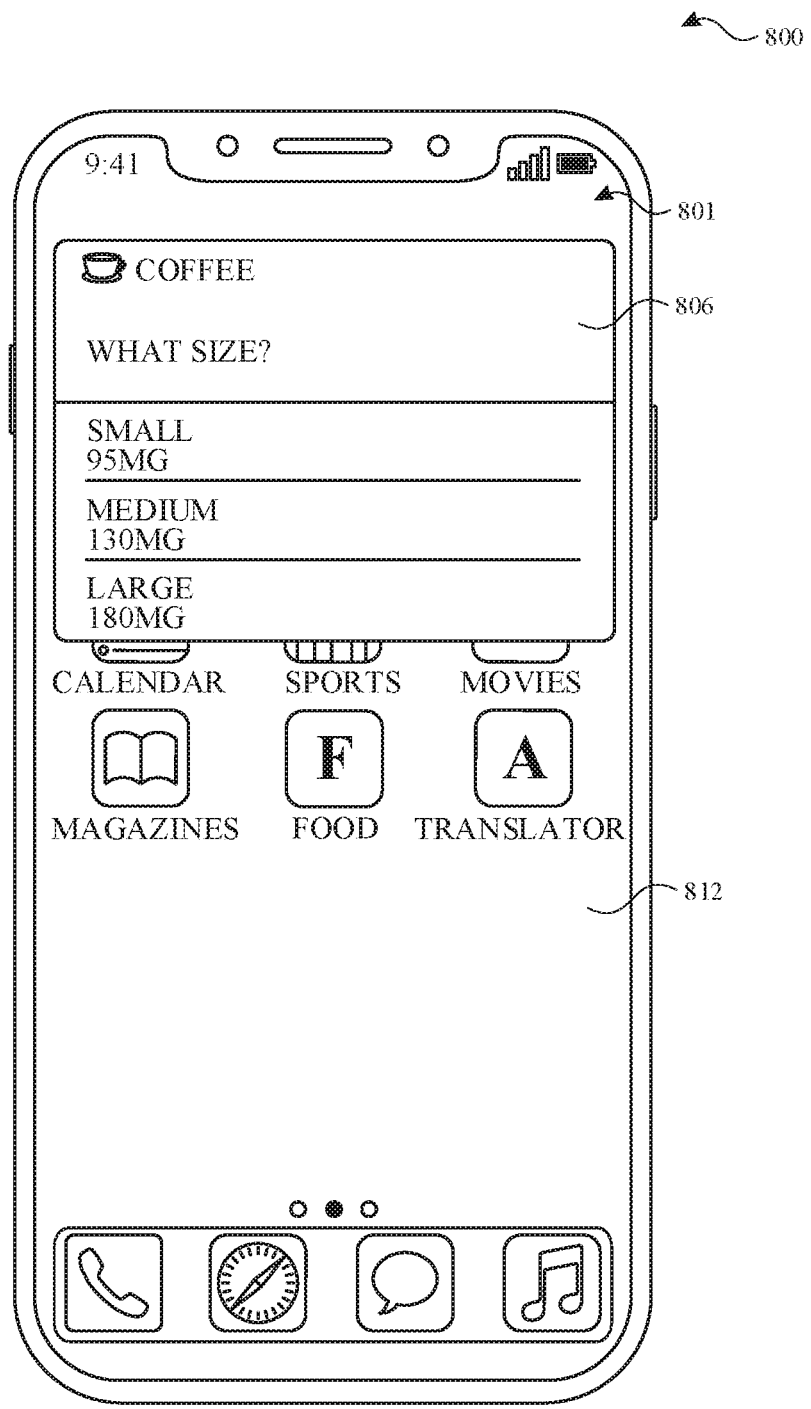
Figure 8L:
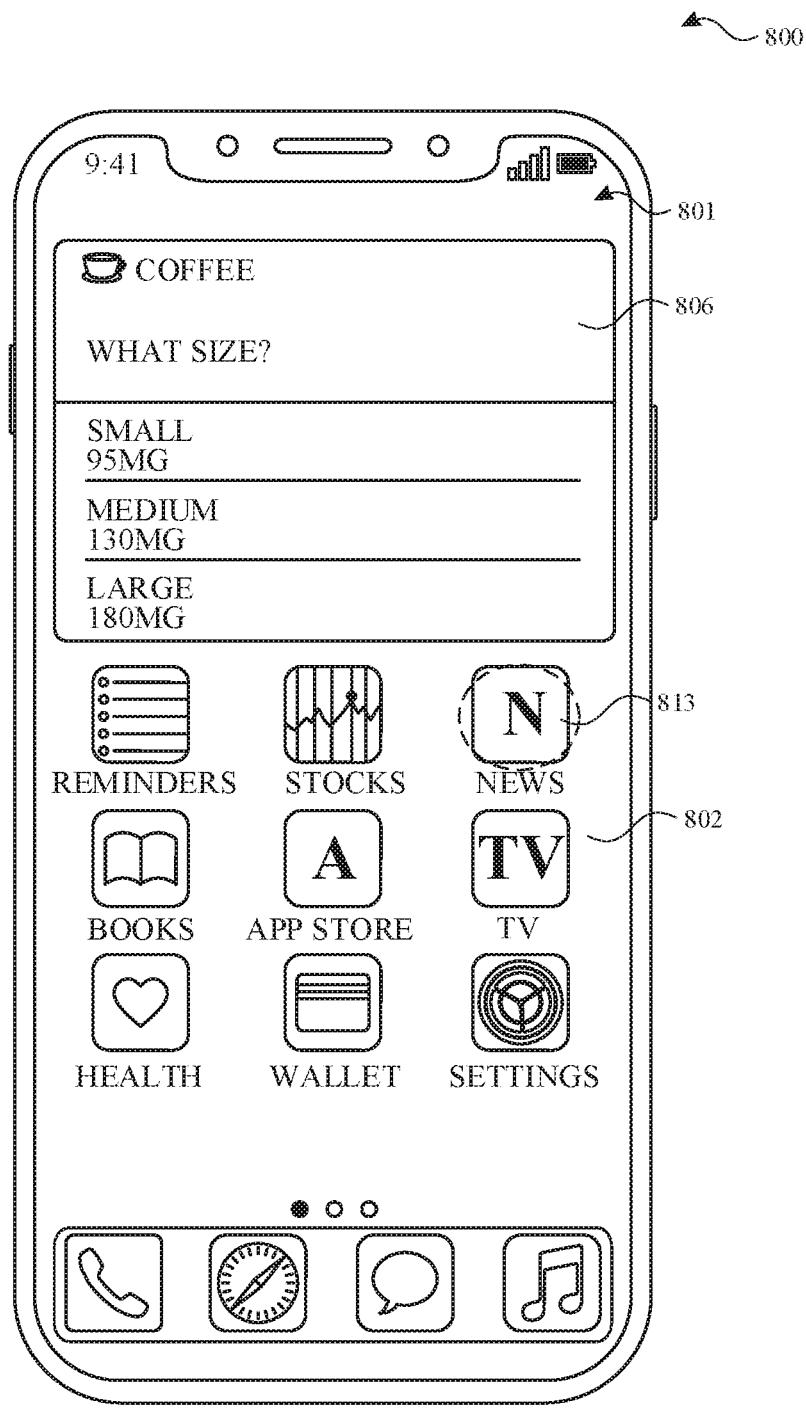
Figure 8M:
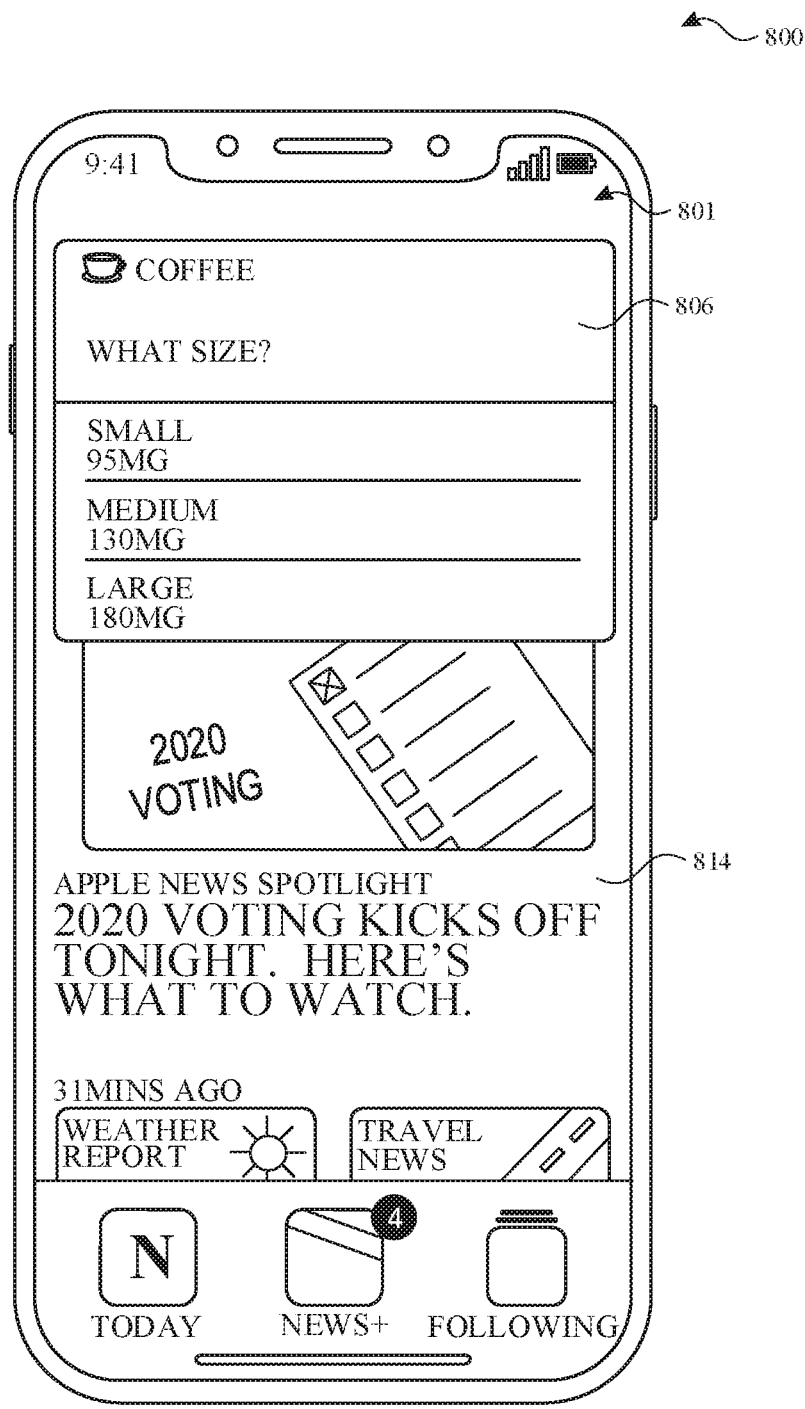
Figure 8N:
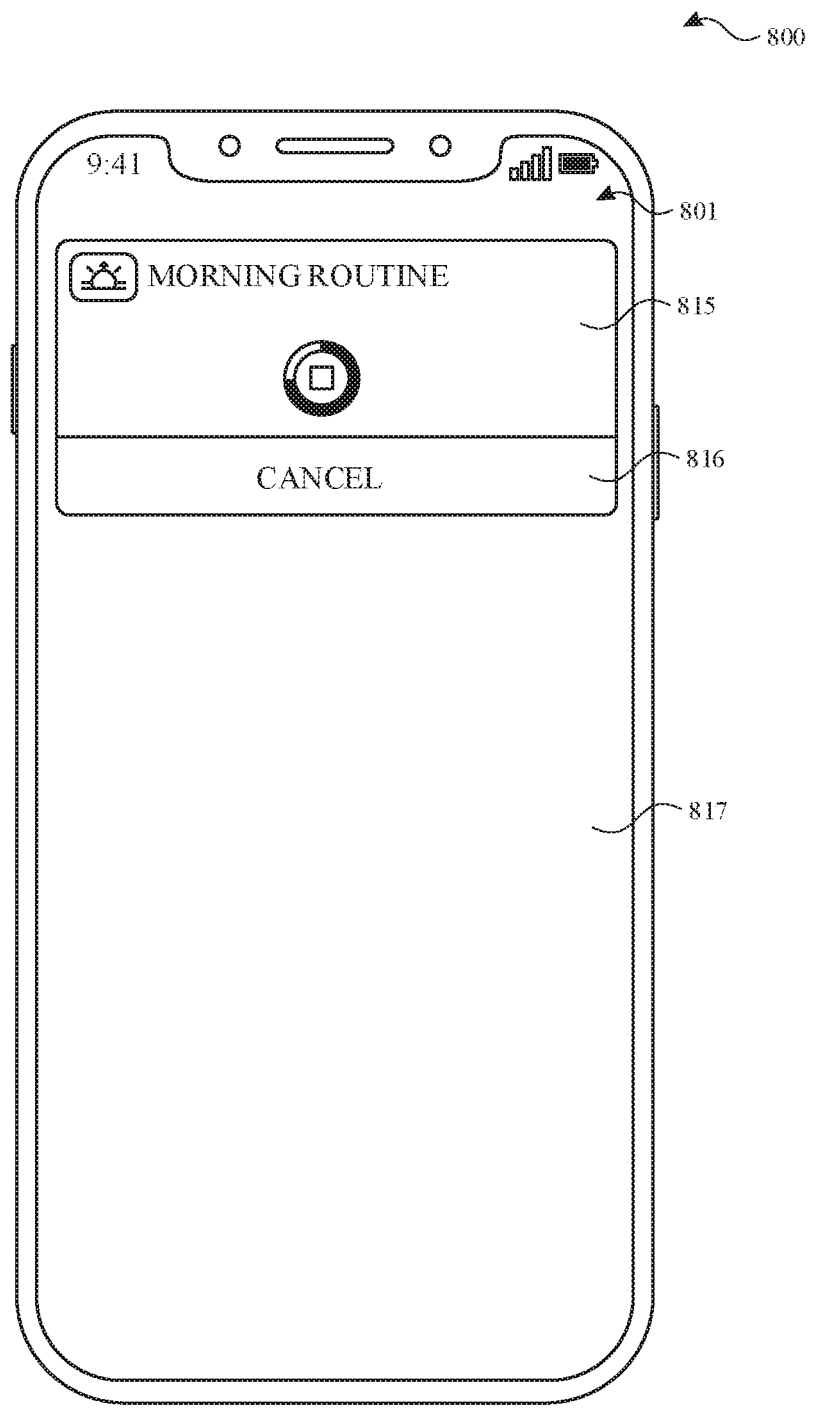
Figure 8O:
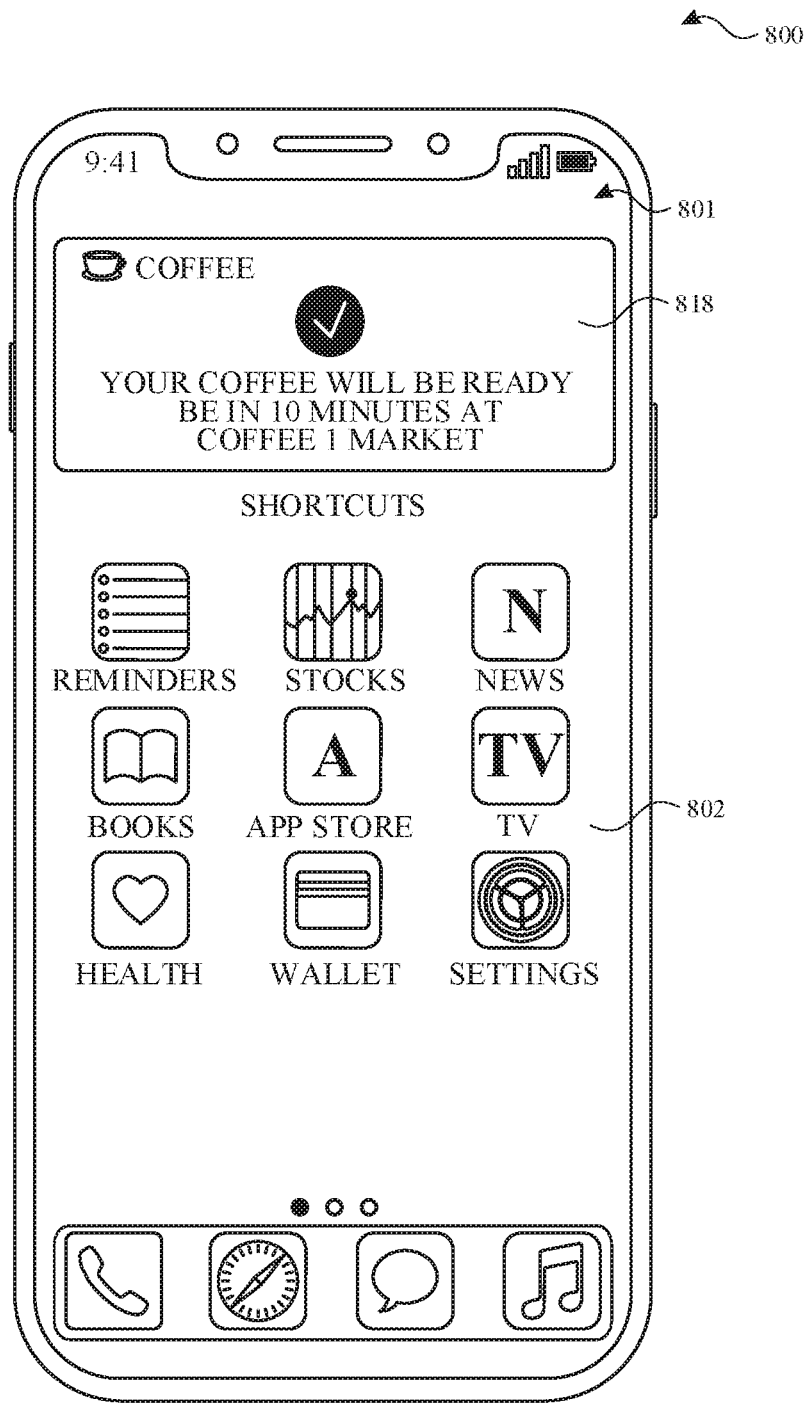
Figure 8P:
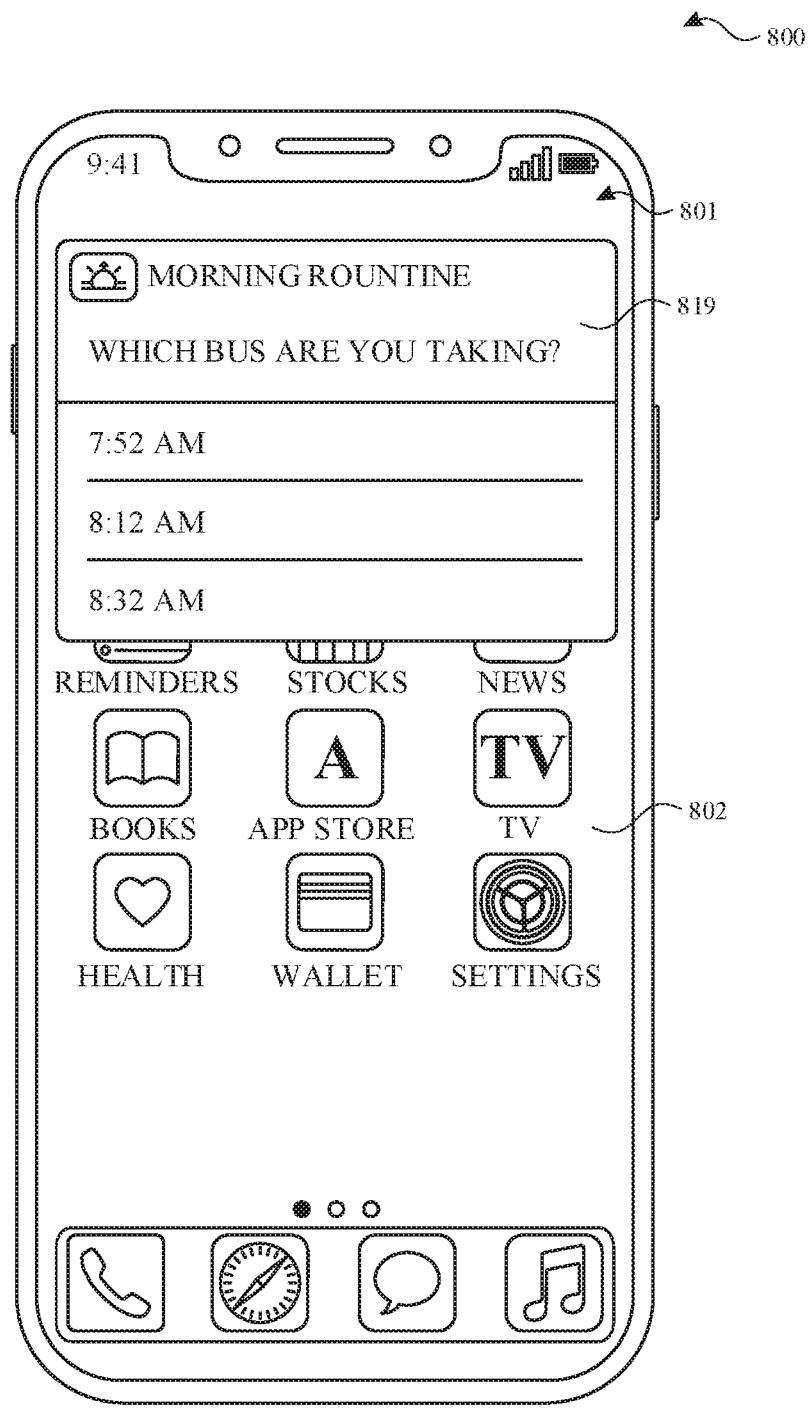
Figure 8Q:
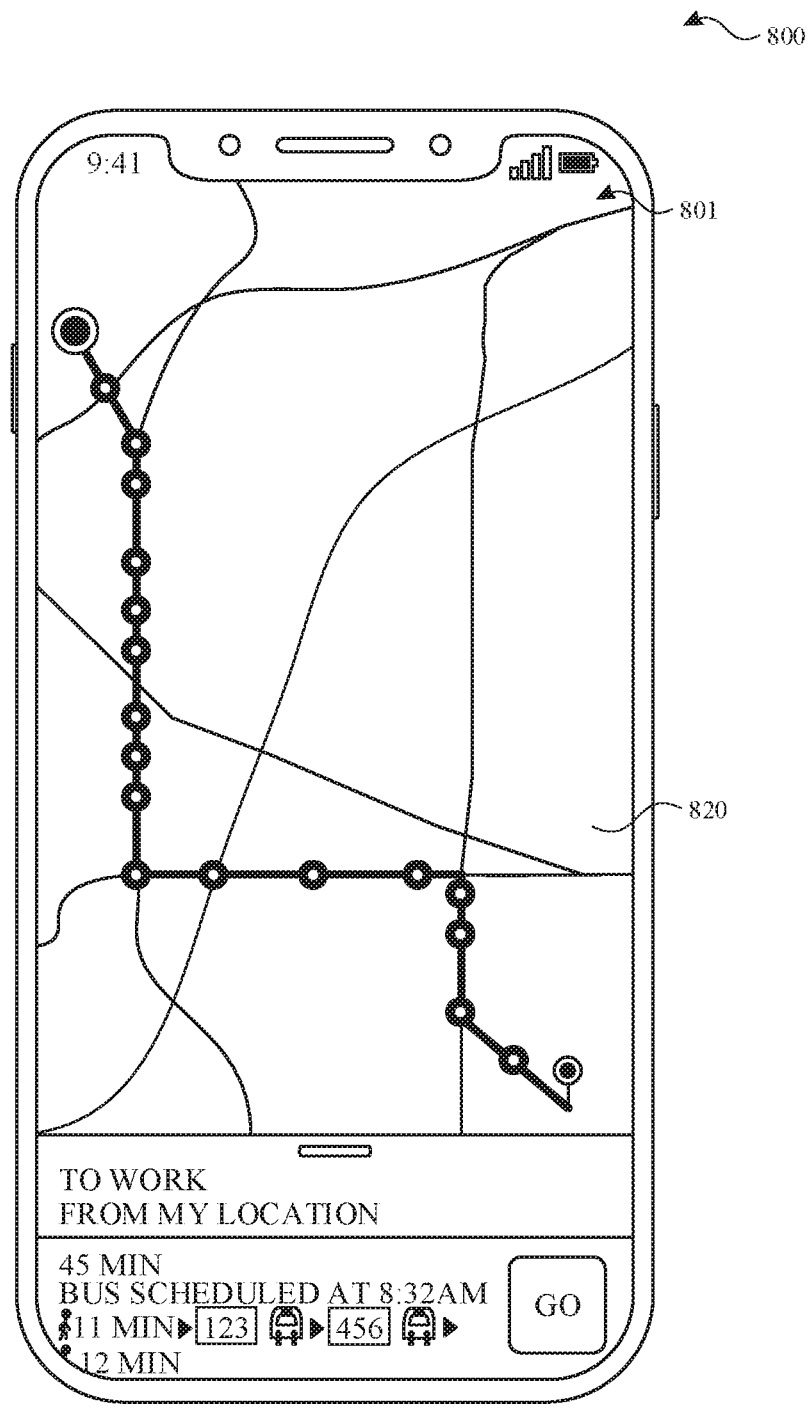
Figure 8R:
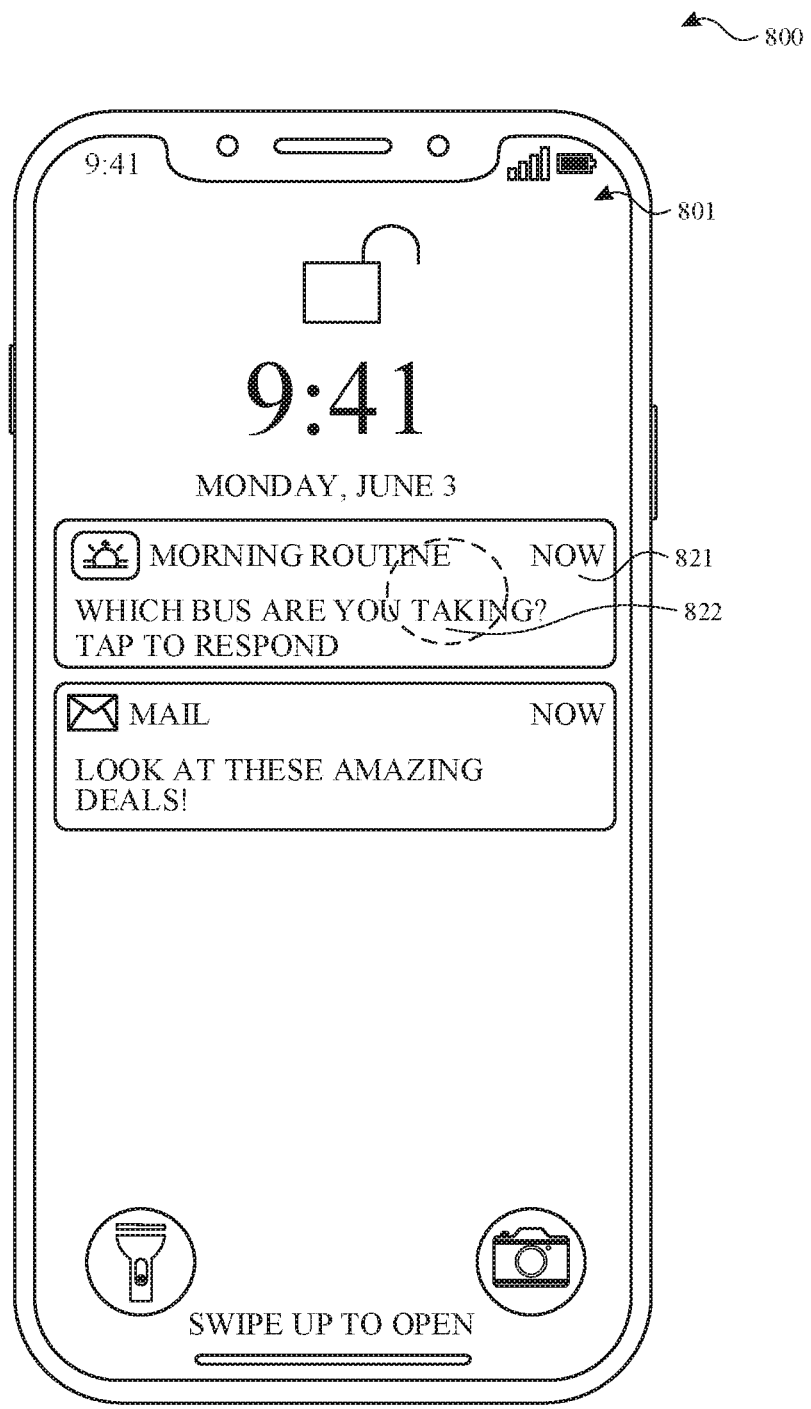
Figure 8S:
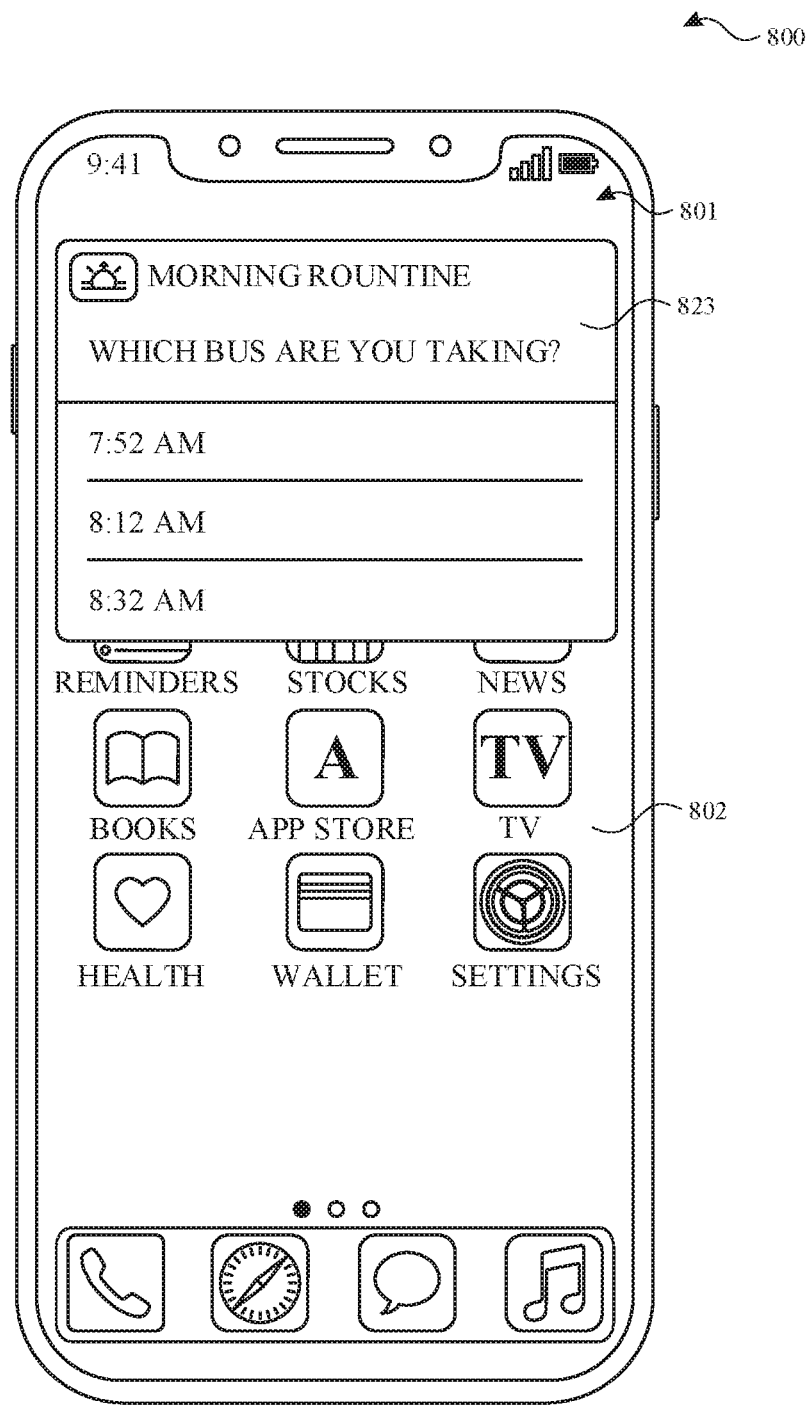
Figure 8T:
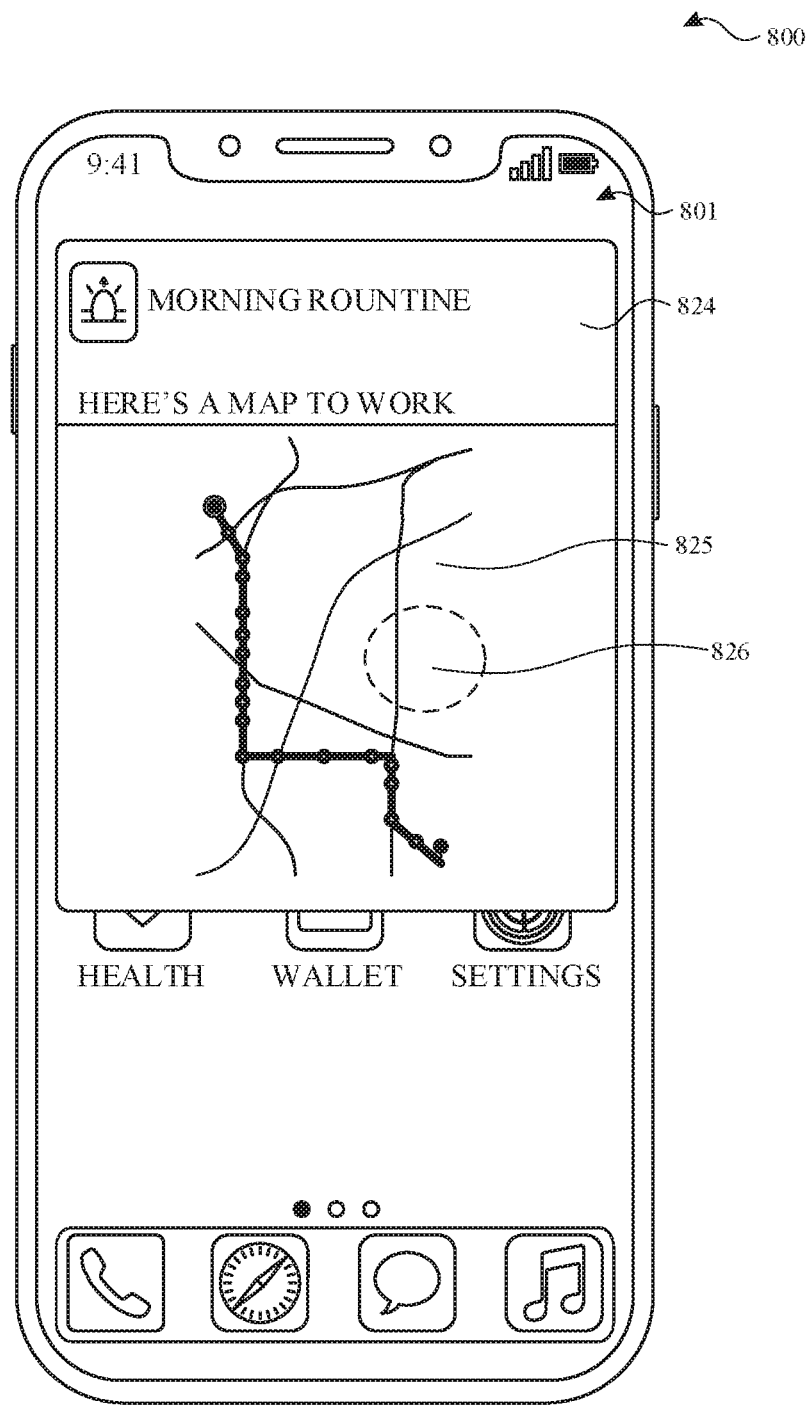
Figure 8U:
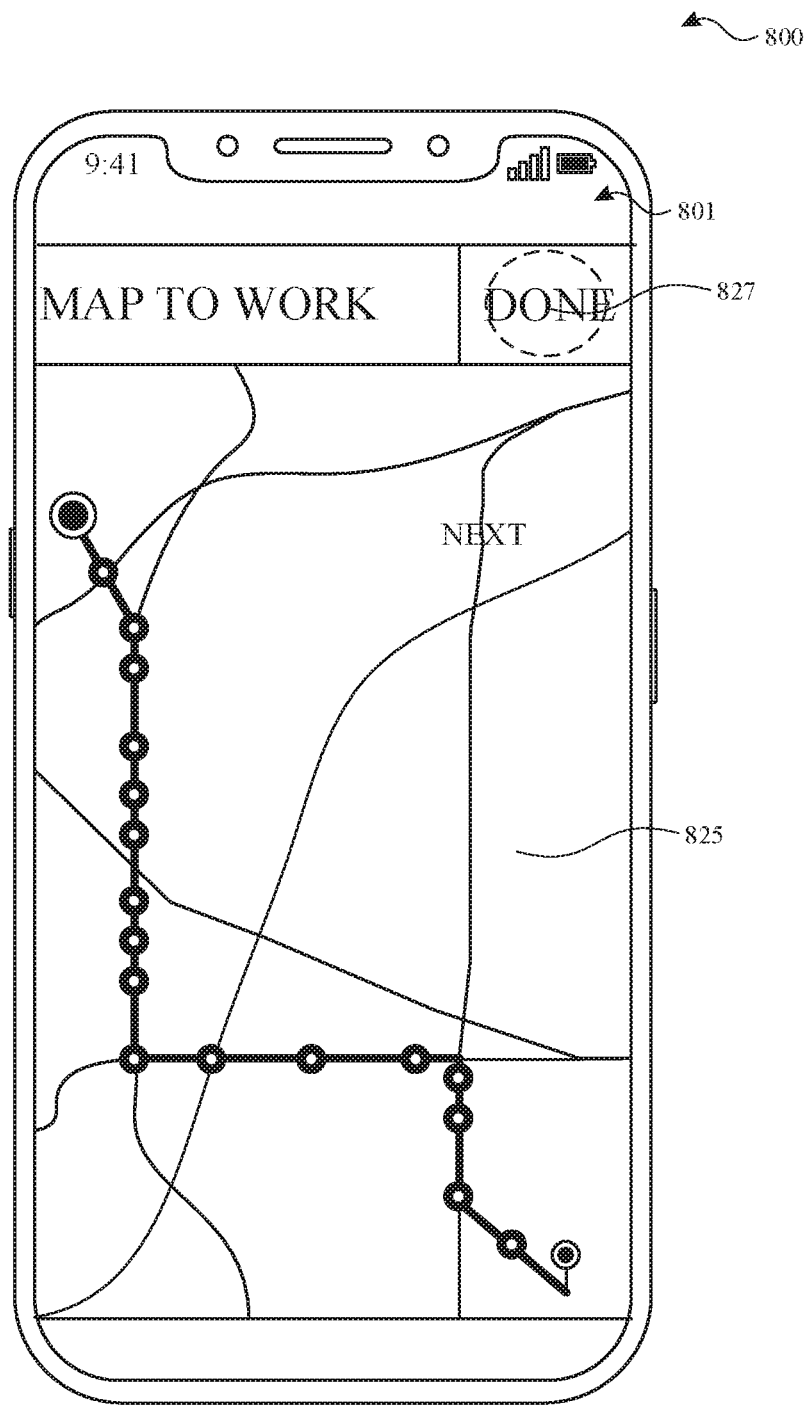
Figure 8V:
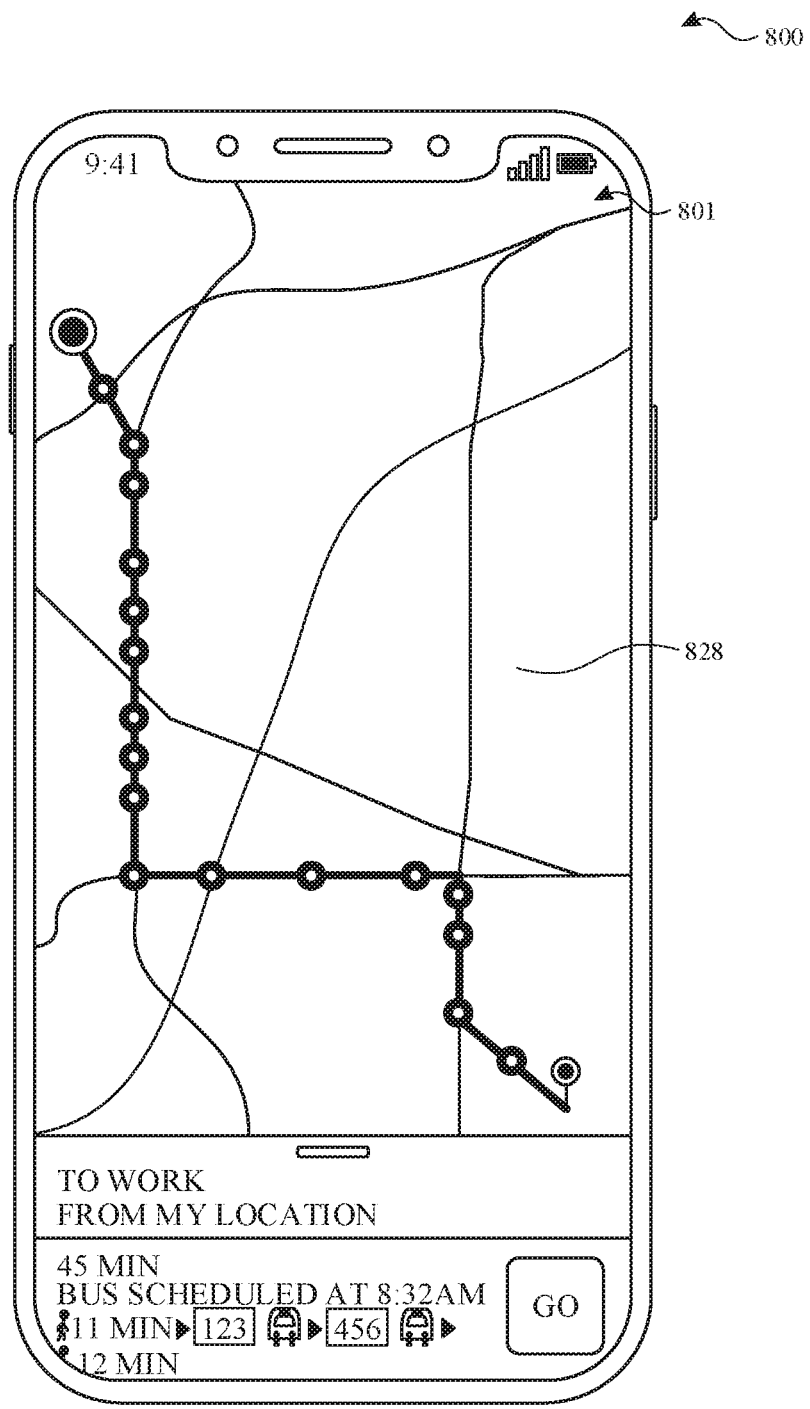

FIGS. 8A-8V illustrate exemplary user interfaces for performing a shortcut including at least one task, according to various examples. The user interfaces in these figures are used to illustrate the processes described below.

FIG. 8A illustrates an electronic device 800 (e.g., device 104, device 122, device 200, device 600, or device 700). In the non-limiting exemplary example illustrated in FIGS. 8A-8F, electronic device 800 is a smartphone. In other examples, electronic device 800 can be a different type of electronic device, such as a wearable device (e.g., a smartwatch). In some examples, electronic device 800 has a display 801, one or more input devices (e.g., touchscreen of display 801, a button, a microphone), and a wireless communication radio. In some examples. electronic device 800 includes a plurality of cameras. In some examples, electronic device 800 includes only one camera. In some examples, electronic device 800 includes one or more biometric sensors which, optionally, include a camera, such as an infrared camera, a thermographic camera, or a combination thereof.

In FIG. 8A, the electronic device displays, on display 801, a user interface 802 including a shortcut widget 803. In some examples, shortcut widget 803 is located in a predetermined portion of user interface 802. For example, as shown in FIG. 8A, shortcut widget 803 may be located at the top of user interface 802. In some examples, the predetermine portion of user interface 802 that includes shortcut widget 803 is set by a user. In some examples, the user may select a portion of user interface 802 and then indicate that shortcut widget 803 should be placed there. In some examples, the user may select shortcut widget 803 and indicate that shortcut widget 803 should be placed in the predetermined portion of user interface 802, e.g., by dragging shortcut widget 803 to the selected portion.

As illustrated in FIG. 8A, shortcut widget 803 can include shortcut affordance 804 corresponding to a morning routine shortcut. In some examples, shortcut widget 803 includes a plurality of shortcut affordances, each shortcut affordance of the plurality of shortcut affordances corresponding to a different shortcut. In some examples, shortcut affordances are associated with any number of shortcuts including but not limited to navigating to a location, reviewing a bus schedule, sharing the user's location, placing a phone call, sending a message, going to bed, or attending an event (e.g., a sporting event, a concert, etc.). In some examples, shortcut affordance 804 is included in the plurality of shortcut affordances.

In some examples, shortcut affordance 804 is an affordance that corresponds to a task sequence to be performed when a shortcut criteria associated with the task sequence is met. In some examples, the task sequence includes one or more tasks to be performed when the shortcut criteria associated with the task sequence is met. For example, as discussed in more detail below, the shortcut "morning routine" may be associated with a task sequence including the tasks of ordering coffee and getting directions to work. Accordingly, when shortcut criteria associated with "morning routine" is met (e.g., shortcut affordance 804 is selected) the task sequence is performed by first performing the task of ordering coffee and then performing the task of getting directions to work.

In some examples, the one or more tasks associated with the task sequence are to be performed in a predetermined order when the shortcut criteria associated with the task sequence is met. In some examples, the shortcut criteria and the one or more tasks are associated with the task sequence during a shortcut creation process. In some examples, the shortcut criteria and the one or more tasks are associated with the task sequence created by a user. Additional description of the creation of shortcuts can be found in U.S. application Ser. No. 16/146,978 filed Sep. 28, 2018 and entitled "ACCELERATED TASK PERFORMANCE," and U.S. application Ser. No. 16/592,906 filed Oct. 4, 2019, entitled "USER ACTIVITY SHORTCUT SUGGESTIONS," the contents of which are hereby incorporated by reference in their entirety.

In some examples, the shortcut criteria associated with the task sequence is met when shortcut affordance 804 is selected. For example, as shown in FIG. 8A shortcut affordance 804 may be selected with touch input 805 (e.g., a tap, press, swipe, etc.). Additional description of shortcut criteria can be found in U.S. application Ser. No. 16/146,978 filed Sep. 28, 2018 and entitled "ACCELERATED TASK PERFORMANCE," the contents of which are hereby incorporated by reference in their entirety.

In some examples, the shortcut criteria associated with the task sequence is met when a voice input including the shortcut is received. In some examples, after receiving a voice input electronic device 800 determines whether the voice input includes the shortcut. In some examples, electronic device 800 determines whether the voice input includes the shortcut by determining whether the voice input matches the shortcut. For example, electronic device 800 may receive a voice input "Let's do my morning routine," and determines that the voice input includes the shortcut "morning routine." Thus, electronic device 800 executes the task sequence associated with the "morning routine" shortcut. In some examples, electronic device 800 determines whether the voice input includes a predetermined phrase associated with the shortcut. For example, electronic device 800 may receive a voice input "Hello, good morning" and determines that the voice input includes the predetermined phrase "good morning" which was previously associated with the "morning routine" shortcut. Thus, electronic device 800 executes the task sequence associated with the "morning routine" shortcut.

In some examples, the shortcut criteria associated with the task sequence is met when electronic device 800 detects context criteria is met. In some examples, electronic device 800 detects that context criteria is met based on one or more contextual data associated with the electronic device 800. In some examples, contextual data of electronic device 800 is indicative of context (e.g., current context, previous context) of the electronic device. By way of example, contextual data may indicate various characteristics of the electronic device. For instance, contextual data may indicate a location of the electronic device, whether the electronic device is connected to a network (e.g., WiFi network), whether the electronic device is connected to one or more other devices (e.g., headphones), and/or a current time, date, and/or weekday. If the electronic device is connected to a network or device, the contextual data may further indicate a name and/or type of the network or device, respectively.

In some examples, the shortcut criteria associated with the task sequence is met when electronic device 800 is determined to be at a particular location. As described above, the current location of electronic device 800 (as well as other data) can be detected by electronic device 800 and used to determine whether context criteria is met. In this way, the location of the electronic device 800 may be considered as part of the shortcut criteria to be met before executing the task sequence.

While displaying shortcut widget 803, electronic device 800 detects a set of inputs that meet the shortcut criteria (e.g., selection of shortcut affordance 804, a voice input including the shortcut, etc., as described above). As will be described in more detail below, in response to meeting the shortcut criteria associated with shortcut affordance 804, electronic device 800 initiates a process by which the task sequence associated with the shortcut is performed and affordances associated with the task sequence are displayed.

In response to detecting the set of inputs meeting the shortcut criteria associated with the shortcut, electronic device 800 displays (e.g., replaces display of at least a portion of user interface 802), on display 801, task affordance 806 corresponding to a task of the task sequence associated with the shortcut over user interface 802, as shown in FIG. 8B. In some examples, user interface 802 is a home screen of an operating system operating on electronic device 800, as shown in FIG. 8B. In some examples, user interface 802 is a lock screen of an operating system operating on electronic device 800. In some examples, user interface 802 is an application interface of an application different from an application associated with task affordance 806. For example, user interface 802 may be an application interface for reading news, while task affordance 806 is associated with an application for ordering coffee.

In some examples, task affordance 806 descends from the top of user interface 802. In some examples, task affordance 806 covers a predetermined portion of user interface 802. In some examples, task affordance 806 covers the portion of user interface 802 on which shortcut widget 803 is displayed.

In some examples, task affordance 806 is provided by the operating system operating on electronic device 800. For example, electronic device 800 may perform the task associated with task affordance 806 by using the operating system, a virtual assistant, or other first party application associated with electronic device 800. Accordingly, the operating system or virtual assistant may provide task affordance 806 while performing the task in order to notify the user of the performance or request further information from the user, as described below.

In some examples, task affordance 806 is provided by an application associated with task affordance 806. For example, when the shortcut "morning routine" is created, a user may specify that a specific coffee application should be used for the task of ordering coffee. Accordingly, the coffee application may provide a task affordance to be used during the performance of "morning routine" as task affordance 806. Thus, during performance of the task of ordering coffee, electronic device 800 provides task affordance 806 received from the coffee ordering application over user interface 802. In some examples, task affordance 806 incorporates information provided from an application associated with task affordance 806. For example, task affordance 806 may be associated with a coffee ordering application and thus may incorporate specific sizes of coffee provided from the coffee ordering application when prompting the user as discussed below.

Electronic device 800 further determines whether the task associated with task affordance 806 can be completed without displaying (opening, focusing on) an application interface corresponding to the task. In some examples, the application interface includes a user interface presented when the application is launched (e.g., opened, started, etc.) and made the focus of electronic device 800. For example, if a maps application is selected on a home screen of electronic device 800 (e.g., user interface 802), the home screen is replaced with an interface of the maps application.

In some examples, electronic device 800 determines whether the task associated with task affordance 806 can be completed without displaying the application interface corresponding to the task by determining whether the task of the task sequence and all parameters required to complete the task have been previously specified (e.g., during creation of the shortcut) or can be determined from context information without further user input. If the task and all parameters have been previously specified or can be determined without user input then electronic device 800 can determine that displaying an application interface may not be required to perform the task.

In some examples, electronic device 800 determines whether the task associated with task affordance 806 can be completed without displaying the application interface corresponding to the task by determining whether information to be displayed during performance of the task can be displayed in task affordance 806. In accordance with a determination that the information to be displayed will be viewable and interacted with in task affordance 806, electronic device 800 determines that displaying the application interface is not necessary to complete performance of the task. For example, when the shortcut "morning routine" is launched (e.g., by meeting criteria associated with the "morning routine" shortcut), electronic device 800 may determine that the only information to be displayed is parameters related to a coffee order and a confirmation prompt, as shown in FIG. 8B. Accordingly, electronic device 800 determines that an application interface does not need to be provided to perform the task of ordering coffee because the required information can be displayed in task affordance 806.

When electronic device 800 determines that the task associated with task affordance 806 can be completed without displaying the application interface corresponding to the task, electronic device 800 performs the task associated with task affordance 806 while continuing to display task affordance 806 over user interface 802. In some examples, while performing the task associated with task affordance 806, electronic device 800 updates task affordance 806 to include information about the task. For example, when the shortcut "morning routine" is invoked and the task sequence associated with "morning routine" is performed, electronic device 800 may display in task affordance 806 a progress indicator including information (e.g., the size, type, location making the coffee, time until ready, etc.) about the coffee order.

In some examples, performing the task associated with task affordance 806 includes providing a prompt to confirm performance of the task, as shown in task affordance 806 in FIG. 8B. In some examples, in response to detecting an input confirming performance of the task, the electronic device 800 performs the task. For example, when task affordance 806 is provided as shown in FIG. 8B and a user selects the order button, electronic device 800 proceeds to perform the task of ordering the coffee by sending the order of a small latte to the coffee shop at 1 Market.

In some examples, a prompt to cancel performance of the task is also shown in task affordance 806, as shown in FIG. 8B. In response to detecting an input to cancel performance of the task, electronic device 800 ceases performance of the task. For example, when task affordance 806 is provided as shown in FIG. 8B and a user selects the cancel button, electronic device 800 ceases performance of the task of ordering the coffee. In some examples, in response to detecting an input to cancel performance of the task, electronic device 800 ceases performance of the sequence of tasks associated with the shortcut and ceases display of task affordance 806. For example, when the user selects the cancel button included in task affordance 806, electronic device may cease performance of the current task of ordering the coffee and rather than perform any other tasks in the task sequence, cease display of affordance 806 returning display 801 to the state before the shortcut criteria was met.

In some examples, in response to detecting an input to cancel performance of the task, electronic device 800 proceeds to a second task of the task sequence associated with the shortcut. For example, when the selects the cancel button included in task affordance 806, electronic device may cease performance of the current task of ordering the coffee and proceed to the next task in the task sequence associated with "morning routine" of retrieving directions to work. Accordingly, electronic device 800 may display task affordance 807 requesting which bus the user is taking, as shown in FIG. 8C, to perform the task of retrieving directions to work.

In some examples, electronic device 800 determines that the task associated with task affordance 806 cannot be completed without displaying the application interface associated with the task. In some examples, electronic device 800 determines that the task associated with task affordance 806 cannot be completed without displaying the application interface by determining that the information to be displayed will not be easily viewable in task affordance 806. For example, the task sequence associated with the shortcut "morning routine" may include the task of providing directions to work based on a bus the user will take. Accordingly, when the task of providing directions is executed, electronic device 800 may determine that displaying the directions requires a maps application interface, as the full directions cannot be easily displayed in task affordance 806. Thus, as discussed further below, electronic device 800 may display application interface 808 including the directions, as shown in FIG. 8D.

In some examples, electronic device 800 determines that the task associated with task affordance 806 cannot be completed without displaying the application interface by determining that additional information is required to complete the task, as discussed further below. In particular, electronic device 800 may determine that additional information is required to be input in the application interface, and that any prompt for the additional information cannot be displayed in task affordance 806. For example, in the case of providing directions to work electronic device 800 may be unable to determine its (and in turn the user's) current location. Accordingly, electronic device 800 may determine that a prompt for the current location is to be displayed to execute the task of providing directions and that such a prompt requires the application interface. Thus, electronic device 800 may display application interface 808 to prompt the user to select and/or confirm the current location.

In some examples, when electronic device 800 determines that the task associated with task affordance 806 cannot be completed without displaying application interface 808, electronic device 800 displays application interface 808 corresponding to the task and completes the task using application interface 808, as shown in FIG. 8D. In some examples, displaying application interface 808 includes opening or launching the application associated with application interface 808. For example, as discussed above, when the task of providing directions to work is being performed, electronic device 800 may open a maps application and provide the application interface 808 including a map of the directions. In some examples, displaying application interface 808 includes replacing user interface 802 on display 801 with application interface 808.

In some examples, electronic device 800 detects an input indicating that the task associated with application interface 808 is completed. For example, while displaying application interface 808 including directions to work, the user may provide an input indicating that they are done looking at the directions. As another example, while displaying application interface 808 including directions to work, electronic device 800 may detect that electronic device 800 has reached the location marked as work based on contextual data (e.g., GPS information).

In some examples, in response to detecting the input indicating that the task associated with application interface 808 is completed, electronic device 800 ceases display of application interface 808 and displays user interface 802. In some examples, after displaying user interface 802, electronic device 800 performs a second task of the task sequence associated with the shortcut, as discussed further below.

In some examples, application interface 808 includes a cancel affordance. In some examples, in response to detecting selection of the cancel affordance, electronic device 800 ceases performance of the task. For example, when a user selects the cancel affordance, electronic device 800 ceases performance of the task of providing directions. In some examples, in response to detecting an input to cancel performance of the task, electronic device 800 ceases performance of the sequence of tasks associated with the shortcut and ceases display of application interface 808 and task affordance 806. For example, when the user selects a cancel affordance included in application interface 808, electronic device 800 may cease performance of the current task of providing directions and rather than perform any other tasks in the task sequence, cease display of application interface 808 and task affordance 806, returning display 801 to the state before the shortcut criteria was met.

In some examples, in response to detecting selection of the cancel affordance, electronic device 800 proceeds to a second task of the task sequence associated with the shortcut. For example, when electronic device 800 detects selection of the cancel affordance included in application interface 808, electronic device 800 may cease performance of the current task of providing direction and proceed to the next task in the task sequence associated with "morning routine." Accordingly, electronic device 800 may cease display of application interface 808 and display user interface 802 including task affordance 806 associated with the next task in the task sequence associated with "morning routine."

In some examples, electronic device 800 determines whether additional information is required to complete the task associated with task affordance 806. For example, as discussed further below with reference to FIG. 8E, electronic device 800 may determine that the parameter for a size of a coffee is required to complete the task of ordering coffee of the shortcut "morning routine" but was not provided during shortcut creation. Accordingly, electronic device 800 may provide a prompt asking which size of coffee should be ordered in task affordance 806, as shown in FIG. 8E.

In some examples, the determination of whether additional information is required to complete the task is based on whether parameters for the task have been specified at a previous time. In some examples, the parameters for the task are previously specified during creation of the shortcut and/or the task sequence. For example, the user may specify during creation of the "morning routine" shortcut that electronic device 800 should order a coffee for the user when "morning routine" is executed. Further, during creation of the shortcut the user may specify various parameters for the coffee, including the size, the type, and the store from which the coffee should be ordered. Accordingly, when electronic device 800 executes "morning routine" electronic device 800 determines that additional information is not required to execute the task of ordering the user a coffee because the parameters for ordering the coffee have been specified during creation of the "morning routine" shortcut. In some examples, as shown in FIG. 8B, task affordance 806 includes a prompt for confirmation based on the parameters previously specified.

In some examples, the determination of whether additional information is required is based on whether an input for parameters or other information is specified during creation of the shortcut and/or the task sequence. For example, a user may specify during creation of the "morning routine" shortcut that electronic device 800 will need to ask the user which size coffee they would like before placing the order for coffee. Accordingly, when electronic device 800 executes "morning routine" electronic device 800 will display task affordance 806 as shown in FIG. 8E including a prompt asking the user for a specific size of coffee.

In some examples, in accordance with a determination that additional information is required to complete the task associated with task affordance 806, electronic device 800 displays a prompt for the additional information. As discussed above, in some examples, electronic device 800 may determine that additional information is required to be input in the application interface, and that any prompt for the additional information cannot be displayed in task affordance 806. Accordingly, electronic device 800 provides the prompt for additional information in application interface 808, as shown in FIG. 8D.

In some examples, the prompt for additional information is provided in task affordance 806, as shown in FIG. 8E. For example, when the task sequence associated with the "morning routine" shortcut includes providing a prompt for the parameter of size of coffee to complete the coffee task, electronic device 800 may display the prompt for the parameter of size of coffee in task affordance 806, as shown in FIG. 8E. As will be discussed in further detail below, several different types of prompts may be included in task affordance 806 or optionally, in a separate parameter affordance, in order to provide the user with information and options without requiring displaying the application interface 808 discussed above.

In some examples, the prompt for additional information is provided in parameter affordance 809 separate from task affordance 806, as shown in FIG. 8F. In some examples, parameter affordance 809 is displayed on a different predetermined portion (e.g., the bottom) of display 801 over user interface 802. In some examples, in response to displaying parameter affordance 809 in a different predetermined portion of display 801, electronic device 800 ceases display of task affordance 806 on display 801. For example, when electronic device 800 displays parameter affordance 809 prompting for the size of coffee at the bottom of display 801 in FIG. 8F, electronic device 800 ceases display of task affordance 806. In some examples, in response detecting an input indicative of the required information, electronic device 800 ceases display of parameter affordance 809 and displays task affordance 806 on display 801.

Electronic device 800 may provide various different prompts for additional information based on the information required to complete the task and/or a predefined type of prompt that may be specified, for example, during creation of the shortcut associated with task affordance 806. In some examples, the prompt for additional information includes a plurality of options for selection, as shown in FIGS. 8E and 8F. This affordance may be used when there is a specific list of predefined options to select from. In some examples, the list of predefined options is specified during creation of the shortcut (e.g., by the user).

In some examples, the list of predefined options is provided by an application associated with the task. In some examples, the application associated with the task may be associated with a third party service provider that provides the predefined options. For example, the task of ordering coffee may be associated with a specific third party service provider that is capable of taking a coffee order placed via electronic device 800. The third party service provider may specify sizes of coffees available, including small, medium, and large, as shown in FIGS. 8E and 8F. Thus, electronic device 800 provides the prompt for additional information including small, medium, and large to complete the task of ordering coffee.

In some examples, electronic device 800 provides a prompt for additional information that includes an entry field, such as the one included in task affordance 806 in FIG. 8G. This affordance may be used when the additional information does not need to belong to a specified or predetermined list. For example, when the task associated with task affordance 806 is ordering coffee, the application performing the task may allow any number of coffees to be ordered at a time. Accordingly, electronic device 800 may provide a prompt that includes an entry field so that a user may type in the number of coffees they would like.

In some examples, in response to detecting selection of the entry field, electronic device 800 provides (e.g., displays) entry affordance 810, as shown in FIG. 8G. Entry affordance 810 may include any type of affordance for entering data including a keyboard affordance, a number pad affordance, a touch pad affordance, etc. Entry affordance 810 may further include affordances for switching between different entry affordances, like those mentioned above, so that the user may enter different parameters. For example, a user may wish to type a reminder message as a task associated with the shortcut "morning routine." Accordingly, electronic device 800 may provide entry affordance 810 including a keyboard affordance which with the user may enter text. The electronic device may also provide a number pad affordance (e.g., in response to detecting selection of a switching affordance) in entry affordance 810 so that the user may provide numerical characters as well as text.

In some examples, in response to detecting selection of a confirmation affordance, electronic device 800 ceases to provide entry affordance 810. For example, after the user has entered the number 3, as shown in FIG. 8G, electronic device 800 may detect that the user taps the "next" affordance, confirming the number of cups to order. Electronic device may then cease displaying entry affordance 810. Similarly, in response to detecting selection of the cancel affordance, electronic device 800 ceases to provide entry affordance 810. For example, electronic device 800 may detect selection of the "cancel" affordance and cease to display entry affordance 810. Electronic device 800 may then further cease display of task affordance 806, as discussed above.

In some examples, electronic device 800 provides a prompt for additional information that includes a stepper field, as shown in FIG. 8H. This field may be used when a number is the required parameter and a simpler form of entry is desired. For example, when executing the task of "photos" the required parameter is a number, thus, electronic device 800 provides the stepper field to increase or decrease the number of photos as shown in FIG. 8H.

In some examples, in response to detecting selection of a confirmation affordance, electronic device 800 may complete the task based on the parameter included in the stepper field. For example, after the stepper field has been increased to 3, as shown in FIG. 8H, electronic device 800 may detect that the user taps the "done" affordance, confirming the number of pictures. Electronic device may then obtain three photos, completing the "photo" task based on the parameter three in the stepper field.

As discussed above, in some examples, in response to detecting selection of the cancel affordance, electronic device 800 continues to the next task in the task sequence if the task sequence includes more tasks. For example, electronic device 800 may detect selection of the "cancel" affordance and proceed to the next task in the task sequence, changing task affordance 806 accordingly. In some examples, in response to detecting selection of the cancel affordance, electronic device 800, electronic device 800 ceases performance of the task sequence and returns display 801 to the state before the shortcut criteria was met.

In some examples, electronic device 800 provides a prompt for information that includes a calendar field, as shown in FIG. 8I. This field may be used when the required parameter is a date to provide a simpler and more convenient user experience. For example, when executing the "schedule meeting" task, the required parameter is a date and therefore, electronic device 800 provides the calendar field so that the user may quickly select the date as shown in FIG. 8I.

As discussed above, in response to detecting selection of a confirmation affordance, electronic device 800 may complete the task based on the parameter included in the calendar field. Additionally, in some examples, in response to detecting selection of the cancel affordance, electronic device 800 continues to the next task in the task sequence if the task sequence includes more tasks. In some examples, in response to detecting selection of the cancel affordance, electronic device 800, electronic device 800 ceases performance of the task sequence and returns display 801 to the state before the shortcut criteria was met.

In some examples, electronic device 800 detects an input swiping up on task affordance 806. In some examples, in response to detecting the input swiping the task affordance 806 up, electronic device 800 ceases to display task affordance 806 and ceases to perform the task associated with the task affordance 806. In some examples, electronic device 800 ceases to perform the shortcut associated with task affordance 806 in response to detecting the input swiping the task affordance 806 up. For example, electronic device 800 may detect input swiping the task affordance 806 associated with the task of ordering coffee up and cease performance of the task of ordering coffee, as well as display of task affordance 806.

In some examples, more information is included in task affordance 806 than can be displayed in the predetermined portion of display 801. Accordingly, electronic device 800 may detect an input scrolling task affordance 806 and in response to detecting the input scrolling task affordance 806, display a second portion of task affordance 806 in the predetermined portion of display 801. For example, electronic device 800 may display task affordance 806 associated with the task of ordering coffee that includes selections of sizes for the coffee and the full list of sizes available may not fit in task affordance 806. Accordingly, electronic device 800 may detect an input scrolling task affordance 806 and scroll task affordance 806 to show the sizes that were previously not displayed in task affordance 806.

In some examples, the task associated with task affordance 806 does not require any additional information. Accordingly, task affordance 806 includes information related to the task and does not include a prompt for additional information. In some examples, when task affordance 806 includes information related to the task and does not include a prompt, task affordance 806 is dismissed after a predetermined time (e.g., 5, 10, 15, 25, or 30 seconds). For example, task affordance 806 may include the size and cost of the coffee but may not require confirmation from a user. Accordingly, after showing the size and cost of the coffee for a predetermined amount of time, task affordance 806 may cease to be displayed. In this way task affordance 806 may provide information related to a task while performing the task and then proceed to the next task associated with the shortcut or cease display of task affordance 806 without requiring further input from a user that is not necessary.

After electronic device 800 receives the additional information, electronic device 800 performs the task using the additional information provided in response to the prompt. As discussed above, in some examples electronic device 800 determines that the additional information is received based on selection of a confirmation affordance. In some examples, electronic device 800 determines that the additional information is received based on detection of an input (e.g., a tap on a parameter shown on display 801, a voice input specifying a parameter, etc.). When electronic device detects input of the additional information without selection of a confirmation affordance, electronic device may provide a prompt for confirmation, and proceed with performing the task as discussed above after confirmation is received.

In some examples, when task affordance 806 is provided by an operating system or virtual assistant of electronic device 800, the operating system or virtual assistant may then provide the additional information to another first party or third party application as needed. For example, a virtual assistant of electronic device 800 may be performing the task of ordering coffee of the task sequence associated with "morning routine" and determine that a size of coffee is needed. Accordingly, the virtual assistant may provide task affordance 806 requesting a size of the coffee and use the received information of size to place a coffee order. As another example, a virtual assistant of electronic device 800 may be performing the task sequence associated with "morning routine" and thus determine that the task of ordering coffee needs a size parameter. The virtual assistant may then provide task affordance 806 requesting a size of the coffee and after receiving input indicating the desired size, pass the size of the coffee, with any other parameters, to an application for ordering coffee.

In some examples, while displaying task affordance 806 and performing the task associated with task affordance 806, electronic device 800 detects an input indicative of changing user interface 802, as shown in FIG. 8J. In some examples, the input indicative of changing user interface 802 is a swipe to the left, right, up, or down. For example, electronic device 800 may detect a swipe to the right on a portion of display 801 that does not include task affordance 806. In some examples, as shown in FIG. 8J, the input indicative of changing user interface 802 is a tap, press, etc. on a portion of display 801 in which task affordance 806 is not displayed. For example, electronic device 800 may detect tap 811 near the right edge of display 801 on a portion that does not include task affordance 806.

In some examples, in response to detecting the input indicative of changing user interface 802, electronic device 800 displays user interface 812 while continuing to display task affordance 806, as shown in FIG. 8K. For example, as described above, electronic device 800 may detect tap 811 near the right edge of display 801. In response to detecting tap 811, electronic device 800 displays user interface 812, while continuing to display task affordance 806. In this way, electronic device 800 may display different user interfaces while continuing to display that the task associated with task affordance 806 is being performed. This allows a user of electronic device 800 to have the flexibility to view different things during the execution of the shortcut, while still being informed or providing the information needed to complete one or more tasks of the task sequence. In some examples, displaying user interface 812 includes replacing user interface 802 with user interface 812, while continuing to display task affordance 806.

In some examples, while displaying task affordance 806 and performing the task associated with task affordance 806, electronic device 800 detects an input indicative of opening an application. In some examples, the input indicative of opening an application is a tap, press, etc. on an affordance being displayed on user interface 802 in a portion that does not include task affordance 806. For example, electronic device 800 may detect tap 813 on the affordance for the news application, as shown in FIG. 8L.

In some examples, in response to detecting the input indicative of opening an application, electronic device displays application interface 814 while continuing to display task affordance 806, as shown in FIG. 8M. For example, as described above, electronic device 800 may detect tap 813 on the affordance for the news application. In response to detecting tap 813, electronic device 800 displays application interface 814, while continuing to display task affordance 806. As discussed above, this allows electronic device 800 to display different user interfaces including application interfaces while continuing to display that the task associated with task affordance 806 is being performed, allowing further flexibility in operation of electronic device 800. In some examples, displaying application interface 814 includes replacing user interface 802 with application interface 814, while continuing to display task affordance 806.

In some examples, while displaying task affordance 806, electronic device 800 determines whether performing the task associated with task affordance 806 includes displaying progress affordance 815 in task affordance 806, as shown in FIG. 8N. In some examples, determining whether performing the task associated with task affordance 806 includes displaying progress affordance 815 is based on the task being performed. In some examples, electronic device 800 determines that performing the task associated with task affordance 806 includes displaying progress affordance 815 in task affordance 806 when the task being performed is a task of a predetermined task type. For example, electronic device 800 may determine that all tasks related to ordering food require displaying progress affordance 815. Thus, electronic device 800 determines that the task of ordering coffee requires displaying progress affordance 815 because the task of ordering coffee belongs to the ordering food task type.

In some examples, determining whether performing the task associated with task affordance 806 includes displaying progress affordance 815 is based on parameters specified during creation of the shortcut. For example, during creation of shortcut "morning routine" the user may specify that progress affordance 815 should be displayed while performing one or more tasks of "morning routine."

In some examples, electronic device 800 determines that performing the task associated with task affordance 806 includes displaying progress affordance 815 in task affordance 806 when the task is being performed with a predetermined application. In some examples, the predetermined application and the requirement to display progress affordance 815 are defined during creation of the shortcut (e.g., by the user). In some examples, the requirement to display progress affordance 815 are defined is provided by the application or an associated third party who controls (e.g., publishes) the application. For example, the application associated with the task of ordering coffee may specify that while ordering coffee progress affordance 815 should be displayed.

In some examples, determining whether performing the task associated with task affordance 806 includes displaying progress affordance 815 is based how long it will take to perform the task. For example, electronic device 800 may determine that the period of time required to perform the task is significant (e.g., 30 seconds, 45 seconds, 1 minutes, 2 minutes, etc.) and therefore may determine that task affordance should include progress affordance 815 to provide a user with information on how much longer performing the task will take.

In some examples, determining whether performing the task associated with task affordance 806 includes displaying progress affordance 815 is based on whether a stop affordance (not shown) needs to be provided in task affordance 806. For example, when electronic device 800 determines that it will take a significant period of time to perform the task as discussed above, electronic device 800 may determine that a stop affordance should be provided in task affordance 806 so that the user may stop performance of the task. This allows the user to stop performance of certain tasks if the user wishes to perform a different task or believes the task will take too long to perform.

In some examples, in accordance with a determination that performing the task associated with task affordance 806 includes displaying progress affordance 815, electronic device 800 displays progress affordance 815 as shown in FIG. 8N. In some examples, progress affordance 815 is a circle that gradually fills as the task is performed, as shown in FIG. 8N. In some examples, progress affordance 815 is a bar that gradually fills as the task is performed. In some examples, progress affordance 815 is a series of spoke lines arranged in a circle (e.g., a spoked wheel). In some examples, in accordance with a determination that performing the task associated with task affordance 806 includes displaying progress affordance 815, electronic device 800 displays a cancel or stop affordance 816 in task affordance 806. In some examples, in response to detecting selection of cancel affordance 816, electronic device 800 ceases display of progress affordance in the same manner as discussed above with respect to task affordance 806.

In some examples, in accordance with a determination that performing the task associated with task affordance 806 includes displaying progress affordance 815, electronic device 800 displays user interface 817, as shown in 8N. In some examples, user interface 817 is a partially opaque version user interface 802. In some examples, electronic device 800 replaces user interface 802 with the user interface 817. In some examples, progress affordance 815 is displayed in the same predetermined portion of display 801 as task affordance 806. Accordingly, user interface 817 is displayed in the same predetermined portion of display 801 as user interface 802, that does not include progress affordance 815.

In some examples, colors and general shapes of icons or affordances corresponding to the icons and affordances displayed in user interface 802 may be visible on user interface 817. For example, when electronic device 800 displays user interface 807, user interface 807 may include the same layout and number of affordances as shown in user interface 802. However, the affordances other than progress affordance 815 may appear blurry, indistinct, or muted in color, to signify that electronic device 800 will not respond to inputs detected on this portion of display 801, as discussed below.

In some examples, in accordance with displaying user interface 817, electronic device 800 does not respond to inputs indicating user interface 802 should change or to launch an application. For example, when electronic device 800 detects a tap near the right edge of display 801, electronic device 800 will not respond to the tap and therefore will not change the display while displaying user interface 817. Rather, electronic device 800 will continue to display the user interface 817. Similarly, when electronic device 800 detects a tap on or near a blurry, indistinct, or muted application affordance, electronic device 800 will not respond to the tap while displaying user interface 817. Rather, electronic device 800 will continue to display the user interface 817.

In some examples, in accordance with displaying user interface 817, electronic device 800 detects an input (e.g., a tap) on user interface 817 and in response to detecting the input, ceases performance of the task or shortcut. In some examples, in response to detecting the input, electronic device 800 ceases display of task affordance 806 as well as user interface 817 and instead displays user interface 802. Accordingly, in some examples, user interface 817 and/or task affordance 806 can be dismissed and performance of the shortcut ceased by detecting a tap on partially opaque user interface 817.

In some examples, after performance of the task associated with task affordance 806, electronic device 800 displays completion affordance 818, as shown in FIG. 8O. In some examples, completion affordance 818 includes information related to performance of the task associated with task affordance 806. For example, as shown in FIG. 8O completion affordance 818 confirms that the task of ordering coffee has been completed and further provides the information that the coffee will be ready in 10 minutes, as well as the location where the coffee can be picked up. In some examples, the information related to performance of the task included in completion affordance 818 is provided by an application that performs the task. For example, the application used to order the coffee may provide electronic device 800 with the time it will take to make the coffee, so that this information can be included in completion affordance 818.

In some examples, electronic device 800 detects an input to dismiss completion affordance 818. In some examples, the input to dismiss completion affordance 818 is detected on any portion of display 801. In some examples, the input to dismiss completion affordance 818 is detected on completion affordance 818. In some examples, the input to dismiss completion affordance 818 is a tap. For example, electronic device 800 may detect a tap on any portion of display 801, which indicates that completion affordance 818 should be dismissed. In some examples, the input to dismiss completion affordance 818 is a swipe. For example, electronic device 800 may detect a swipe up on completion affordance 818, indicating that completion affordance 818 should be dismissed.

In some examples, in response to detecting the input to dismiss completion affordance 818, electronic device 800 ceases to display completion affordance 818. For example, electronic device 800 may detect a swipe up on completion affordance 818 and in response cease displaying completion affordance 818 and display user interface 802 including shortcut widget 803. In some examples, in response to detecting the input to dismiss completion affordance 818, electronic device 800 displays a task affordance corresponding to a second task of the task sequence, as discussed further below with reference to FIG. 8P.

In some examples, after performing the task corresponding to task affordance 806 (and optionally displaying completion affordance 818, as discussed above), electronic device 800 displays task affordance 819 corresponding to a second task of the task sequence associated with the shortcut over user interface 802, as shown in FIG. 8P. For example, after performing the task of ordering coffee of the shortcut "morning routine" electronic device 800 may display task affordance 819 corresponding to the task of getting directions to the work.

Performance of the second task of the task sequence associated with the shortcut proceeds in a substantially similar fashion as performance of the first task, described above. As discussed above with reference to task affordance 806 and the first task of the task sequence, in some examples, electronic device 800 determines whether additional information is required to complete the second task and if so, provides a prompt for the information.

Further, in some examples, electronic device 800 determines whether the second task associated with task affordance 819 can be completed without displaying an application interface. In accordance with a determination that the second task associated with task affordance 819 can be completed without displaying an application interface, electronic device 800 performs the second task while displaying task affordance 819. In accordance with a determination that the second task associated with task affordance 819 cannot be completed without displaying an application interface, electronic device 800 displays application interface 820, as shown in FIG. 8Q and completes the second task using application interface 820.

Accordingly, electronic device 800 may perform any number of tasks that may be included in the task sequence associated with the shortcut in an iterative and similar manner until all of the tasks have been completed. This allows the user to specify a plurality of tasks of the task sequence to be performed when shortcut criteria is met, reducing the number of inputs needed and providing a more user-friendly and automated environment.

In some examples, shortcut criteria may be met automatically, without input from the user. In particular, as discussed above, in some examples, the shortcut criteria associated with the task sequence is met when electronic device 800 detects that context criteria is met. In some examples, electronic device 800 detects that context criteria is met based on one or more contextual data associated with electronic device 800. Electronic device may detect that context criteria is met automatically based on contextual data associated with electronic device 800 that is updated. For example, the shortcut criteria for the "morning routine" shortcut may include electronic device 800 being in a predetermined location, such as the user's living room. Thus, when electronic device 800 detects the contextual data of the GPS coordinates that indicate the user's living room, electronic device 800 may determine that the context criteria met and accordingly that the shortcut criteria is met.

In some examples, in accordance with the determination that the shortcut criteria is met, electronic device 800 displays notification 821, as shown in FIG. 8R. In some examples, electronic device 800 displays notification 821 on lock screen interface 821. For example, when display 801 of electronic device 800 is off when the shortcut criteria is met, electronic device 800 may provide notification 821 such that the next time display 801 is turned on, notification 821 is displayed on the lock screen interface, as shown in FIG. 8R, and thus the user is informed that the task of getting directions to work associated with the shortcut "morning routine" is ready to be performed.

In some examples, electronic device 800 displays notification 821 over a user interface, such as user interface 802 described above. For example, electronic device 800 may determine that the shortcut criteria is met based on contextual information of electronic device 800 meeting context criteria, as described above, while display 801 of electronic device 800 is on, indicating that electronic device 800 is in use. Accordingly, electronic device 800 may display notification 821 over user interface 802 to indicate to the user that the task of getting directions to work associated with the shortcut "morning routine" is ready to be performed.

In some examples, electronic device 800 displays a reminder of notification 821 in a status bar that may be selected to view notification 821. For example, when notification 821 is displayed over user interface 802 as discussed above, electronic device 800 may detect an input dismissing the notification (e.g., a swipe up or a tap on a portion of display 801 that does not include notification 821). Accordingly, electronic device 800 may display a reminder of notification 821 in a status bar (e.g., at the top of user interface 802). Electronic device 800 may then detect selection of the reminder (e.g., a tap or swipe down) and in response to detecting selection of the reminder, display notification 821 on display 801.

In some examples, electronic device 800 detects selection of notification 821. In some examples, electronic device 800 detects selection of notification 821 by detecting tap 822 on notification 821, as shown in FIG. 8R. In some examples, electronic device 800 detects selection of notification 821 by receiving a voice input referencing notification 821. For example, electronic device 800 may receive the voice input "open morning routine" or "respond to morning routine question" and determine that this is a selection of notification 821.

In some examples, in response to detecting the selection of notification 821, electronic device 800 displays task affordance 823 over user interface 802, as shown in FIG. 8S, and performs the task associated with task affordance 823 as discussed above with reference to FIGS. 8A-8Q.

In some examples, electronic device 800 displays notification 821 in response to determining that performance of the task associated with the shortcut has stopped. For example, display 801 of electronic device 800 may be turned off because electronic device 800 was locked (e.g., due to selection of a lock affordance or because a predetermined time has elapsed). Accordingly, electronic device 800 may stop execution of the task associated with task affordance 823 and display notification 821 on a lock screen of electronic device 800. Thereafter, electronic device 800 may detect selection of notification 821 and continue performance of the task, as discussed above.

In some examples, electronic device 800 displays an image in task affordance 824 corresponding to a task as part of performing the task, as shown in FIG. 8T. For example, when performing the task of getting directions to work associated with the shortcut "morning routine," electronic device may display image 825 including a version of a map showing directions to work in task affordance 822, along with a message describing image 825 such as "Here's a map to work."

In some examples, electronic device 800 detects selection of image 825. In some examples, electronic device 800 detects selection of image 825 by detecting tap 826 on image 825. In some examples, in response to detecting selection of image 825, electronic device 800 enlarges image 825, as shown in FIG. 8U. In some examples, electronic device 800 enlarges image 825 by replacing a predetermined portion of the user interface 802 with image 825. In some examples, the predetermined portion of user interface 802 that is replaced with image 825 is less than the entirety of user interface 802, as shown in FIG. 8U.

In some examples, electronic device 800 detects selection of a done or finished affordance, as shown in FIG. 8U. In some examples, in response to detecting selection 827 of the done or finished affordance, electronic device 800 ceases display of image 825. In some examples, electronic device 800 ceases display of image 825 and displays user interface 802 without any task affordance. In some examples, electronic device 800 ceases display of image 825 and displays user interface 802 and task affordance 824 including a smaller version of image 825 over user interface 802, as shown in FIG. 8T.

In some examples, electronic device 800 detects a double tap or press of image 825. In some examples, in response to detecting the double tap or press of image 825, electronic device 800 displays (e.g., replaces the current display) application interface 828, as shown in FIG. 8V. In some examples, electronic device 800 performs the task while displaying application interface 828 and then may cease display of application interface 828 when performance of the task is complete or upon the meeting of certain criteria, as described above with reference to FIG. 8D.

In some examples, electronic device 800 may display other types of media in task affordance 824 corresponding to the task as a part of performing the task, and may provide a preview of that media in response to selection, as discussed above with reference to image 825. For example, electronic device 800 may provide previews of different types of images other than maps, including photographs, drawings, etc. and may further provide previews of video media (e.g., movies) and audio media (e.g., music) in similar interfaces. Additionally, in some examples, electronic device 800 may display a list of media in task affordance 824, which may be selected so as to preview the selected media from the list of media provided in task affordance 824. Similarly, electronic device 800 may display a list of files in task affordance 824, which may be selected to preview the selected files.

It will be appreciated that the above paragraphs are merely examples of a user interface for performing shortcuts and that the user interface may be employed in many different situations including but not limited to, from a shortcuts application, from various user interfaces of an operating system of electronic device 800, and from other applications. Further, as discussed above, the criteria required to perform a shortcut may be met from any of these interfaces and may include receiving specific spoken inputs, meeting context criteria, or any other suitable way of triggering a shortcut.

Figure 9A:
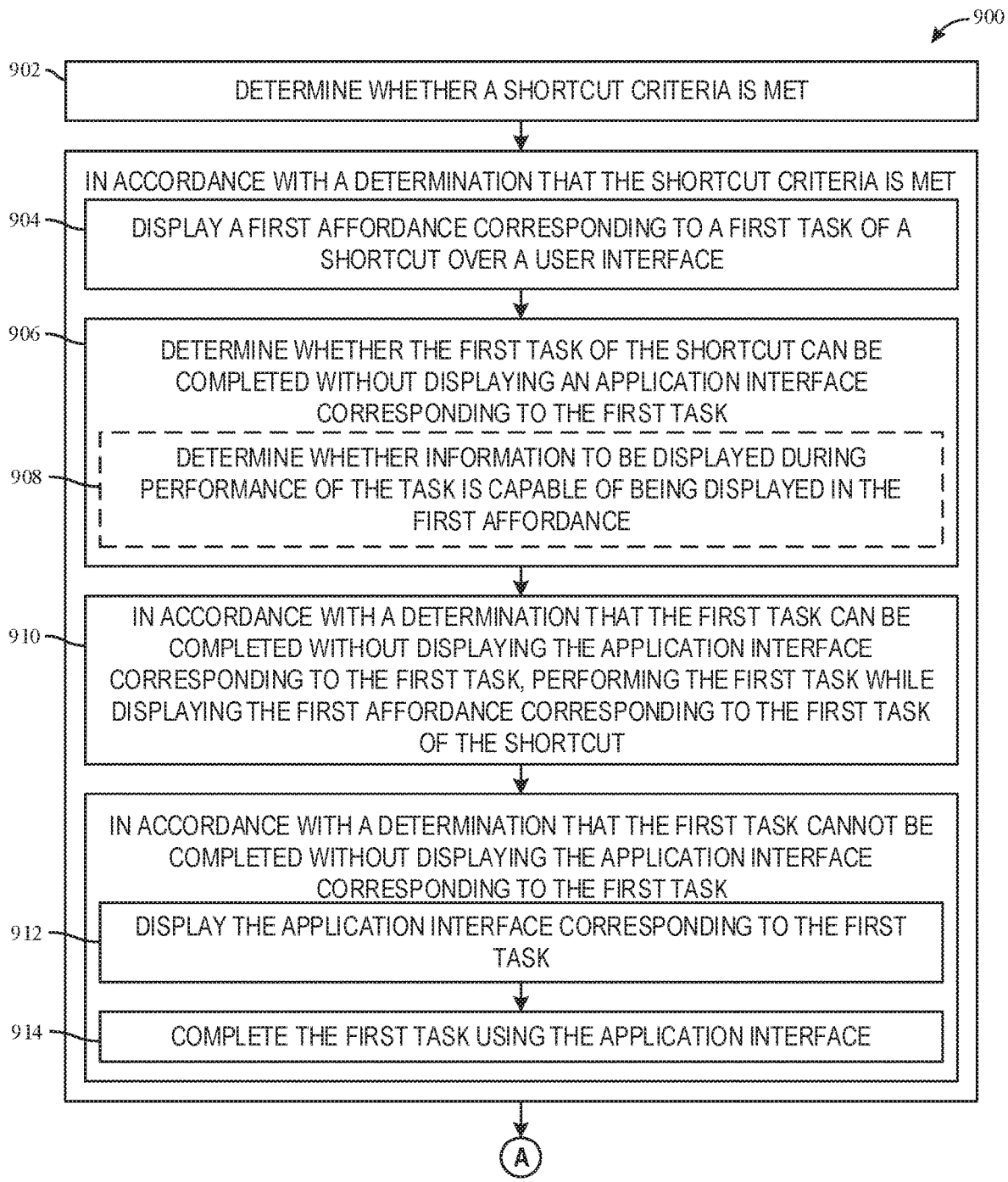
FIGS. 9A-9E is a flow diagram illustrating a process for performing a shortcut including at least one task, according to various examples.
Figure 9B:
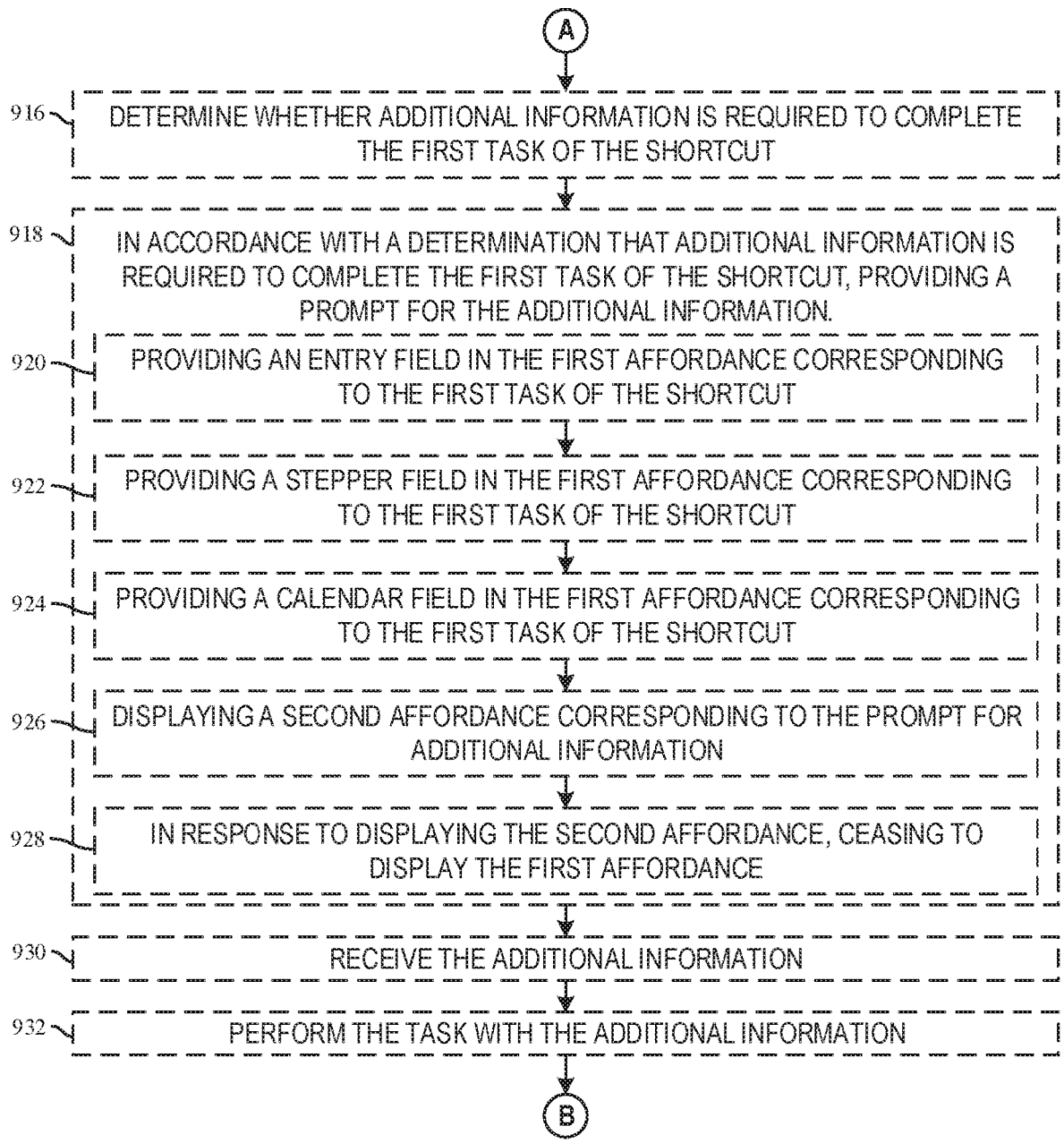
Figure 9C:
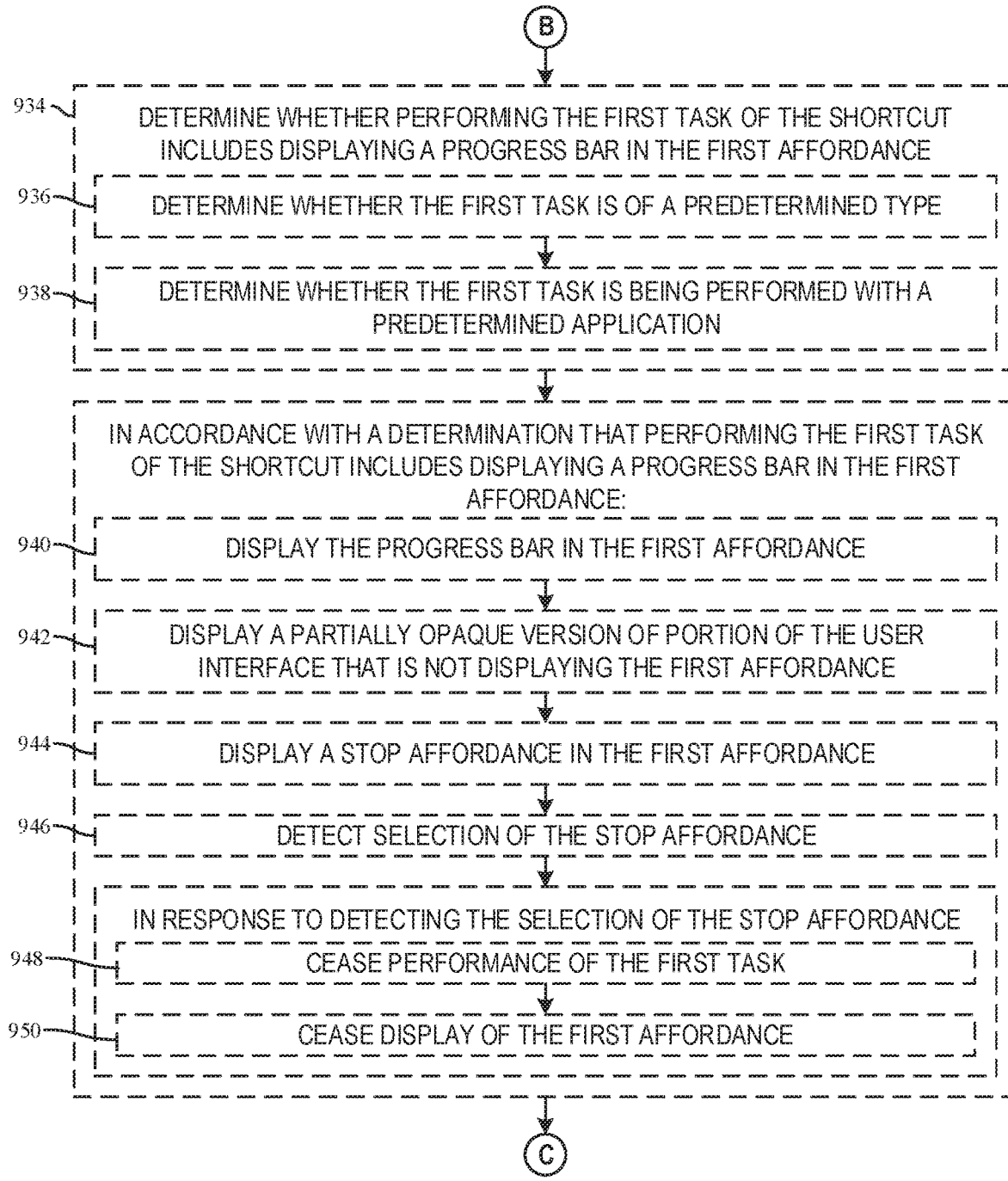
Figure 9D:
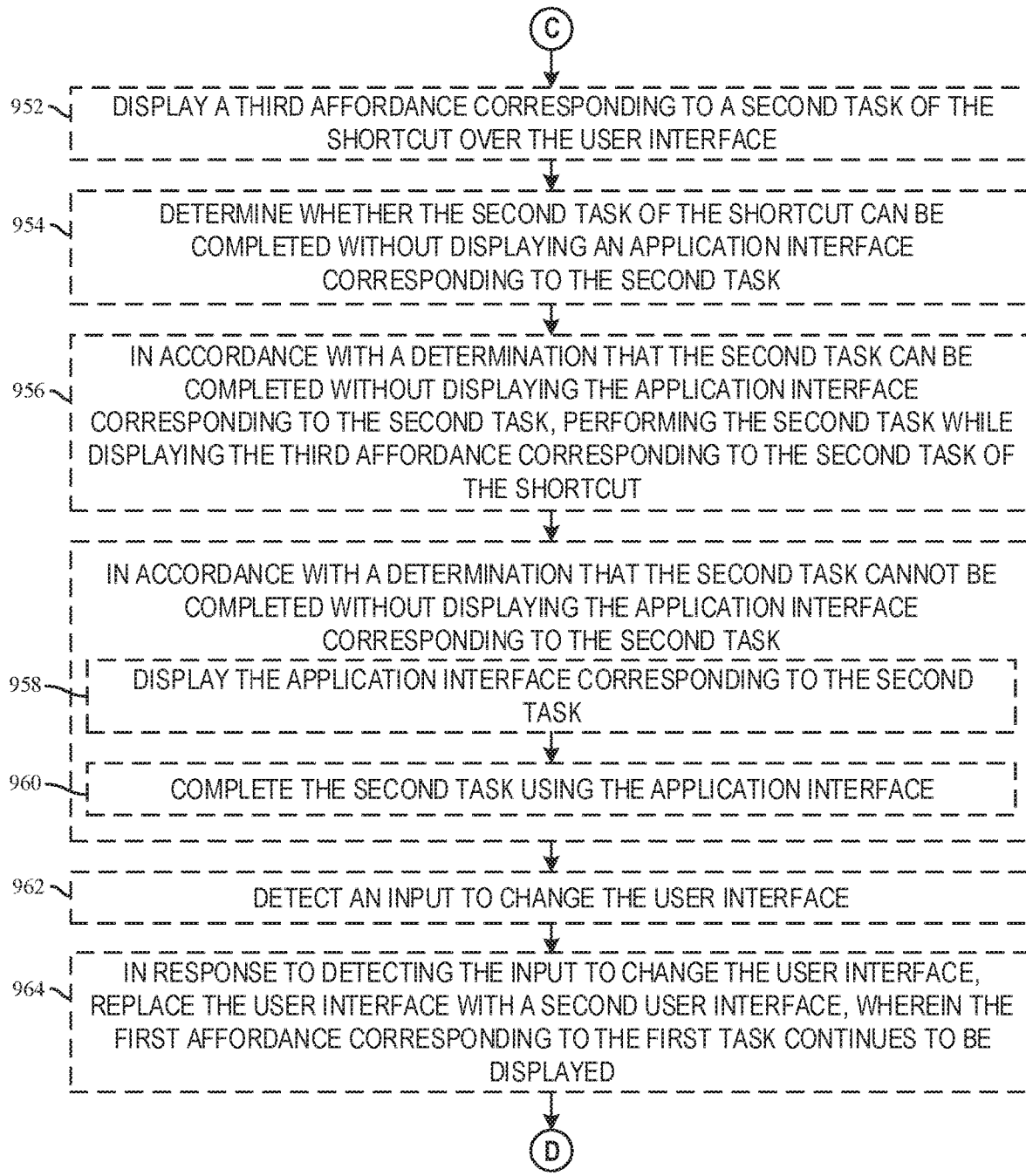
Figure 9E:
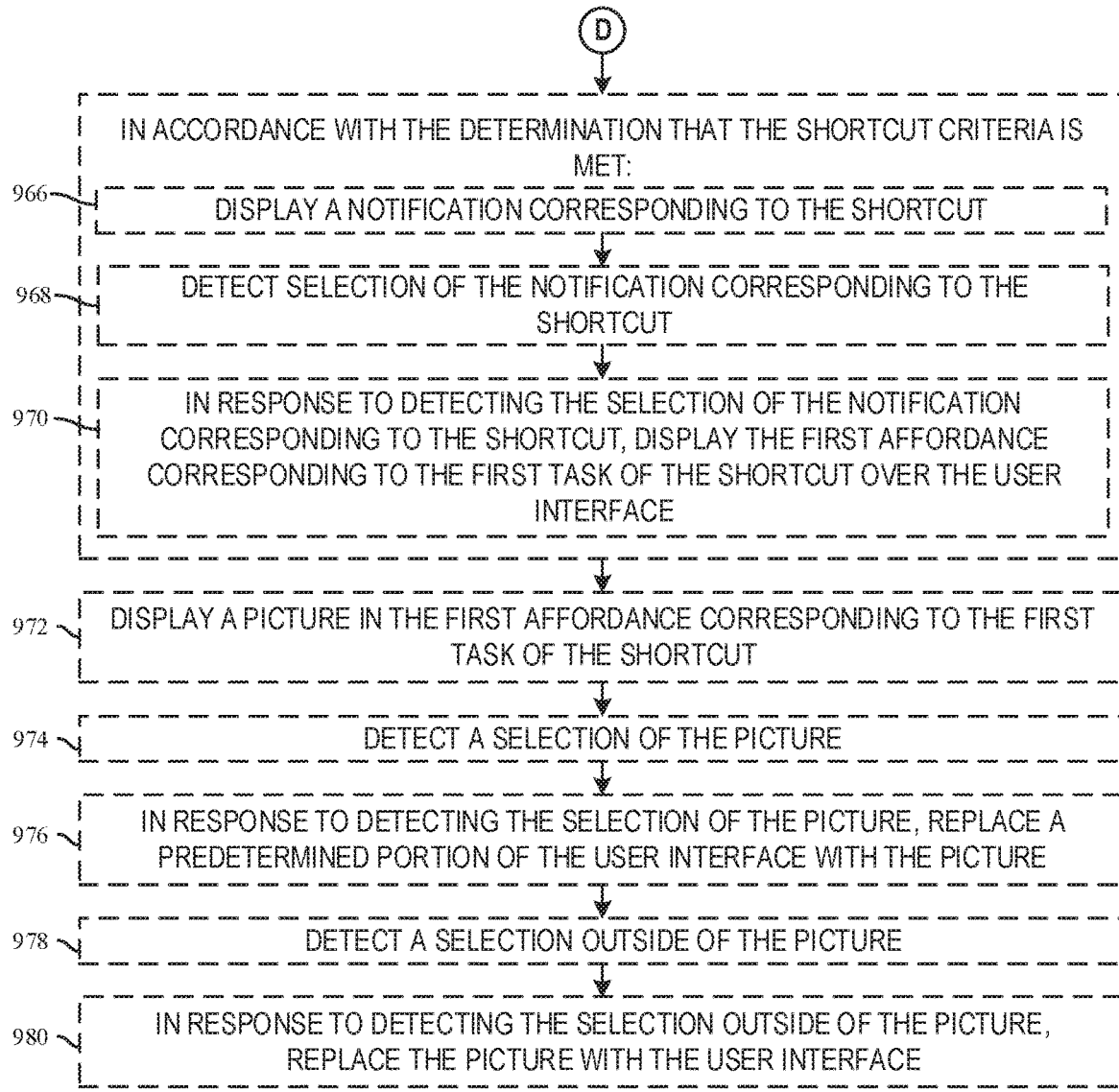

FIGS. 9A-9C is a flow diagram illustrating a process for performing a shortcut including at least one task, according to various examples. Method 900 is performed at a device (e.g., device 104, device 122, device 200, device 600, device 700, device 800) with a display, one or more input devices (e.g., a touchscreen, a mic, a camera), and a wireless communication radio (e.g., a Bluetooth connection, WiFi connection, a mobile broadband connection such as a 4G LTE connection). In some embodiments, the display is a touch-sensitive display. In some embodiments, the display is not a touch sensitive display. In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 900 are, optionally, combined, the orders of some operations are, optionally, changed, and some operations are, optionally, omitted.

As described below, displaying a first affordance corresponding to a first task of a shortcut over a user interface and determining whether the first task of the shortcut can be completed without displaying an application interface corresponding to the first task allows a user to accurately and efficiently respond to prompts related to the first task without interrupting other uses of the electronic device. For example, displaying a first affordance in this manner allows a user to open applications or change the user interface to find information that may be needed to perform the task associated with the affordance, without having to close the affordance and then re-open the affordance or application completing the task. Thus, displaying the first affordance in the manner described provides for more efficient use of the electronic device (e.g., by allowing the user to execute a task or several tasks in the same interface), which, additionally, reduces power usage and improves battery life of the device by enabling the user to use the device more quickly and efficiently.

At block 902, whether a shortcut criteria is met is determined. At block 904, in accordance with a determination that the shortcut criteria is met, a first affordance (e.g., task affordance 806, task affordance 807, task affordance 815, task affordance 819, task affordance 823) corresponding to a first task of a shortcut is displayed over the user interface (e.g., user interface 802).

At block 906, whether the first task of the shortcut can be completed without displaying an application interface (e.g., application interface 808, application interface 820, application interface 828) corresponding to the first task is determined. In some examples, determining whether the first task of the shortcut can be completed without displaying an application interface corresponding to the first task includes determining whether information to be displayed during performance of the task is capable of being displayed in the first affordance (e.g., task affordance 806, task affordance 807, task affordance 815, task affordance 819, task affordance 823), as shown at block 908.

At block 910, in accordance with a determination that the first task can be completed without displaying the application interface (e.g., application interface 808, application interface 820, application interface 828) corresponding to the first task, the first task is performed while displaying the first affordance (e.g., task affordance 806, task affordance 807, task affordance 815, task affordance 819, task affordance 823) corresponding to the first task of the shortcut.

At block 912, in accordance with a determination that the first task cannot be completed without displaying the application interface (e.g., application interface 808, application interface 820, application interface 828) corresponding to the first task, the application interface corresponding to the first task is displayed. In some examples, the user interface is replaced with the application interface corresponding to the first task. The first task is then completed using the application interface, as shown at block 914.

In some examples, a widget affordance (e.g., shortcut widget 803) including an affordance (e.g., shortcut affordance 804) corresponding to the shortcut in the user interface is displayed. In some examples, the shortcut criteria includes the affordance corresponding to the shortcut being selected (e.g., with tap 805). In some examples, the shortcut criteria is established during creation of the shortcut. In some examples, the first affordance (e.g., task affordance 806, task affordance 807, task affordance 815, task affordance 819, task affordance 823) corresponding to the first task of the shortcut descends from the top of the displayed user interface (e.g., user interface 802). In some examples, the first affordance replaces a predetermined portion of the displayed user interface.

At block 916, whether additional information is required to complete the first task of the shortcut is determined. At block 918, in accordance with a determination that additional information is required to complete the first task of the shortcut, a prompt for additional information is provided.

In some examples, an entry field is provided in the first affordance (e.g., task affordance 806, task affordance 807, task affordance 815, task affordance 819, task affordance 823) corresponding to the first task of the shortcut, as shown at block 920. In some examples, a stepper field is provided in the first affordance corresponding to the first task of the shortcut, as shown in block 922. In some examples, a calendar field is provided in the first affordance corresponding to the first task of the shortcut, as shown in block 924.

At block 926 a second affordance (e.g., entry affordance 810) corresponding to the prompt for additional information is displayed. At block 928, in response to displaying the second affordance, the first affordance (e.g., task affordance 806, task affordance 807, task affordance 815, task affordance 819, task affordance 823) ceases to be displayed.

At block 930 the additional information is received and at block 932 the task is performed with the additional information. In some examples, a portion of the displayed user interface (e.g., user interface 817) that is not displaying the first affordance (e.g., task affordance 806, task affordance 807, task affordance 815, task affordance 819, task affordance 823) is partially opaque.

At block 934, whether performing the first task of the shortcut includes displaying a progress bar in the first affordance (e.g., task affordance 806, task affordance 807, task affordance 815, task affordance 819, task affordance 823) is determined. In some examples, this determination includes determining whether the first task is a of a predetermined type, as shown in block 936. In some examples, this determination includes determining whether the first task is being performed with a predetermined application, as shown in block 938.

At block 940, in accordance with a determination that performing the first task of the shortcut includes displaying a progress bar in the first affordance (e.g., task affordance 806, task affordance 807, task affordance 815, task affordance 819, task affordance 823), the progress bar is displayed in the first affordance. Further, a partially opaque version of the portion of user interface (e.g., user interface 817) that is not displaying the first affordance is displayed, as shown in block 942. At block 944, a stop affordance (e.g., cancel affordance 816) is displayed in the first affordance. At block 946, selection of the stop affordance is detected. At block 948, in response to detecting the selection of the stop affordance performance of the first task ceases. Further, display of the first affordance ceases as shown at block 950.

At block 952 a third affordance (e.g., task affordance 806, task affordance 807, task affordance 815, task affordance 819, task affordance 823) corresponding to a second task of the shortcut is displayed over the user interface (e.g., user interface 802). At block 954, whether the second task of the shortcut can be completed without displaying an application interface (e.g., application interface 808, application interface 820, application interface 828) corresponding to the second task is determined.

At block 956, in accordance with a determination that the second task can be completed without displaying the application interface (e.g., application interface 808, application interface 820, application interface 828) corresponding to the second task, the second task is performed while displaying the third affordance (e.g., task affordance 806, task affordance 807, task affordance 815, task affordance 819, task affordance 823) corresponding to the second task of the shortcut.

At block 958, in accordance with a determination that the second task cannot be completed without displaying the application interface (e.g., application interface 808, application interface 820, application interface 828) corresponding to the second task, the application interface corresponding to the second task is displayed. In some examples, the user interface (e.g., user interface 802) is replaced with the application interface corresponding to the second task. The second task is then completed using the application interface, as shown at block 960.

At block 962, an input (e.g., tap 811, tap 813) to change the user interface (e.g., user interface 802) is detected. At block 964, in response to detecting the input to change the user interface, the user interface is replaced with a second user interface (e.g., user interface 812, user interface 814), while the first affordance (e.g., task affordance 806, task affordance 807, task affordance 815, task affordance 819, task affordance 823) corresponding to the first task continues to be displayed.

At block 966, in accordance with the determination that the shortcut criteria is met, a notification (e.g., notification 821) corresponding to the shortcut is displayed. At block 968 selection (e.g., tap 822) of the notification corresponding to the shortcut is detected. At block 970, in response to detecting the selection of the notification corresponding to the shortcut, the first affordance (e.g., task affordance 806, task affordance 807, task affordance 815, task affordance 819, task affordance 823) corresponding to the first task of the shortcut is displayed over the user interface (e.g., user interface 802).

At block 972, a picture (e.g., image 825) is displayed in the first affordance (e.g., task affordance 806, task affordance 807, task affordance 815, task affordance 819, task affordance 823) corresponding to the first task of the shortcut. At block 974, a selection (e.g., tap 826) of the picture is detected. At block 976, in response to detecting the selection of the picture, a predetermined portion of the user interface (e.g., user interface 802) is replaced with the picture. At block 978, a selection (e.g., tap 827) outside of the picture is detected. At block 980, in response to detecting the selection outside of the picture, the picture is replaced with the user interface.

The operations described above with reference to FIGS. 9A-9C are optionally implemented by components depicted in FIGS. 1-4, 6A-E, 7A-C, and 8A-8V. It would be clear to a person having ordinary skill in the art how other processes are implemented based on the components depicted in FIGS. 1-4, 6A-E, 7A-C, and 8A-8V.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of content related to one or more tasks being performed. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to automatically trigger tasks and provide information about the performance of the tasks. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of contextual data, the present technology can be configured to allow users to select to "opt in" or "opt out" of participation in the collection of personal information data during registration for services or anytime thereafter. In yet another example, users can select to limit the length of time contextual data is maintained or entirely prohibit the reception of contextual data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, shortcut criteria can be based on non-personal information data or a bare minimum amount of personal information, such as the specific context data required, other non-personal information available to the electronic device, or publicly available information.

What is claimed is:

1. A non-transitory computer-readable storage medium storing one or more programs, the one or more programs comprising instructions, which when executed by one or more processors of an electronic device, cause the electronic device to:
    display a first affordance corresponding to a first task of a shortcut over a user interface;
    in accordance with a determination that the first task of the shortcut can be completed without displaying an application interface corresponding to the first task, perform the first task while displaying the first affordance corresponding to the first task of the shortcut; and
    in accordance with a determination that the first task of the shortcut cannot be completed without displaying an application interface corresponding to the first task, complete the first task while displaying the application interface.

2. The non-transitory computer-readable storage medium of claim 1, wherein the programs further comprise instructions, which when executed by one or more processors of an electronic device, cause the electronic device to:
    display a widget affordance including an affordance corresponding to the shortcut in the user interface.

3. The non-transitory computer-readable storage medium of claim 2, wherein the shortcut criteria includes the affordance corresponding to the shortcut being selected.

4. The non-transitory computer-readable storage medium of claim 1, wherein the shortcut criteria is established during creation of the shortcut.

5. The non-transitory computer-readable storage medium of claim 1, wherein the first affordance corresponding to the first task of the shortcut descends from the top of the displayed user interface.

6. The non-transitory computer-readable storage medium of claim 1, wherein the first affordance replaces a predetermined portion of the displayed user interface.

7. The non-transitory computer-readable storage medium of claim 1, wherein determining whether the first task of the shortcut can be completed without displaying an application interface corresponding to the first task further comprises:
    determining whether information to be displayed during performance of the task is capable of being displayed in the first affordance.

8. The non-transitory computer-readable storage medium of claim 1, wherein displaying the application interface corresponding to the first task further comprises:
    replacing the user interface with the application interface corresponding to the first task.

9. The non-transitory computer-readable storage medium of claim 1, wherein the programs further comprise instructions, which when executed by one or more processors of an electronic device, cause the electronic device to:
    determine whether additional information is required to complete the first task of the shortcut; and
    in accordance with the determination that additional information is required to complete the first task of the shortcut, provide a prompt for the additional information.

10. The non-transitory computer-readable storage medium of claim 9, wherein providing the prompt for the additional information further comprises:
    providing an entry field in the first affordance corresponding to the first task of the shortcut.

11. The non-transitory computer-readable storage medium of claim 9, wherein providing the prompt for the additional information further comprises:
    providing a stepper field in the first affordance corresponding to the first task of the shortcut.

12. The non-transitory computer-readable storage medium of claim 9, wherein providing the prompt for the additional information further comprises:
    providing a calendar field in the first affordance corresponding to the first task of the shortcut.

13. The non-transitory computer-readable storage medium of claim 9, wherein providing the prompt for the additional information further comprises:
    displaying a second affordance corresponding to the prompt for additional information.

14. The non-transitory computer-readable storage medium of claim 13, wherein the second affordance is displayed in a second predetermined portion of the user interface.

15. The non-transitory computer-readable storage medium of claim 14, wherein the programs further comprise instructions, which when executed by one or more processors of an electronic device, cause the electronic device to:
    in response to displaying the second affordance, cease to display the first affordance.

16. The non-transitory computer-readable storage medium of claim 9, wherein the programs further comprise instructions, which when executed by one or more processors of an electronic device, cause the electronic device to:
    receive the additional information; and
    perform the task with the additional information.

17. The non-transitory computer-readable storage medium of claim 1, wherein a portion of the displayed user interface that is not displaying the first affordance is partially opaque.

18. The non-transitory computer-readable storage medium of claim 17, wherein the programs further comprise instructions, which when executed by one or more processors of an electronic device, cause the electronic device to:
determine whether performing the first task of the shortcut includes displaying a progress bar in the first affordance; and
in accordance with a determination that performing the first task of the shortcut includes displaying a progress bar in the first affordance:
display the progress bar in the first affordance; and
display a partially opaque version of the portion of the user interface that is not displaying the first affordance.

19. The non-transitory computer-readable storage medium of claim 18, wherein determining whether performing the first task of the shortcut includes displaying a progress bar in the first affordance further comprises:
determining whether the first task is of a predetermined task type;
determining whether the first task is being performed with a predetermined application; and
in accordance with the determination that the first task is of the predetermined task type or the first task is being performed with the predetermined application, determining that performing the first task of the shortcut includes displaying the progress bar in the first affordance.

20. The non-transitory computer-readable storage medium of claim 18, wherein the programs further comprise instructions, which when executed by one or more processors of an electronic device, cause the electronic device to:
in accordance with a determination that performing the first task of the shortcut includes displaying a progress bar in the first affordance:
display a stop affordance in the first affordance.

21. The non-transitory computer-readable storage medium of claim 20, wherein the programs further comprise instructions, which when executed by one or more processors of an electronic device, cause the electronic device to:
detect a selection of the stop affordance; and
in response to detecting the selection of the stop affordance:
cease performance of the first task; and
cease display of the first affordance.

22. The non-transitory computer-readable storage medium of claim 1, wherein the programs further comprise instructions, which when executed by one or more processors of an electronic device, cause the electronic device to:
display a third affordance corresponding to a second task of the shortcut over the user interface;
determine whether the second task of the shortcut can be completed without displaying an application interface corresponding to the second task;
in accordance with a determination that the second task of the shortcut can be completed without displaying the application interface corresponding to the second task, perform the second task while displaying the third affordance corresponding to the second task of the shortcut; and
in accordance with a determination that the second task of the shortcut cannot be completed without displaying the application interface corresponding to the second task:
display the application interface corresponding to the second task; and
complete the second task using the application interface corresponding to the second task.

23. The non-transitory computer-readable storage medium of claim 1, wherein the programs further comprise instructions, which when executed by one or more processors of an electronic device, cause the electronic device to:
detect an input to change the user interface; and
in response to detecting the input to change the user interface replace the user interface with a second user interface, wherein the first affordance corresponding to the first task of the shortcut continues to be displayed.

24. The non-transitory computer-readable storage medium of claim 1, wherein the programs further comprise instructions, which when executed by one or more processors of an electronic device, cause the electronic device to:
in accordance with the determination that the shortcut criteria is met:
display a notification corresponding to the shortcut;
detect selection of the notification corresponding to the shortcut; and
in response to detecting the selection of the notification corresponding to the shortcut, display the first affordance corresponding to the first task of the shortcut over the user interface.

25. The non-transitory computer-readable storage medium of claim 1, wherein the programs further comprise instructions, which when executed by one or more processors of an electronic device, cause the electronic device to:
display a picture in the first affordance corresponding to the first task of the shortcut.

26. The non-transitory computer-readable storage medium of claim 1, wherein the programs further comprise instructions, which when executed by one or more processors of an electronic device, cause the electronic device to:
detect a selection of the picture; and
in response to detecting the selection of the picture, replace a predetermined portion of the user interface with the picture.

27. The non-transitory computer-readable storage medium of claim 26, wherein the programs further comprise instructions, which when executed by one or more processors of an electronic device, cause the electronic device to:
detect a selection outside of the picture; and
in response to detecting the selection outside of the picture, replace the picture with the user interface.

28. An electronic device comprising:
one or more processors;
a memory; and
one or more programs, wherein the one or more programs are stored in the memory and configured to be executed by the one or more processors, the one or more programs including instructions for:
displaying a first affordance corresponding to a first task of a shortcut over a user interface;
in accordance with a determination that the first task of the shortcut can be completed without displaying an application interface corresponding to the first task, performing the first task while displaying the first affordance corresponding to the first task of the shortcut; and in accordance with a determination that the first task of the shortcut cannot be completed without displaying application interface corresponding to the first task, completing the first task while displaying the application interface.

29. The electronic device of claim 28, wherein the programs further include instructions for:
displaying a widget affordance including an affordance corresponding to the shortcut in the user interface.

30. The electronic device of claim 28, wherein the first affordance corresponding to the first task of the shortcut descends from the top of the displayed user interface.

31. The electronic device of claim 28, wherein determining whether the first task of the shortcut can be completed without displaying an application interface corresponding to the first task further comprises:
determining whether information to be displayed during performance of the task is capable of being displayed in the first affordance.

32. The electronic device of claim 28, wherein displaying the application interface corresponding to the first task further comprises:
replacing the user interface with the application interface corresponding to the first task.

33. The electronic device of claim 28, wherein the programs further include instructions for:
determining whether additional information is required to complete the first task of the shortcut; and
in accordance with the determination that additional information is required to complete the first task of the shortcut, providing a prompt for the additional information.

34. The electronic device of claim 33, wherein providing the prompt for the additional information further comprises:
displaying a second affordance corresponding to the prompt for additional information.

35. The electronic device of claim 34, wherein the second affordance is displayed in a second predetermined portion of the user interface.

36. The electronic device of claim 28, wherein a portion of the displayed user interface that is not displaying the first affordance is partially opaque.

37. The electronic device of claim 36, wherein the programs further include instructions for:
determining whether performing the first task of the shortcut includes displaying a progress bar in the first affordance; and
in accordance with a determination that performing the first task of the shortcut includes displaying a progress bar in the first affordance:
displaying the progress bar in the first affordance; and
displaying a partially opaque version of the portion of the user interface that is not displaying the first affordance.

38. The electronic device of claim 37, wherein determining whether performing the first task of the shortcut includes displaying a progress bar in the first affordance further comprises:
determining whether the first task is of a predetermined task type;
determining whether the first task is being performed with a predetermined application; and
in accordance with the determination that the first task is of the predetermined task type or the first task is being performed with the predetermined application, determining that performing the first task of the shortcut includes displaying the progress bar in the first affordance.

39. The electronic device of claim 37, wherein the programs further include instructions for:
in accordance with a determination that performing the first task of the shortcut includes displaying a progress bar in the first affordance:
displaying a stop affordance in the first affordance.

40. The electronic device of claim 39, wherein the programs further include instructions for:
detecting a selection of the stop affordance; and
in response to detecting the selection of the stop affordance:
ceasing performance of the first task; and
ceasing display of the first affordance.

41. The electronic device of claim 28, wherein the programs further include instructions for:
detecting an input to change the user interface; and
in response to detecting the input to change the user interface, replacing the user interface with a second user interface, wherein the first affordance corresponding to the first task of the shortcut continues to be displayed.

42. The electronic device of claim 28, wherein the programs further include instructions for:
in accordance with the determination that the shortcut criteria is met:
displaying a notification corresponding to the shortcut;
detecting selection of the notification corresponding to the shortcut; and
in response to detecting the selection of the notification corresponding to the shortcut, displaying the first affordance corresponding to the first task of the shortcut over the user interface.

43. The electronic device of claim 28, wherein the programs further include instructions for:
detecting a selection of the picture; and
in response to detecting the selection of the picture, replacing a predetermined portion of the user interface with the picture.

44. A method, comprising:
at an electronic device with one or more processors and memory:
displaying a first affordance corresponding to a first task of a shortcut over a user interface;
in accordance with a determination that the first task of the shortcut can be completed without displaying an application interface corresponding to the first task, performing the first task while displaying the first affordance corresponding to the first task of the shortcut; and
in accordance with a determination that the first task of the shortcut cannot be completed without displaying application interface corresponding to the first task, completing the first task while displaying the application interface.

45. The method of claim 44, further comprising:
displaying a widget affordance including an affordance corresponding to the shortcut in the user interface.

46. The method of claim 44, wherein the first affordance corresponding to the first task of the shortcut descends from the top of the displayed user interface.

47. The method of claim 44, wherein determining whether the first task of the shortcut can be completed without displaying an application interface corresponding to the first task further comprises:

determining whether information to be displayed during performance of the task is capable of being displayed in the first affordance.

48. The method of claim 44, wherein displaying the application interface corresponding to the first task further comprises:
replacing the user interface with the application interface corresponding to the first task.

49. The method of claim 44, further comprising:
determining whether additional information is required to complete the first task of the shortcut; and
in accordance with the determination that additional information is required to complete the first task of the shortcut, providing a prompt for the additional information.

50. The method of claim 49, wherein providing the prompt for the additional information further comprises:
displaying a second affordance corresponding to the prompt for additional information.

51. The method of claim 50, wherein the second affordance is displayed in a second predetermined portion of the user interface.

52. The method of claim 44, wherein a portion of the displayed user interface that is not displaying the first affordance is partially opaque.

53. The method of claim 52, further comprising:
determining whether performing the first task of the shortcut includes displaying a progress bar in the first affordance; and
in accordance with a determination that performing the first task of the shortcut includes displaying a progress bar in the first affordance:
displaying the progress bar in the first affordance; and
displaying a partially opaque version of the portion of the user interface that is not displaying the first affordance.

54. The method of claim 53, wherein determining whether performing the first task of the shortcut includes displaying a progress bar in the first affordance further comprises:
determining whether the first task is of a predetermined task type;
determining whether the first task is being performed with a predetermined application; and
in accordance with the determination that the first task is of the predetermined task type or the first task is being performed with the predetermined application, determining that performing the first task of the shortcut includes displaying the progress bar in the first affordance.

55. The method of claim 53, further comprising:
in accordance with a determination that performing the first task of the shortcut includes displaying a progress bar in the first affordance:
displaying a stop affordance in the first affordance.

56. The method of claim 55, further comprising:
detecting a selection of the stop affordance; and
in response to detecting the selection of the stop affordance:
ceasing performance of the first task; and
ceasing display of the first affordance.

57. The method of claim 44, further comprising:
detecting an input to change the user interface; and
in response to detecting the input to change the user interface, replacing the user interface with a second user interface, wherein the first affordance corresponding to the first task of the shortcut continues to be displayed.

58. The method of claim 44, further comprising:
in accordance with the determination that the shortcut criteria is met:
displaying a notification corresponding to the shortcut;
detecting selection of the notification corresponding to the shortcut; and
in response to detecting the selection of the notification corresponding to the shortcut, displaying the first affordance corresponding to the first task of the shortcut over the user interface.

59. The method of claim 44, further comprising:
detecting a selection of the picture; and
in response to detecting the selection of the picture, replacing a predetermined portion of the user interface with the picture.

* * * * *